United States Patent [19]
Suzuki et al.

[11] Patent Number: 5,923,013
[45] Date of Patent: Jul. 13, 1999

[54] PRINT CONTROL SYSTEM AND METHOD FOR CONTROLLING THE SYSTEM IN PAGE BY PAGE BASIS

[75] Inventors: Tadashi Suzuki; Yukio Tajima; Hiroyuki Yamashita; Junko Watanabe, all of Kawasaki, Japan

[73] Assignee: Fuji Xerox Co., Ltd., Tokyo, Japan

[21] Appl. No.: 08/851,496

[22] Filed: May 5, 1997

[30] Foreign Application Priority Data

| May 9, 1996 | [JP] | Japan | 8-115010 |
| Dec. 13, 1996 | [JP] | Japan | 8-333332 |

[51] Int. Cl.⁶ ............ G06F 17/00; G06F 11/00
[52] U.S. Cl. ............ 235/375; 235/432; 235/433; 395/101; 395/117
[58] Field of Search ............ 235/375, 432, 235/433; 395/115, 117, 101

[56] References Cited

U.S. PATENT DOCUMENTS

| 4,218,754 | 8/1980 | Schaeffer | 364/900 |
| 4,649,501 | 3/1987 | Bloom et al. | 364/519 |
| 4,812,999 | 3/1989 | Ohara | 364/518 |
| 5,243,381 | 9/1993 | Hube | 355/204 |
| 5,387,783 | 2/1995 | Mihm et al. | 235/375 |
| 5,528,734 | 6/1996 | Sanchez | 395/115 |
| 5,617,215 | 4/1997 | Webster et al. | 358/296 |

FOREIGN PATENT DOCUMENTS

| A2 0-697648 | 2/1996 | European Pat. Off. . |
| A 2-213930 | 8/1990 | Japan . |
| A 5-201075 | 8/1993 | Japan . |
| B2 6-24106 | 3/1994 | Japan . |
| A 6-106813 | 4/1994 | Japan . |
| B2 6-40092 | 5/1994 | Japan . |
| A 7-186461 | 7/1995 | Japan . |
| WO-A 95-06279 | 3/1995 | WIPO . |

*Primary Examiner*—Thien Minh Le
*Assistant Examiner*—Daniel Sy Cyr
*Attorney, Agent, or Firm*—Oliff & Berridge, PLC

[57] ABSTRACT

A print control system managing a print job on a job basis and on a page basis. When a print job is interpreted, a job description file and page data for each page are created. The job description file contains the attribute of the entire job and a job element (content) list. An item of page data is associated with the print attribute of each page including image data. The job control module extracts necessary image data according to the job element list and sends it to a printer. Because a plurality of print jobs share the common data, many job management functions, including print job combination and page addition/deletion, can be implemented easily.

30 Claims, 51 Drawing Sheets

| | | |
|---|---|---|
| | %%JobDescriptionFile | |
| 34 | Title | DOCUMENT NAME |
| 36 | ContentsSelect | IN-FILE NUMBER SPECIFYING PRINT METHOD (SEQUENCE AND COPIES) |
| 38 | | |
| 40 | MediaSelect | PAPER SIZE |
| 42 | MediaPrecedence | PAPER SIZE SPECIFICATION PRIORITY: JDF (job) OR PAGE DATA |
| 44 | Color | BLACK AND WHITE/COLOR/PAGE DATA |
| 46 | Plex | DUPLEX/SIMPLEX |
| 48 | Copy | NUMBER OF COPIES |
| 50 | ContentsIDs | CONTENTS LIST (AND IN-FILE NUMBER ASSIGNMENT TO EACH CONTENT) |
| 52 | HoldTiming | PRINT-JOB HOLD OPTION (BeforeRIP/BeforePrint/None) |
| 54 | JobSave | SAVE PRINT JOB IN BEFORE-Rip STATE (TRUE/FALSE) |
| 56 | RipFileSave | SAVE PRINT JOB IN AFTER-Rip STATE (TRUE/FALSE) |

14 JOB DESCRIPTION FILE (JDF)

Fig. 4

JDF EXAMPLE (1)

```
%%JobDescriptionFile
Title:          Title1
ContentsSelect: [1[1,3], 1[2,3]]
MediaSelect:    A4
MediaPrecedence: Job
Color:          Color
Plex:           Simplex
Copy:           1
ContentsIDs: 2, 3, 6
HoldTiming:     None
JobSave:        TRUE
RipFileSave:    FALSE
```

Fig. 5

JDF EXAMPLE (2)

```
%%JobDescriptionFile
Title:          Title2
ContentsSelect: [1[1,3], 1[1,2,3]]
MediaSelect:    A3
MediaPrecedence: Page
Color:          Color
Plex:           Duplex
Copy:           2
ContentsIDs: 951010010101111234567b00002,
             951010010101111234567b00003,
             951010010101111234567b00006,
HoldTiming:     BeforeRIP
JobSave:        TRUE
RipFileSave:    FALSE
```

Fig. 6

JDF PRINT INSTRUCTION FILE (JPF) DESCRIPTION

%%JDFPrint: Unique ID of JDF of a print job

JPF EXAMPLE

%%JDFPrint: 96031420202012345ab600001

Fig. 8

| JDF REVISION INSTRUCTION FILE (JRF) DESCRIPTION | | |
|---|---|---|
| 62 — %%JDFRevise: | | UNIQUE ID OF JDF TO BE REVISED |
| Title | * | |
| 64 — ReplaceSet | | RELATIONSHIP OF REVISION CONTENTS (IN-FILE NUMBER OF THE CONTENTS, $ ATTACHED PAGE NUMBER) |
| 66 — OriginalJDFDelete | | DELETE ORIGINAL JDF (TRUE/FALSE) |
| ContentsSelect | * | |
| MediaSelect | * | |
| MediaPrecedence | * | |
| Color | * | |
| Plex | * | |
| Copy | * | |
| 68 — ContentsIDs | | CONTENTS LIST CONTAINING ATTACHED PAGE NUMBER (AND IN-FILE NUMBER OF CONTENTS) |
| HoldTiming | * | |
| JobSave | * | |
| RipFileSave | * | |
| 70 — %%JDFReviseEnd | | |

*: TO CHANGE THESE FIELDS, FILL THEM IN AS IN JDF IF NECESSARY.

Fig. 9

JRF EXAMPLE (1)

```
%%JDFRevise: 96031310101012345ab60001
ReplaceSet:        1,$2
ReplaceSet:        2,$1
OriginalJDFDelete: FALSE
%%JDFReviseEnd
```

Fig. 10

JRF EXAMPLE (2)

```
%%JDFRevise: 96031310101012345ab60001
ContentsSelect:    1,[2, 1, 3, 4]
OriginalJDFDelete: TRUE
ContentsID:        9503030303031234567a00001,
                   9503030303031234567a00002;
                   $1, $2
%%JDFReviseEnd
```

Fig. 11

92 CONTENTS MANAGEMENT TABLE

| CONTENTS ID | UNIQUE ID | JDF or PD | PARENT CONTENTS ID | No. OF PARENT CONTENTS | JDF POINTER | IMAGE DATA POINTER | BLACK AND WHITE OR COLOR | PAGE SIZE |
|---|---|---|---|---|---|---|---|---|
| 1 | 94031··· | J |  |  | **** |  |  |  |
| 2 | 94032··· | P | 1 | 1 |  | **** | Color | A4 |
| 3 | 94038··· | P | 1,3 | 2 |  | **** | Color | A4 |
| 4 | 94040··· | P | 1,2 | 2 |  | **** | Color | A4 |
| 5 | 94042··· | P | 1,2 | 2 |  | **** | Color | A4 |
| 6 | 94044··· | J | 3 | 1 | **** |  |  |  |
| 7 | 94047··· | J | 3 | 1 | **** |  |  |  |
| 8 | 94048··· | P |  |  |  | **** | Color | A4 |

130 132 134 136 138 140 142 144 146

PAGE DATA

Fig. 13

(9..10 IS AN ABBREVIATION FOR 95100111101012345ab600010.)

(A)
Title: Job A
ContentsSelect: [3[1,2,3], 2[1,4,5,6], 3[1,7,8,9,10]]
ContentsIDs: 1,2,3,4,5,6,7,8,9,10
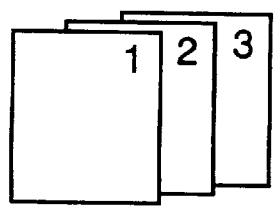
PREFACE  CONTENTS
3 COPIES OF THIS PAGE
CONFIGURATION
(B)
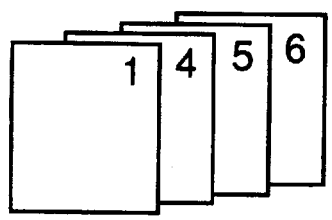
PREFACE  OVERVIEW
2 COPIES OF THIS PAGE
CONFIGURATION
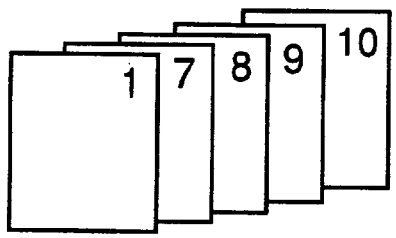
PREFACE  TEXT
3 COPIES OF THIS PAGE
CONFIGURATION
Fig. 55

(A)
Title: Job 1
ContentsSelect: [3[1,2,3,4,12,13],
 2[1,2,5,6,7,12,13],
 3[1,2,8,9,10,11,12,13]]
ContentsIDs: 11,1,2,3,4,5,6,7,8,9,10,12,13
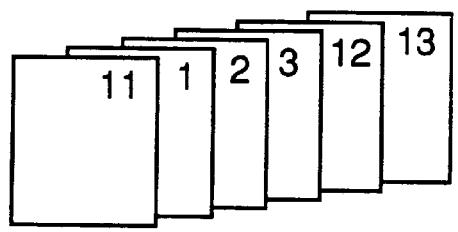
Job B  PREFACE  CONTENTS  Job C
3 COPIES OF THIS PAGE CONFIGURATION
(B)
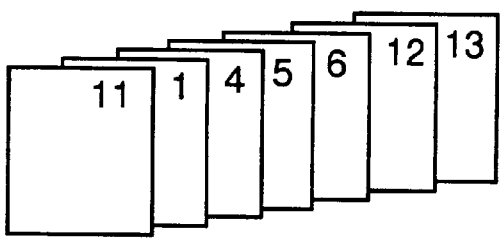
Job B  PREFACE  OVERVIEW  Job C
2 COPIES OF THIS PAGE CONFIGURATION
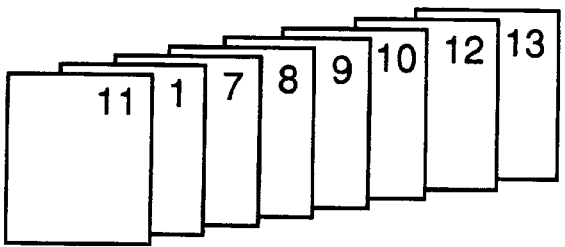
Job B  PREFACE  TEXT  Job C
3 COPIES OF THIS PAGE CONFIGURATION
Fig. 58

(A)
Title: Job 2
ContentsSelect: [3[1,2,3,4,12,13],
 3[1,2,8,9,10,11,12,13]]
ContentsIDs: 11,1,2,3,4,5,6,7,8,9,10,12,13
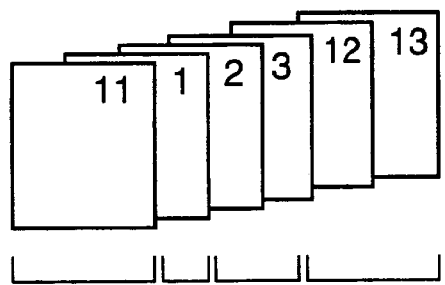
3 COPIES OF THIS PAGE CONFIGURATION
Job B  PREFACE CONTENTS  Job C
(B)
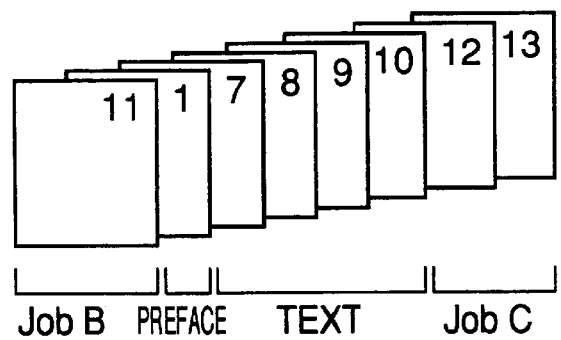
3 COPIES OF THIS PAGE CONFIGURATION
Job B  PREFACE  TEXT  Job C
Fig. 59

PRINT CONTROL SYSTEM AND METHOD FOR CONTROLLING THE SYSTEM IN PAGE BY PAGE BASIS

BACKGROUND OF THE INVENTION

1. Field of the Invention

This invention relates to a print control system and method, and more particularly to print job management.

2. Description of the Related Art

Recently, print systems have rapidly becoming popular. A typical print system has an editing unit such as a workstation and a print control system such as a print server, both connected to a network. The print control system, in turn, has one or more printers connected either directly or via a network. Upon receiving a print job from the editing unit, the print control system interprets it and sends the image data of each page to the printer.

A print job is usually coded in a page description language (PDL). Upon receiving a print job, the print control system interprets the job, generates the print data (image data) of each page, processes (compresses, saves, and decompresses) it, and then sends it to a printer.

However, a conventional print control system has managed print jobs on a job basis in most cases. This results in the problems described below. One problem is that, even when a plurality of print jobs use the same page data (that is, the same image data), they cannot share it. This means that they execute the same processing and, in addition, save and store the same data. Thus, job management is inefficient.

The user in a conventional print control system finds it difficult to process print jobs on a page basis (e.g., the users can neither change nor add pages). This requires the user to modify the job on an editing unit and then re-submit the modified print job to the print control system.

In addition, when the user wants to change the page sequence or the number of copies of a particular page, he must modify the print job and then re-submit it as described above.

Systems which save print data for later use in re-printing are found in Japanese Patent Laid-Open Publication No. Hei 2-213930, Japanese Patent Laid-Open Publication No. Hei 5-201075, Japanese Patent Laid-Open Publication No. Hei 6-24106, Japanese Patent Laid-Open Publication No. Hei 6-40092, and Japanese Patent Laid-Open Publication No. Hei 7-186461. However, these systems do not manage print jobs on a job basis and on a page basis, and therefore do not allow a plurality of print jobs to share print data.

Also found in Japanese Patent Laid-Open Publication No. Hei 6-106813 is a print control system which stores the print data of each page to allow the user to change the page sequence (or to select a desired page) when reprinting. However, this system does not manage print jobs both on a job basis and on a page basis, and therefore a plurality of print jobs cannot share print data. In this conventional system, the user cannot select a desired page from a plurality of print jobs for printing in any sequence.

As described above, a conventional print control system manages print jobs only on a job basis in most cases; a print control system featuring page-basis operation provides only limited functions. As print systems have become more and more popular these days, there has been a long felt need for a system which satisfies sophisticated and diversified user requirements.

SUMMARY OF THE INVENTION

It is an object of this invention to provide a print control system which manages print jobs on a job basis as well as on a page basis and thus gives the user a variety of functions.

It is another object of this invention to provide a print control system which allows the user to share print data among a plurality of print jobs to enhance data processing and data storage efficiency.

It is still another object of this invention to provide a print control system which gives the user many functions including print job concurrent binding, print job hierarchical binding, page addition, page replacement, and page deletion.

To achieve the above objects, the print control system according to this invention comprises:

- a job description file storage module containing job description files each containing a job elements list for each print job;
- a page data storage module containing page data associated with a page image for each page; and
- a job control module extracting and sending to a printer a page image, required for printing, according to a job element list in the job description file.

In the above configuration, a print job is managed by a job description file (JDF) and page data (PD) provided for each page. That is, the print job is managed on a job basis and on a page basis. A job element list contained in the job description file contains one or more job elements (contents). This job element list associates the job description file with page data required for printing.

This new job management method allows a plurality of print jobs to share common page data. It also provides many functions not attainable in a conventional print control system. Those functions include page basis replacement, addition, deletion, and job combination. When the contents of a job are changed, unchanged data is available for re-use, eliminating the need for the host system (job output system) to output the entire job again.

In addition, the print job management method according to this invention allows the user to re-print data, to output data to an external unit on a job basis and on a job description file basis, and to read data from an external unit.

Preferably, the system according to this invention includes a job interpretation module which reads entered print jobs in order to create job description files and page data. This job interpretation module, composed of PDL interpretation module, etc., de-compresses print jobs; that is, it acts as an interpreter (de-composer). A job description file is created automatically from the interpretation result, and page data for each page is also created automatically. The job interpretation module may be designed so that it functions as the job description file creation module or page data creation module.

Preferably, both page data and job description files are defined as job elements (contents). This means that job description files may be structured hierarchically by allowing one job description file to reference another. This hierarchical structure enables the job control module to examine job element lists, one at a time, until all the page data required for job execution is collected. The ability to define a job description file as a job element gives the user means to describe a print job, in which one volume of a book is printed, as a set of print jobs each corresponding to a chapter.

BRIEF DESCRIPTION OF THE DRAWINGS

FIG. 4 is a diagram showing the contents of a job description file.

FIG. 5 is a diagram showing an example of a job description file.

FIG. 6 is a diagram showing an example of a job description file.

FIG. 7 is a diagram showing the contents of a JDF print instruction file.

FIG. 8 is a diagram showing an example of a JDF print instruction file.

FIG. 9 is a diagram showing the contents of a JDF revision instruction file.

FIG. 10 is a diagram showing an example of a JDF revision instruction file.

FIG. 11 is a diagram showing an example of a JDF revision instruction file.

FIG. 13 is a diagram showing an example of a contents management table.

FIG. 55 is a diagram showing the job description file of job A and its execution result.

FIG. 58 is a diagram showing the result of job combination in the condition maintenance mode.

FIG. 59 is a diagram showing the result of job combination in the partial condition usage mode.

DESCRIPTION OF PREFERRED EMBODIMENTS

I. Principle

Figure 1:
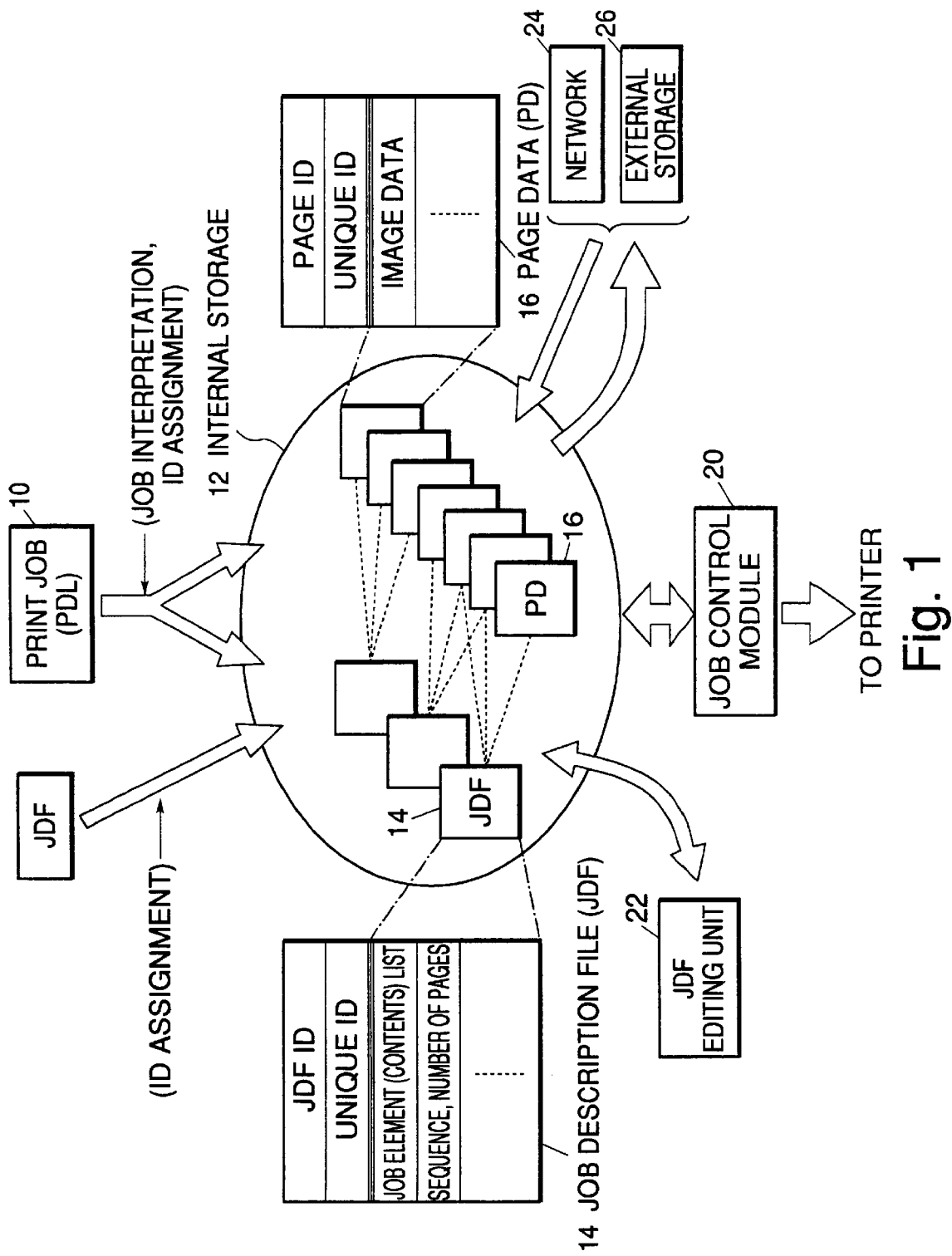
FIG. 1 is a conceptual diagram showing the basic principle of this invention.

FIG. 1 shows the concept of the print job control system according to this invention.

The print job 10 is sent from the host system where software application programs creating print jobs are running. For example, this print job 10 is described in the page description language (PDL). When the print control system shown in FIG. 1 receives the print job 10, it performs job interpretation on the print job 10 and divides it into one job description file (JDF) 14 and a plurality items of page data (PD) 16, one for each page. The job description file 14 has a JDF ID and a unique ID, while each item of page data 16 has a page ID and a unique ID.

As will be described later, the job description file 14 and the page data 16 are managed as job elements (hereinafter called contents). JDF IDs and page IDs described above are contents IDs. A content ID is a local identifier known only within the print control system, while a unique ID is an ID (universal ID) known both inside and outside the print control system. These IDs will be described later.

As shown in FIG. 1, the internal storage 12 contains the job description file 14 for each print job as well as a plurality items of page data 16. Each item of page data 16 stored in the internal storage 12 has its own unique data. Basically, no duplicate data is stored. In other words, a plurality of print jobs can share the common page data 16.

As will be described later, the job description file 14 contains a job elements (contents) list and the print attributes such as a print sequence and the number of copies. These print attributes are associated with the whole print job. On the other hand, the page data 16 is associated with the print attribute of each page, the print attribute being composed of image data and the print condition of each page and so on.

When the print control system featuring both job-basis and page-basis print job management receives a print request for a particular print job, the job control module 20 finds the job description file 14 of the print job, references the job element list, and identifies one or more job elements required for the execution of the print job. More specifically, the job control module 20 finds the page data 16 required for the execution of the print job. When the page data 16 is found, the image data of each page is found and sent to the printer. At this time, the job control module 20 controls printing according to the print attribute contained in the job description file 14 and the page data 16.

The print control system featuring this management function can receive only a job description file from an external unit for printing or modify an internally-stored job description file with the use of the JDF editing unit 22 to create a new job description file 14. Alternatively, it can send or receive a job description file 14 or page data 16 to or from the network 24 or the external storage 26.

Figure 2:
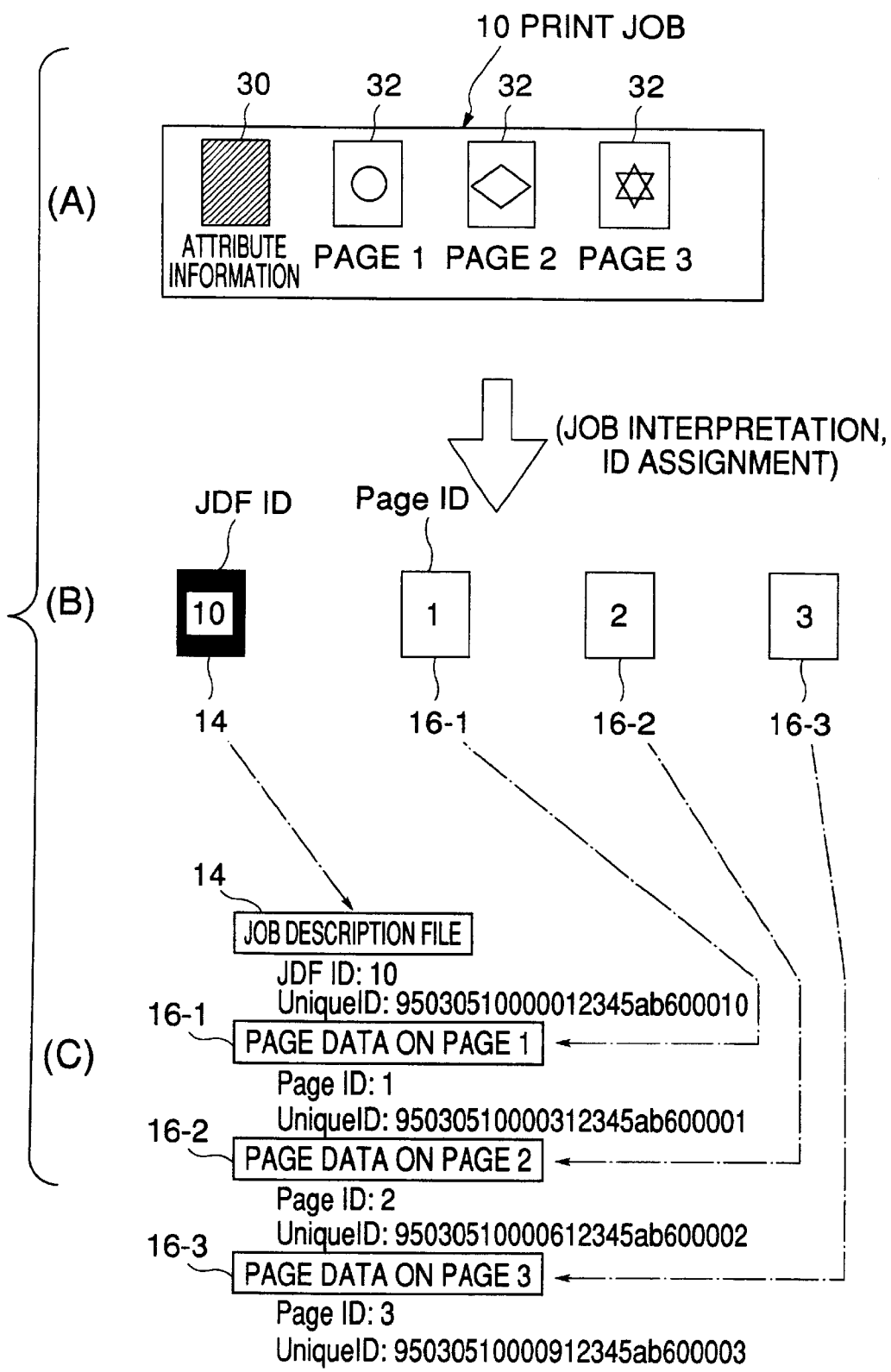
FIG. 2 is a diagram showing job interpretation and ID assignment.

FIG. 2 shows an example of print job interpretation and ID assignment. FIG. 2 (A) shows the print job 10. Conceptually, this print job 10 is composed of the attribute information 30 and the page data 32 of each page. Upon receiving the print job 10 like this, the print control system interprets the job and assigns IDs as described above. Also, as shown in FIG. 2 (B), the system creates the job description file 14 and the page data 16-1, 16-2, and 16-3. At this time, the job description file 14 and page data 16-1, 16-2, and 16-3 each have contents IDs and unique IDs assigned. FIG. 2 (C) shows an example.

The contents ID assigned to the job description file 14 (JDF ID) is a local ID. In the example in FIG. 2, the ID number 10 is assigned to the job description file 14. Similarly, the page IDS are assigned to page data 16-1, 16-2, and 16-3. That is, the ID numbers 1, 2, and 3 are assigned. Unique IDS are also assigned to the job description file 14 and to each page data 16-1, 16-2, and 16-3. This will be detailed later.

In this embodiment, a unique ID is composed of the following three components: creation date, host ID identifying the print control system, and contents ID unique within the print control system.

For example, assume that the job description file 14 is created at 10:00:00 on May 5th, 1995, that the host ID of the print control system is 12345ab6, and that the contents ID is 10. Then, the unique ID 95030510000012345ab600010 is assigned to the job description file 14. Similarly, unique IDS are assigned to the page data 16-1, 16-2, and 16-3.

A unique ID is assigned to each content (job description file, page data) as described above. This ID, which is unique within the system, helps eliminate duplicate data, as will be described later. Note that a contents ID is included in a unique ID in order to prevent two or more unique IDS from being created, for example, when a plurality of contents are created at the same time (within one second) or when a plurality of jobs are interpreted concurrently.

Figure 3:
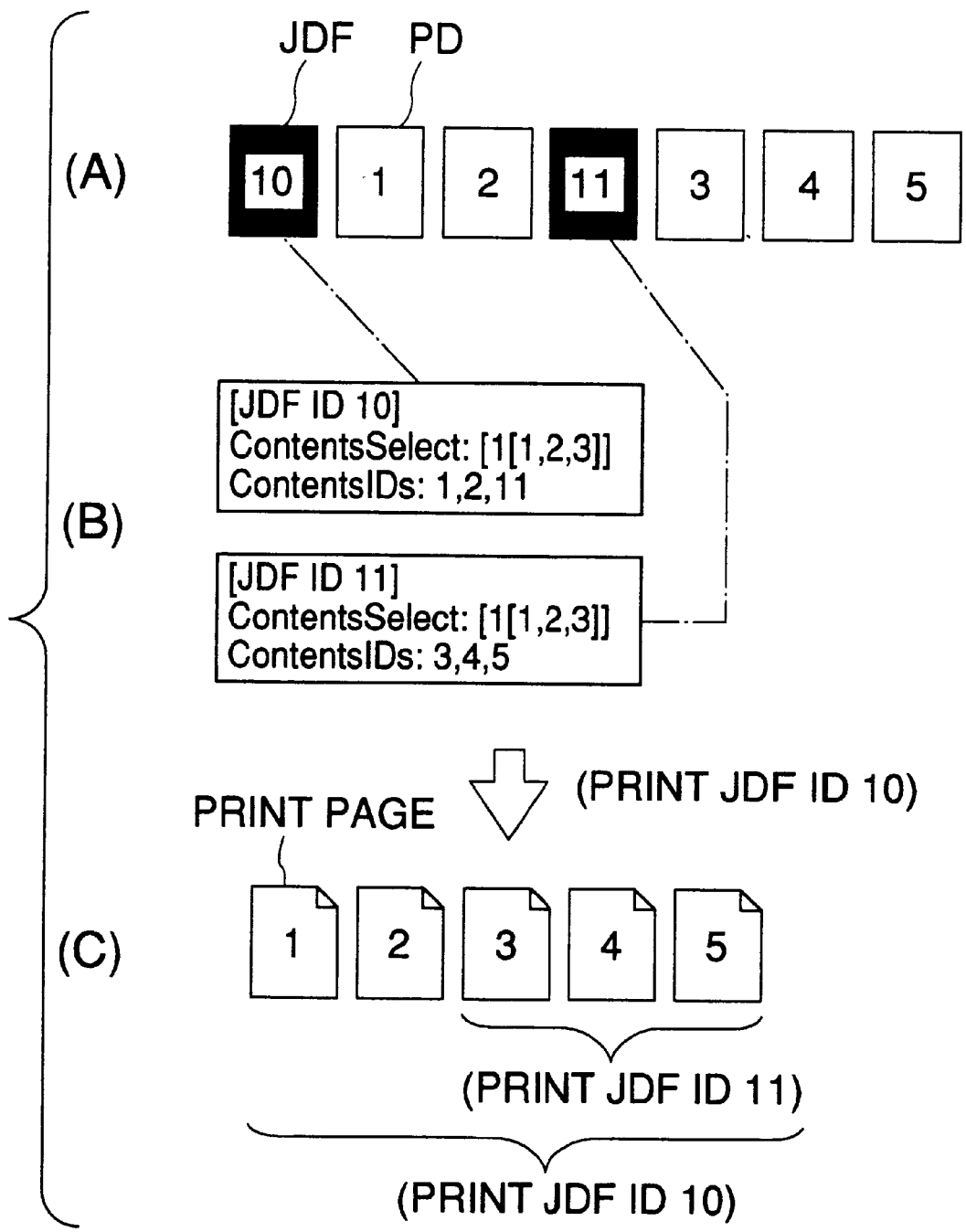
FIG. 3 is a diagram showing the basic configuration of a job description file and how a job is executed.

FIG. 3 shows an example of job description files and an example of a print execution result. As shown in FIG. 3(A), the print job is composed of two job description files, JDF ID 10 and JDF ID 11, and five pages of page data, page 1 to page 5.

FIG. 3 (B) shows an example of a simple job description file. This figure shows the two fields of the job description file: ContentsSelect and ContentsIDs. The ContentsSelect field contains a print method. More specifically, it contains the print sequence and the number of copies. The ContentsIDs field, which functions as a job element list, contains the contents IDs of the contents (that is, job elements). The sequence number of each contents ID within the ContentsIDs field is an in-file number (significant only in each file). For example, in JDF ID 10 shown in FIG. 3 (B), the in-file number 1 is assigned to the contents ID1, the in-file number 2 to the contents ID2, and the in-file number 3 to the contents ID11.

These in-file numbers appear in the ContentsSelect field to show the print method. That is, the numbers within the inner brackets, [ ], in the ContentsSelect field are in-file numbers indicating the print sequence, and the number immediately preceding the inner brackets, [ ], indicates the number of copies. For example, the ContentsSelect field of JDF ID 10 in FIG. 3 specifies that pages be printed in the sequence of in-file numbers 1, 2, and 3 (i.e., in the sequence of contents ID1, ID2, and ID11), one copy for each page.

The ContentsSelect field of JDF ID 11 has the same information. However, it should be noted that the ContentsSelect field of JDF ID 10 contains JDF ID 11 which corresponds to another JDF. That is, the fields are hierarchically structured (nested).

The job description file JDF ID 10 of this print job, when executed, produces the print result shown in FIG. 3 (C). That is, pages 1 and 2 are printed according to the ContentsSelect field of JDF ID 10. Then, JDF ID 11 is executed and pages 3 to 5 are printed.

Thus, according to this embodiment, a simply-coded job description file in conjunction with a definition of hierarchically-structured job description files enables the user to carry out a variety of printing operations, as will be described later.

Preferably, a job description file should be a text file. A text file allows the user to manage the file with the use of contents IDs and unique IDs, to save it on a portable medium such as a floppy disk or a magneto optical disk, and to read it into the system from such a medium. In addition, a text file allows the user to send or receive a job description file over a network.

II. Explanation of Job Description File

FIG. 3 shows only the major items of a job description file. An actual job description file can have some other attribute items included. FIG. 4 shows an example.

As shown in FIG. 4, the header, 34, of a job description file contains the comment %%JobDescriptionFile. This comment statement is used to determine the type of input data, as described below. The Title field, 36, contains a document name. The ContentsSelect field, 38, contains print method information (print sequence and number of copies) described using in-file numbers as shown in FIG. 3 (B). As explained above, in-file numbers are defined as the sequence numbers of the items described in the ContentsIDs field, 50.

The MediaSelect field, 40, contains a paper size, and the MediaPrecedence field, 42, contains information determining which paper size to use (page size in the job description file or paper size in the page data). This will be described later. The Color field, 44, specifies a color print option: black-and-white, color, or a color specification in the page data. The Plex field, 46, specifies the printing mode: double side printing or single side printing. The Copy field, 48, specifies the number of copies to be produced in the system. The ContentsIDs field, 50, contains a contents list, the element of the list being assigned in-file numbers sequentially from left to right beginning with 1. The HoldTiming field, 52, specifies whether to hold a print job at one of two points in time: before job interpretation and before printing (after job interpretation). Job interpretation is sometimes called Raster Image Processing (RIP). The JobSave field, 54, specifies whether to save, after printing, a print job in the state before job interpretation. The RipFileSave field, 56, specifies whether to save, after printing, a print job in the state after job interpretation.

The attributes shown in FIG. 4 are specified based on the analysis result of a print job. For those attributes not specified for the print job, information associated with the print job or the default values are set. Note that the configuration of a job description file may be modified according to the print control system functions.

FIG. 5 shows the first example of a job description file, and FIG. 6 shows the second example. The ContentsIDs field in FIG. 5 contains contents IDs, while the ContentsIDs field in FIG. 6 contains unique IDs. As described above, each content is managed with a content ID within the print control system, but with a unique ID outside the print control system.

III. Explanation of Other Files

FIG. 7 shows the contents of a JDF print instruction file (JPF). When the job description file 14 is in the internal storage 12 as shown in FIG. 1, this file is used to re-print data by specifying the unique ID of the job description file. As shown in FIG. 7, the file begins with the comment %%JDFPrint, 58, followed by the unique ID, 60, of the job to be printed.

FIG. 8 shows an example of the JDF print instruction file with the unique ID of 9603142020202345ab600001 of a job description file. This JDF print instruction file allows the user to use and re-print already-saved data without having to submit a new print job. The operation will be described later.

FIG. 9 shows the contents of the JDF revision instruction file (JRF). This JDF revision instruction file allows the user to re-print data while modifying the job description file. As shown in FIG. 9, the JDF revision instruction file begins with the comment %%JDFRevise, 62, followed by the unique ID of the JDF to be revised. Revisions are specified in the attribute fields to be revised. In this example, relation changes are specified in the ReplaceSet field 64. Each relation change is specified in the form [contents in-file number, $ attached page number].

Contents in-file numbers are sequence numbers of the contents described in the ContentsIDs field, 68. The OriginalJDFDelete field, 66, contains information as to whether to delete the original JDF. The ContentsIDs field, 68, contains a contents list which contains the numbers of pages attached to the JRF if any. The field 70 contains the comment %%JDFReviseEnd, indicating the end of this file. Page data to be used as replacement follows this comment.

To change other items, it is necessary to describe them as in the job description file shown in FIG. 4. The ReplaceSet field, 64, is used to replace pages, but not to add pages. The ContentsIDs contains unique IDs for contents and, when adding pages, specifies pages in the form "$page-number". In FIGS. 10 and 11 show examples of the JDF revision instruction file. Revision and re-printing using the JDF revision instruction file will be detailed later.

IV. System Configuration

Figure 12:
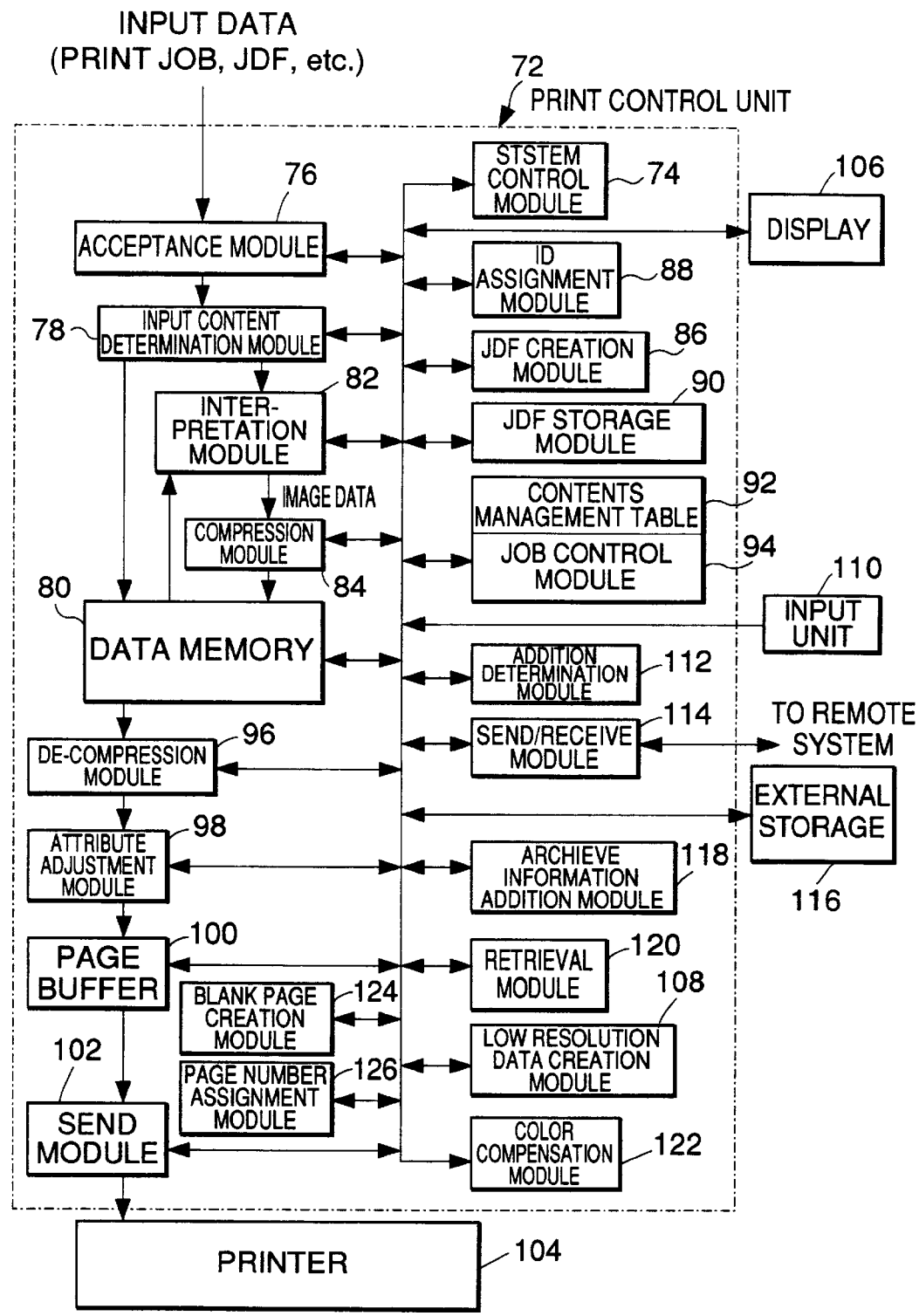
FIG. 12 is a block diagram showing the embodiment of a print control system according to this invention.

FIG. 12 shows the overall configuration of a preferred embodiment of the print control system according to this invention.

The print control system 72 is implemented, for example, by a computer having the print control program in storage (ROM or hard disk). The program will be described below in detail.

The system control module 74 controls the print control system 72. The input data acceptance module 76 accepts input data and sends it to the input data content determination module 78. The input data content determination module 78 determines the type of input data; that is, it checks if the input is a print job, job description file (JDF), JDF print instruction file (JPF), or JDF revision instruction file (JRF). To determine the type of input data, the module references the comment at the start of input data. If the comment is %%JobDescriptionFile, the module determines that the input is a job description file; if the comment is %%JDFPrint, the module determines that the input is a JDF print instruction file; if the comment is %%JDFRevise, the module determines that the input is a JDF revision instruction file. If no such identifier, or a comment is found, the module determines that the input is a print job. Input data processing based on the determination result will be detailed later with reference to the flowcharts.

When the input data is a print job, the job interpretation module 82 expands the job; that is, it interprets the job. The job interpretation module 82 extracts the print attribute from the print job and generates the image data of each page. The compression module 84 compresses the image data and sends it the data memory 80. The data memory 80 stores not only such image data but also print jobs as necessary.

The print attribute extracted through job analysis is sent to the JDF creation module 86, which creates a job description file described above. The created job description file is stored in the JDF storage module 90. At this time, the ID assignment module 88 assigns a contents ID and a unique ID to the job description file.

The print attribute extracted through job analysis includes the print attribute that constitutes the page data. The ID assignment module 88 assigns contents IDs and unique IDs to the page data as it does for the job description file.

The contents management table 92, a table for managing created job description files and page data, also contains page data. Image data, which is the actual data represented by page data, is stored in the data memory 80.

The job control module 94 performs various control operations based on the job description file. The control this module performs includes print control, saved job print control, job description file editing control, job combination control, contents deletion control, archive control, and restore control. The job control module 94 performs those control operation while referencing the contents management table 92.

FIG. 13 shows an example of the contents management table 92. The contents management table 92 manages two types of contents, job description files and page data, equivalently. Column 130 contains the ID of each content. Column 132 contains the unique ID assigned to each content. Column 134 contains the type of each content, that is, whether the content is a job description file or page data. Column 136 contains the contents ID of the parent contents associated with each content. Column 138 contains the number of parent contents. Column 140 contains the pointer pointing to the address within the JDF storage module 90 where the job description file is stored. Column 142 contains the pointer pointing to the address within the data memory 80 where image data is stored. Columns 144 and 146 contain page data attribute information. That is, they contain information about the color (black and while or color) and page size. The table also contains other attributes, as necessary, which are usually contained in databases.

The contents management table 92, JDF storage module 90, and data memory 80 may be created in the internal storage of the print control system 72. The attribute of each page, though stored in the contents management table 92 in this embodiment, may be stored in a separately-provided page data storage module. In addition. though two components of page data (image data and attribute information) are separately stored in this embodiment, they may be managed by the same table.

Figure 14:
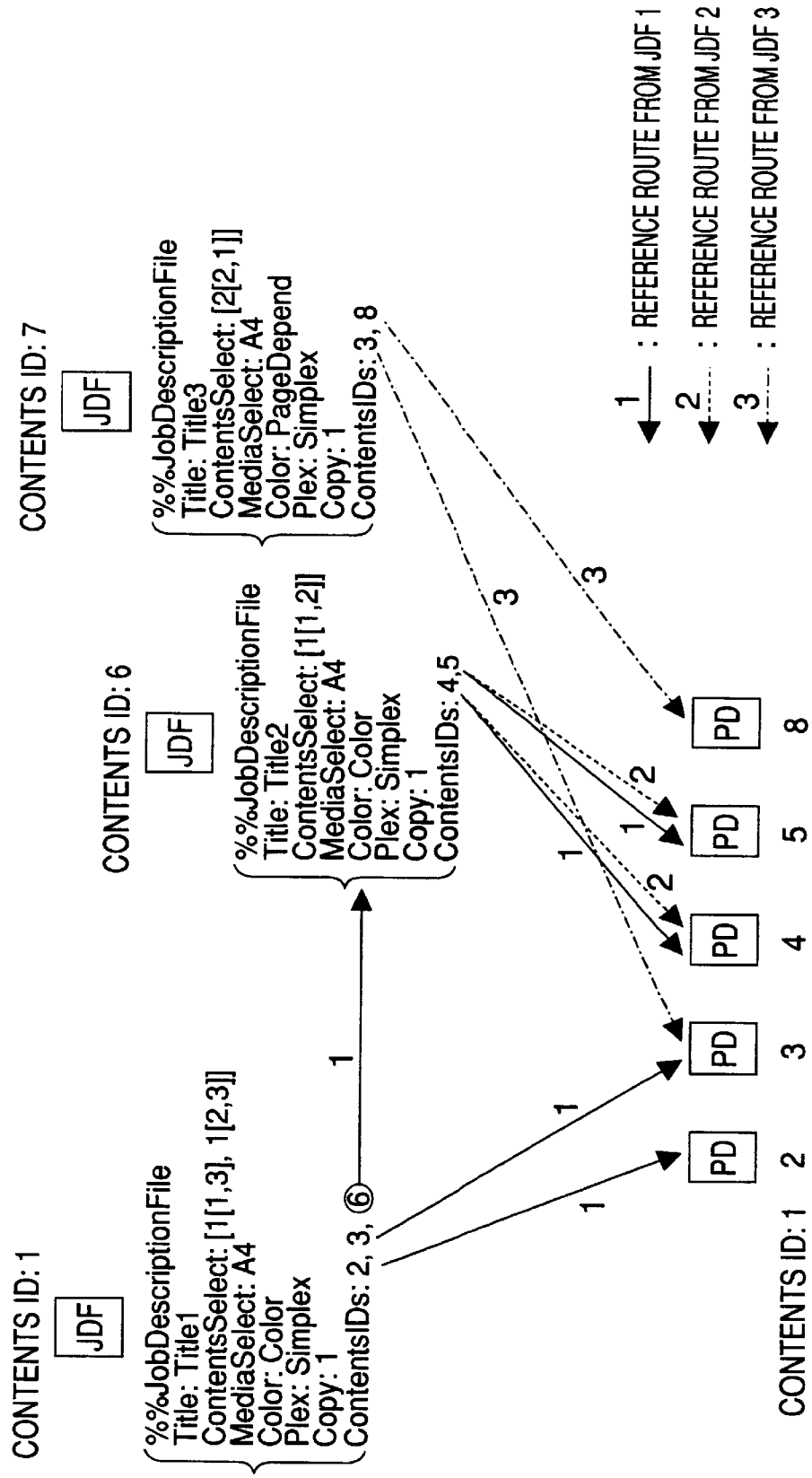
FIG. 14 is a diagram showing the relationship among the contents described in the contents management table.

FIG. 14 conceptually shows the relation among contents 1–5 stored in the contents management table shown in FIG. 13. Contents ID1 represents a job description file. The job description file with the contents ID1, whose ContentsIDs field contains 2 and 3, references two items of page data, contents ID2 and contents ID3, respectively.

As shown in FIG. 14, the job description file with the contents ID1 also references the job description file with the contents ID6 and, through that file, references two items of page data, contents ID4 and contents ID5. That is, these contents are hierarchically structured. It should also be noted that the job description file with the contents ID7 references two items of page data, contents ID3 and contents ID8. Column 136 in FIG. 13 contains the ID of the parent contents to show this hierarchical structure. This is the same for column 138.

To execute a print job in the print control system shown in FIG. 12, the job control module 94 reads the job description file from the JDF storage module 90 and, based on that file, controls printing. More specifically, the image data of each page, which will be processed by the print job, is read from the data memory 80 for transmission to the de-compression module 96 for expansion. The image data is then sent, through the attribute adjustment module 98, to the page buffer 100. Then, the image data of each page is read from the page buffer 100 and is sent, via the data send module 102, to the printer 104. The print condition is set up according to the print attribute contained in the job description file and the page data of each page.

The display 106 shown in FIG. 12 is a monitor display on which the contents list or the job description file list is displayed. Also, in selecting the page data of a page, the low-resolution data (image data) of each page, created by the low-resolution data creation module 108, is displayed on the display 106. The low-resolution data creation module 108 creates low-resolution data using image data generated through job analysis. The ability to display the image of each page in this manner allows the user to check (preview) the contents of each page before printing, making page selection easier.

The input unit 110 is a device such as a keyboard or a mouse. It is used, for example, for job description file editing or some other operations.

The addition determination module 112 compares page data entered during a data restore operation with page data stored in the print control system 72. The module performs this comparison to enable only page data, not yet saved in the print control system 72, to be added. This operation will be detailed later.

The send/receive module 114 controls the transfer of data to or from an external remote system. The external storage 116, usually a hard disk or a floppy disk, contains job description files and print jobs. This makes it possible for the user to write a job description file onto a portable medium and install it onto another system or to read a job description file from another system via a portable medium.

The archive information addition module 118 assigns archive information during archive operation (external saving). The retrieval module 120 uses archive information to retrieve data necessary for restore operation. These modules will be described later. The color correction module 122 performs color correction on image data of a desired color when image data generated through job analysis is saved according to the color (CMYK).

The blank page creation module 124 controls the insertion of a blank page into a specified position during execution of a print job. The page number assignment module 126 inserts a page number into a specified position on each page before printing it.

The functions of the print control system 72 shown in FIG. 12 may be implemented by hardware units or by software modules.

V. Operation

Figure 15:
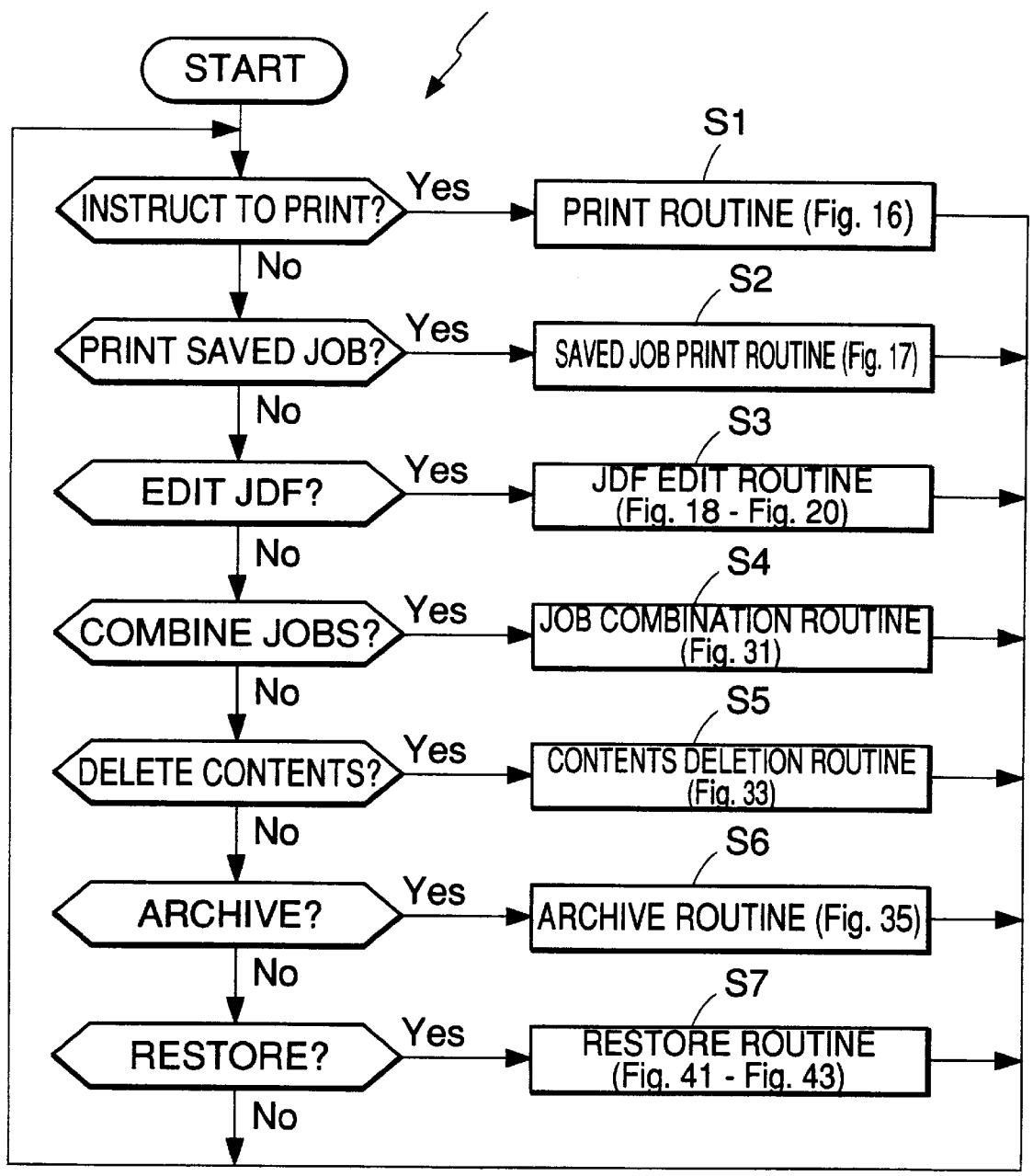
FIG. 15 is a flowchart showing the basic routines of a system according to this invention.

FIG. 15 shows the basic routines executed in the print control system 72. The basic routines are composed of the print routine S1, saved job print routine S2, JDF edit routine S3, job combination routine S4, contents deletion routine S5, archive routine S6, and restore routine S7, each of which is executed as required. The system basic routines are started when input data is received or when an operator types a start request.

(1) Print routine

Figure 16:
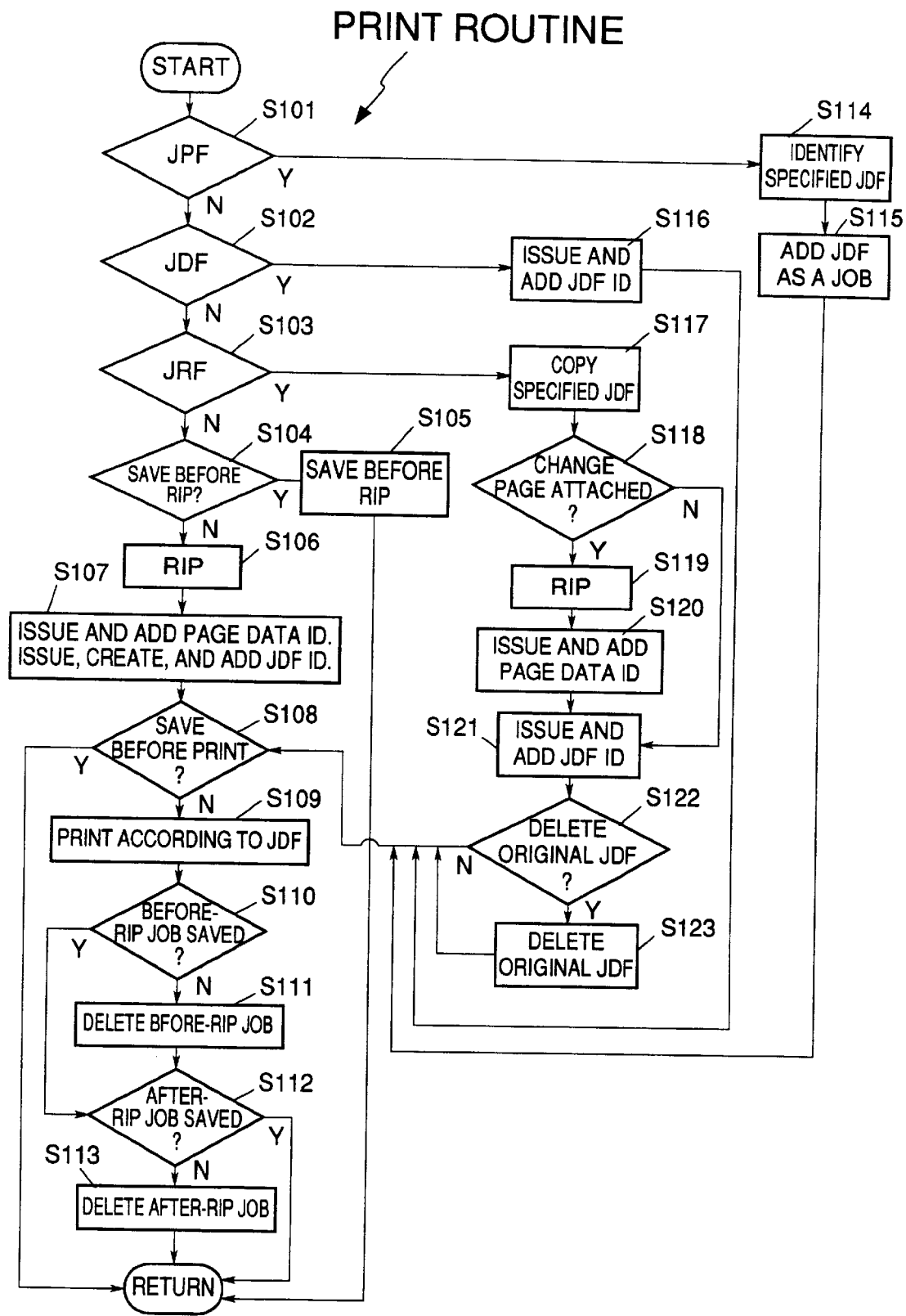
FIG. 16 is a flowchart showing the print routine.

FIG. 16 shows the flowchart of the print routine. This routine will be described in the following with reference to FIG. 12.

The print routine is started when a print job or print file (JDF, JPF, JRF) is entered. A print job is coded in the page description language, created in the image file format, or prepared in the text format. It is normally used as input for printing.

In S101–S103, the input data content determination module 78, shown in FIG. 12, determines the type of input data. When a normal print job is entered, the job interpretation module 82 checks, in step 104, whether the hold option is specified before control is passed to the raster image processing (RIP) step (S106). That is, the module checks the hold timing option in the HoldTiming field, 52, of the job description file shown in FIG. 4. If the field specifies that the print job should be saved before RIP, the module stores the print job in the data memory 80 and ends this processing.

On the other hand, if the module finds, in step S104, that the request to save the print job before RIP is not specified, it puts the print job in the RIP queue in the data memory 80 before interpretation. The job interpretation module 82 then interprets the print job and passes it to the RIP step where the job is expanded into image data as shown in S106. Based on the job interpretation result, the JDF creation module 86 creates a job description file and, at the same time, extracts page data from the job analysis result. The compression module 84 compresses the image data contained in the page data and stores the compressed image data in the data memory 80. The ID assignment module 88 assigns the contents IDS (JDF ID, page ID) and unique IDS to the job description file and page data. The job description file and the page data to which those IDS are assigned are managed by the contents management table 92 as described above.

In step 108, a check is made to determine if the Hold-Timing field, 52, of the job description file (see FIG. 4)

contains the request to save the print job before printing and, if it contains such a request, ends processing. If no such request is specified, printing starts under control of the job control module 94 in S109 based on the created job description file. That is, the module references the job description file and reads necessary image data from the data memory 80, decompresses it, and sends it to the printer 104. In this case, the print condition is set up according to the print attribute described in the job description file and page data.

In S110 in FIG. 16, a check is made to see if the JobSave field, 54, of the job description file (see FIG. 4) contains the request to save the before-RIP job. If no such request is specified, the before-RIP print job is deleted from the data memory 80 by module S111. In S112, a check is made to see if the RipFileSave field, 56, of the job description file (see FIG. 4) contains the request to save the after-RIP job. If no such request is specified, the after-RIP job is deleted in S113. The contents management table 92 is updated accordingly.

When a JDF print instruction file (JPF) is entered, the routine performs the following processing.

If it is determined in S101 that the input is a JPF, the unique ID of the print job coded in the JDF print instruction file is referenced to identify the job description file of the print job to be processed. In S115, the job control module 94 reads the job description file and adds it as a job. After that, the job is processed as a print job as described above.

When a job description file (JDF) is entered, the routine performs the following processing.

When it is determined in S102 that the input is a JDF, there is a possibility that the print attribute specified in the job description file has been changed. Therefore, a new contents ID as well as a new unique ID is assigned to the job description file in S116. The new job description file is then stored in the JDF storage module 90 and added to the contents management table 92.

When a new ID is assigned to the job description file, the unique ID of each content described in the ContentsIDs field of the job description file is replaced by a contents ID used in this system. In this case, the contents management table 92 is referenced to identify the contents ID corresponding to the unique ID and the identified contents ID is then used for replacement.

In this case, if a content referenced in the ContentsIDs field of the job description file is not in the system, the routine searches the external storage 116 for it. If it is not found there, the routine searches a remote system via the send/receive module 114. After the above processing, the same processing as that for a usual print job is performed.

When a JDF revision instruction file (JRF) is entered, the routine performs the following processing.

When it is determined in S103 that the input is a JRF, the unique ID at the start of the JRF is referenced in S117 and the job description file with that unique ID is read. A check is made in S118 if replacement pages are attached to the JDF revision instruction file. If no such page is attached, S121 is executed; otherwise, the job interpretation module 82 performs expansion on the attached pages to create page data containing image data. In S120, contents IDs and unique IDs are assigned to the created page data. The contents IDS written as $1 and $2 in the JDF revision instruction file are replaced with contents IDs used in the system and are reflected in the job description file. In addition, the unique IDs of the contents listed in the ContentsIDs field of the JDF revision instruction file are replaced by the contents IDs used in the system based on the contents of the contents management table 92. At the same time, a new contents ID and a unique ID is assigned to the job description file and added to the contents management table 92 in S121. The request specifying whether to delete the original file is read from the JDF revision instruction file in S122; if the request to delete is specified, the original job description file is deleted in S123. The subsequent processing is the same as that of a normal print job.

(2) Saved job print routine

Figure 17:
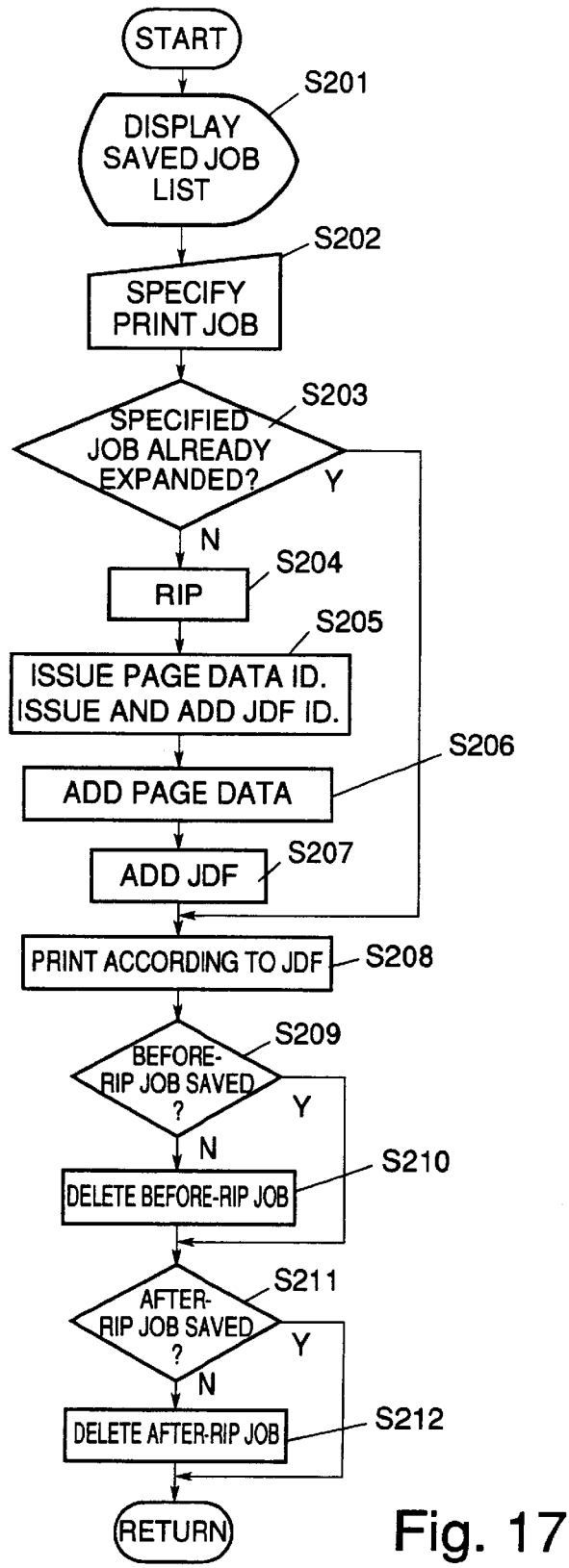
FIG. 17 is a flowchart showing the saved job print routine.

Referring now to FIG. 12, the saved job print routine will be described below with reference to FIG. 17.

The saved job print routine is started when the operator enters an instruction to print a saved job. In S201, a list of saved print jobs appears on the display 106 This list contains print jobs in the data memory 80 waiting to be expanded as well as already-expanded print jobs each having a job description file and page data for each of its pages.

When the operator enters a print request for a job in S202, the routine checks in S203 whether or not the job is already expanded. If it is expanded, the steps starting with S208 are executed. If it is not, the routine first expands the job (interprets the job) in S204. In S205, the routine assigns the IDs to the job description file, created as a result of job interpretation, and to the page data of each page in S205. The page data and the job description file are added to the contents management table 92 in S206 and S207. In S208, the routine starts printing based on the job description file. The steps in S209–S212 are the same as those of a normal print job shown in S110–S113 in FIG. 16.

(3) JDF edit routine

Referring now to FIG. 12, the JDF edit routine will be described below with reference to FIG. 18.

The JDF edit mode is roughly classified into the "print attribute change mode" and the "print sequence change mode." The print sequence change mode is further classified into the "any-page-sequence print and multiple-copy print mode" and the "variable page print mode."

First, the "print attribute change mode" will be described in the following.

When the routine finds in S301 that the mode is the print attribute change mode, the display 106 displays in S302 a list of job description files currently saved in the system. When the operator selects a job description file through the input unit 110 in S303, the contents of the specified job description file are read. In S304, the operator enters changes to any print attributes of the job description file. In S305, a new job description file is created according to the change. In S306, contents IDs and unique IDs are assigned to the new job description file. In S307, the job description file is added to the contents management table 92. In this case, the operator enters an instruction specifying whether to delete the original job description file in S308. A delete request, if entered, causes the original job description file to be deleted in S309.

Next, the "any-page-sequence print and multiple-copy print mode", one of the print sequence change modes, will be described in the following.

Figure 19:
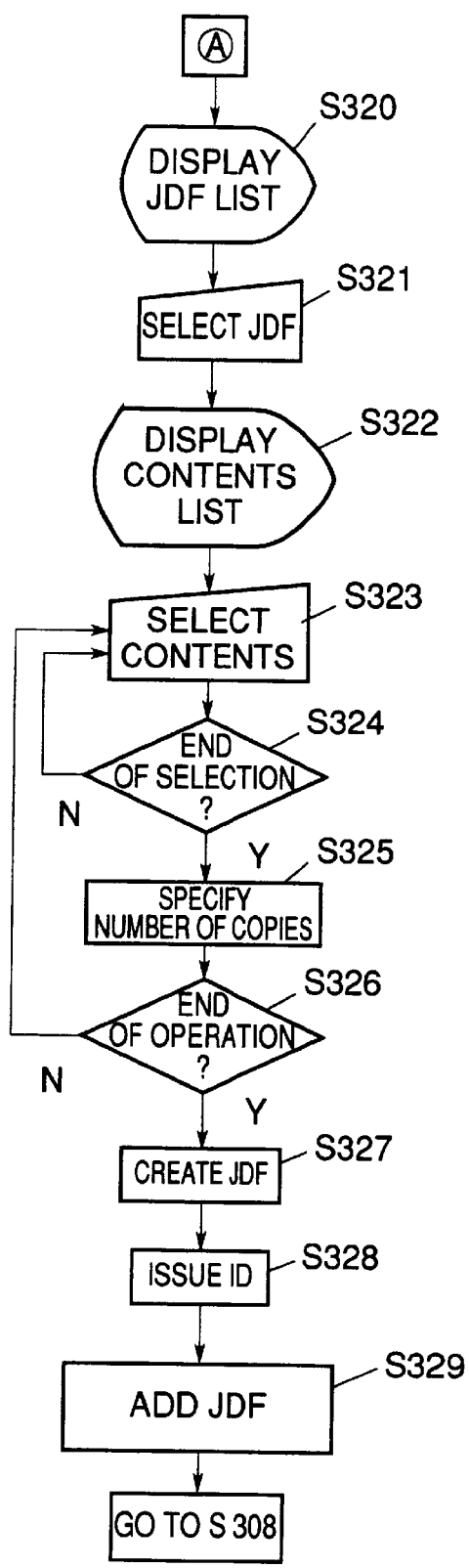
FIG. 19 is a flowchart showing the JDF edit routine.

When the routine finds that the mode is "any-page-sequence print and multiple-copy print mode" in S301 and S310, it passes control to the routine, shown in FIG. 19, in S311. In FIG. 19, the display 106 displays a list an of job description files in S320. When, in S321, the operator selects a job description file to be edited, a list of the contents referenced by the job description file is displayed in S322. The contents displayed include page data as well as other job description files included hierarchically in the job description file.

In S323, the operator selects the contents to be printed in the sequence in which to print. When the selection ends in S324, the operator specifies the number of copies in S325. In S326, the routine checks if the operator's operation ends and, in S327, creates a new job description file according to the selection result, and then assigns contents IDs and unique IDs to the new job description file in S328. In S329, the routine adds the new job description file to the contents management table 92.

When the operator specifies the number of print copies in S325 and, after that, selects the continuous mode without ending the operation, he can select contents and specify the number of copies again in the same manner as described above. This feature allows the operator to specify a variety of print settings (any number of copies of any contents).

Figure 18:
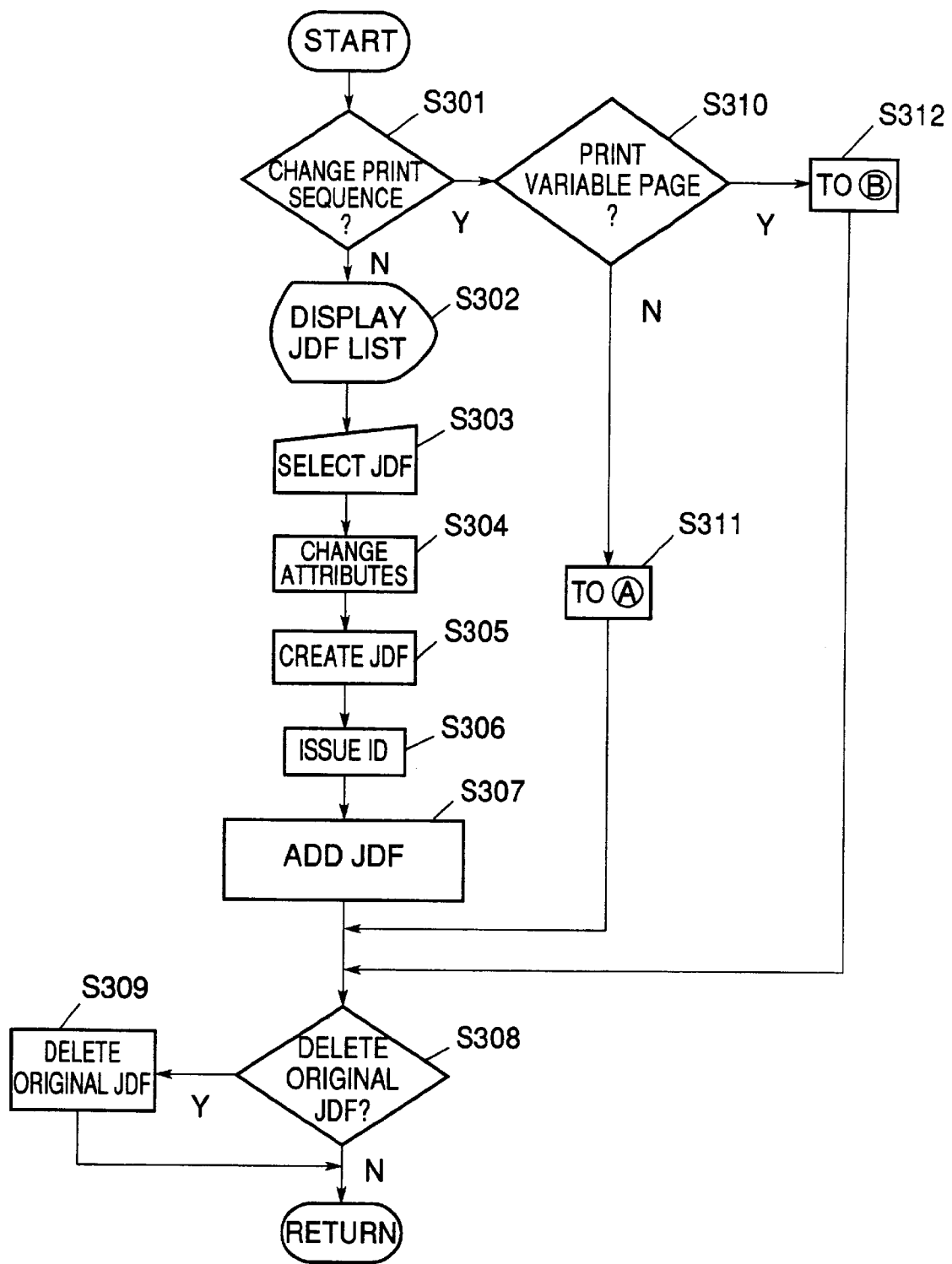
FIG. 18 is a flowchart showing the JDF edit routine.

When the routine shown in FIG. 19 ends, control returns to S308 in FIG. 18. In this step, the original job description file is deleted if so specified.

Referring now to FIG. 18, the "variable page print mode" will be described in the following.

Figure 20:
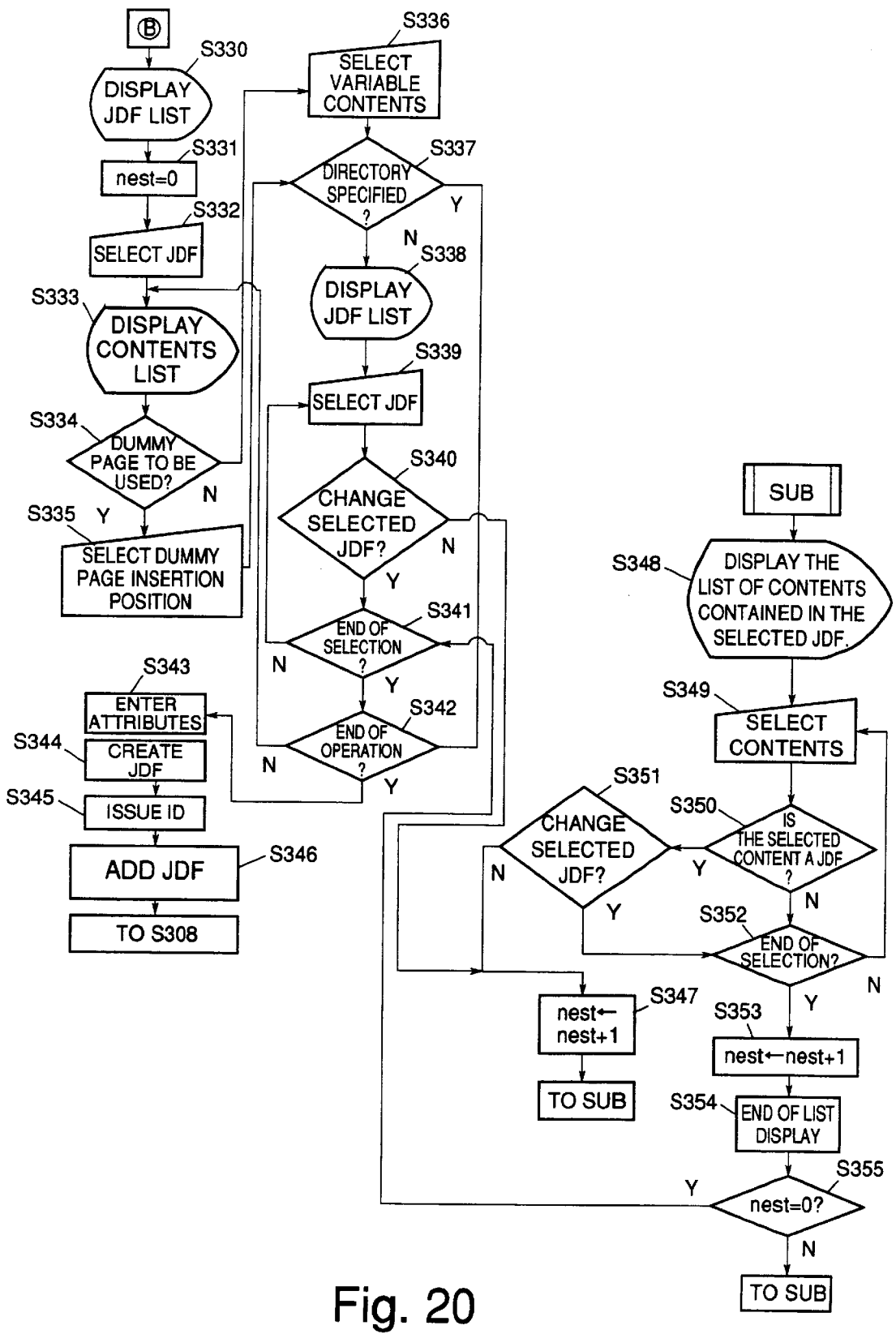
FIG. 20 is a flowchart showing the JDF edit routine.

When the routine finds that the selected mode is the variable page print mode in S301 and S310, it executes S312 and passes control to the routine shown in FIG. 20.

In S330, a list of saved job description files appears on the display. In S331, the variable "nest" is initialized to 0. In S332, the operator selects a job description file to be edited. Then, in S333, a list of contents referenced by the selected job description file appears on the display.

In S334, the routine checks if a dummy page, described later, will be used. If such a dummy page is used, the operator selects a position at which to insert the dummy page in S335. If the routine finds in S334 that no dummy page will be used, it requests the operator to select variable contents (described later) in S336. A dummy page is a blank page for insert printing, while a variable content is a page to be replaced. An example of how to use a dummy page and a variable content will be described later in detail.

In S337, a check is made to see if replacement contents will be specified by a directory. When specifying replacement contents with a directory, the operator enters a directory name. In S342, the routine checks if the operation ends. When the operation ends, an attribute such as the number of print copies is entered in S343. In S344, the routine creates a new job description file based on the editing that has been done so far. In S345, the routine assigns new contents IDs and unique IDs to the new job description file and, in S346, adds the new job description file to the contents management table 92. The routine then passes control to S308 in FIG. 18. Note that when the operator selects to continue operation in S342, the steps beginning with S333 are repeated.

When no directory is specified in S337, a list of job description files is displayed in S338 to allow the operator to select a content to be replaced. In S339, the operator selects a job description file from the displayed list. In S340, the routine checks if the selected job description file is a replacement content. If the selected job description file is a replacement content, the routine checks, in S341, if the selection ends. The steps are repeated beginning with S339 if necessary. When the routine finds that the selection has ended in S341, the steps beginning with S342 are executed.

On the other hand, if the operator specifies in S340 that the selected job description file is not a replacement content, but a content referenced by that job description file is a replacement content, the variable "nest" is incremented by 1 in S347 and the steps are executed beginning with S348.

In S348, a list of contents contained in ContentsIDs of the job description file selected in S339 is displayed. In S349, the operator selects a content and, in S350, the routine checks if the selected content is a job description file. In S351 if it is a job description file, the routine checks if the selected job description file is a replacement content and, if so, checks in S352 if the operator has ended selection. If the operator has not yet ended selection, the routine repeats the steps beginning with S352. On the other hand, if the operator specifies in S352 that the operation has ended in S353, the routine decrements the variable "nest" by 1 and, in S354, ends the display of a list of contents. In S355, the routine checks if the variable "nest" contains 0. If the variable "nest" dose not contain 0, the steps are executed beginning with S348. If the variable "nest" contains 0, that is, if control returns to the initial job description file, the steps are executed beginning with S341.

In S351, if the selected job description file is not a replacement content, the variable "nest" is decremented by 1 in S347 to execute the steps beginning with S348 to select the lower level contents.

The processing mode described above allows the operator to specify a hierarchically-structured job description file or page data as a variable content and then to specify the number of print copies. As described below, the system prints pages while changing the sequence of contents according to the sequence selected as described above.

Next, referring to FIG. 21, the "print attribute change mode" will be described.

Figure 21:
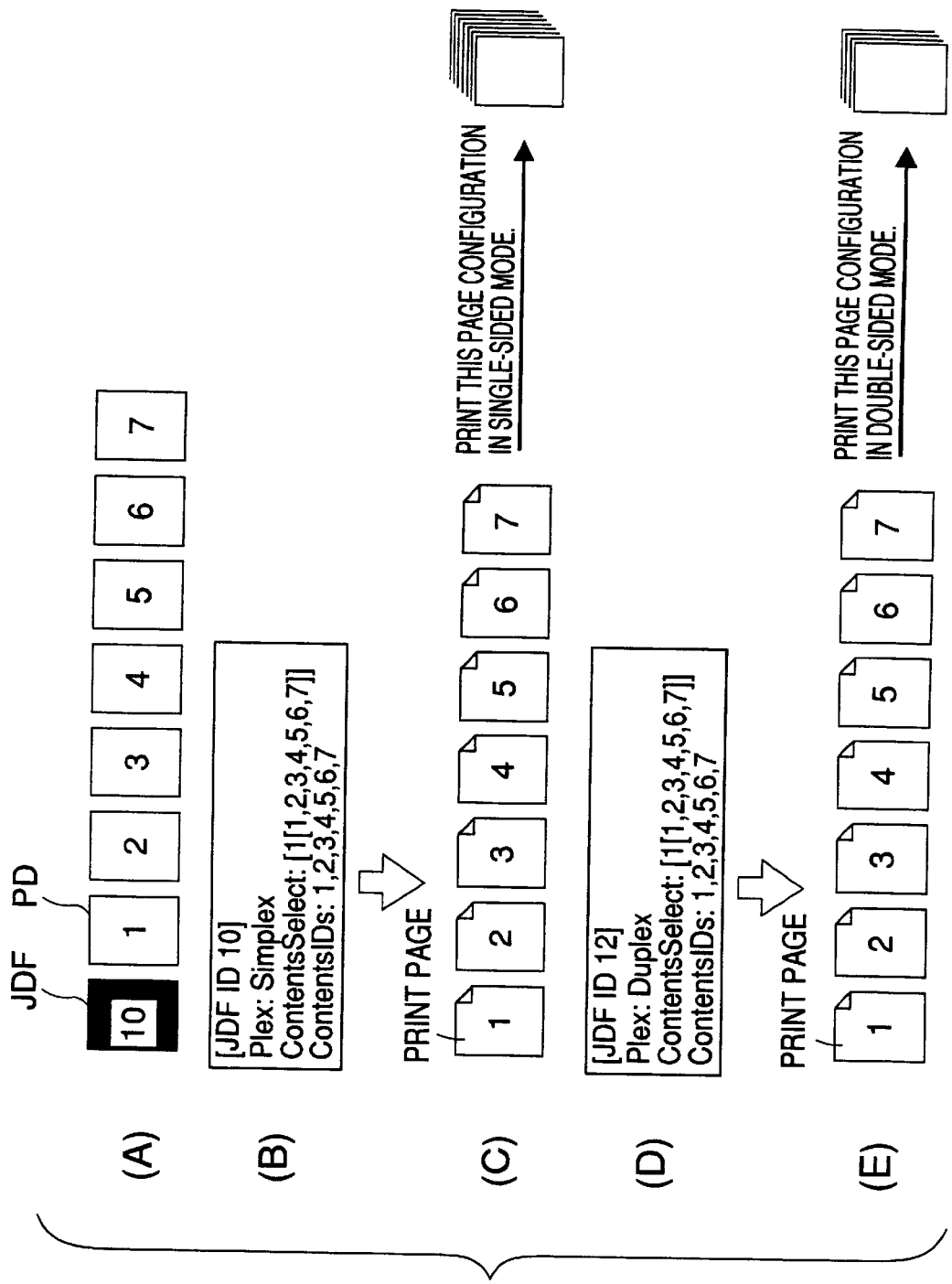
FIG. 21 is a diagram showing how attributes are changed during JDF editing.

In FIG. 21, (A) shows a job description file and the page data of each page. (B) shows the contents of the job description file with JDF ID 10. In this example, the job description file specifies single side printing. Execution of the job description file shown in (B) produces the pages printed in single-sided mode as shown in (C).

(D) shows a job description file created by editing (modifying) the job description file with JDF ID 10 in the print attribute change mode. In this job description file, the print mode has been changed from single-sided to double-sided. Execution of this job description file produces the pages printed in double side printing mode as shown in (E). The use of the print attribute change mode allows the user to change any desired print attribute.

Figure 22:
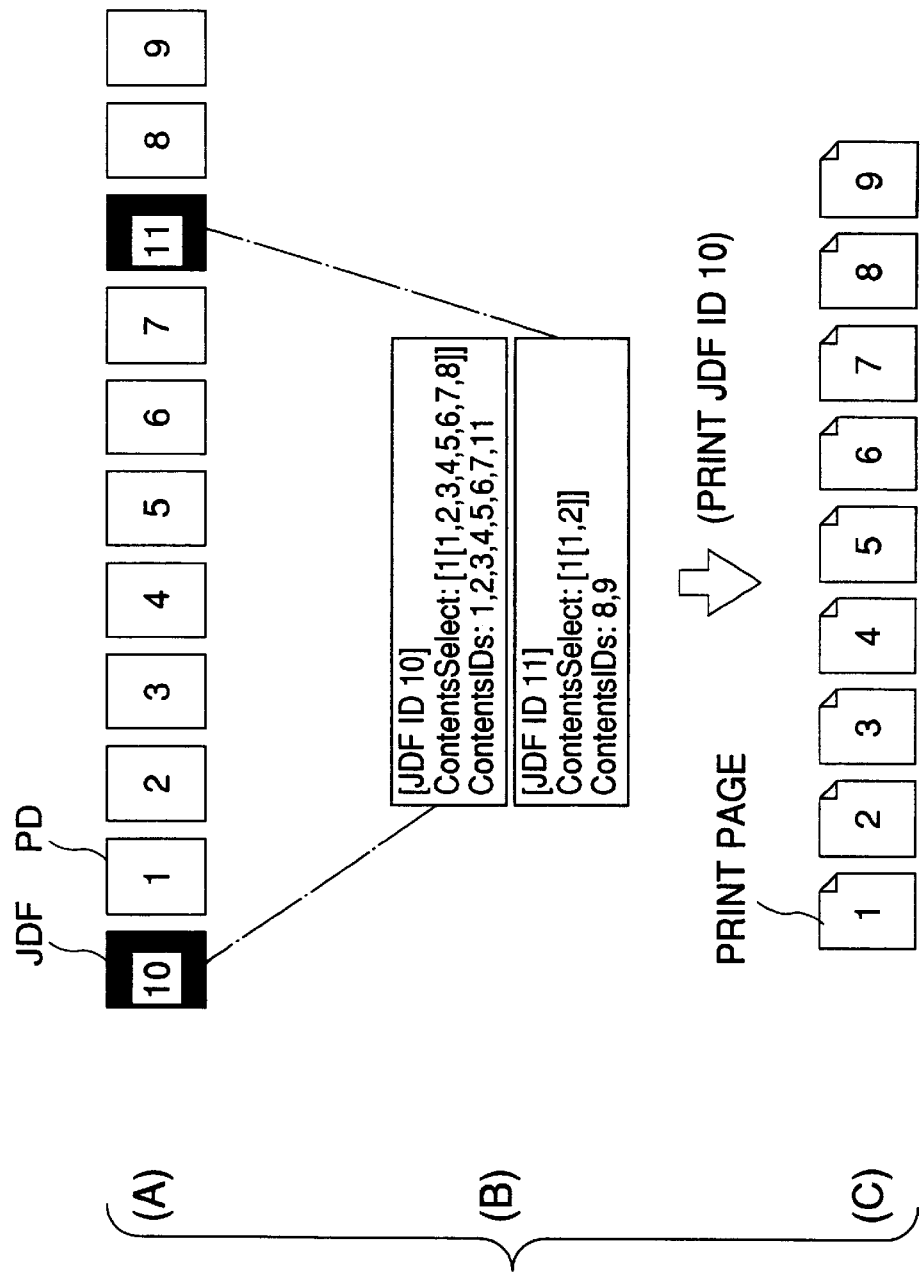
FIG. 22 is a diagram showing the state before JDF editing.
Figure 23:
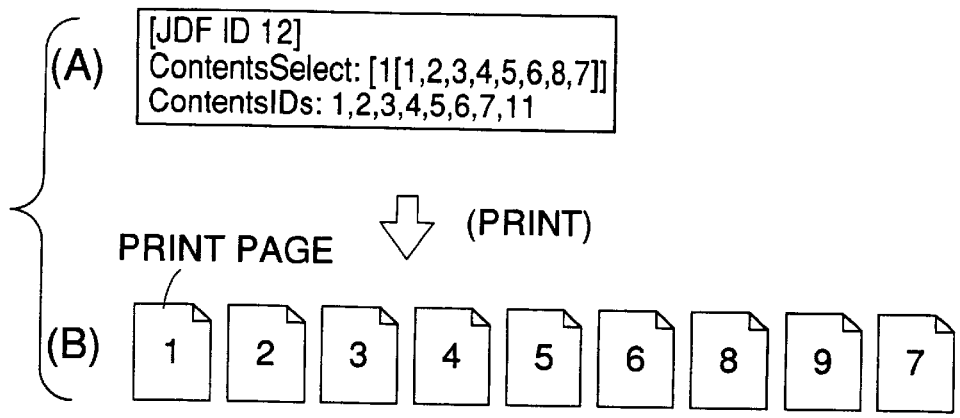
FIG. 23 is a diagram showing how pages are printed in any desired sequence.

Referring to FIGS. 22 and 23, the "any-page sequence print mode" will be described.

FIG. 22 shows the state before file editing. That is, (A) shows the configuration of the print job and (B) shows the contents of the job description files (JDF ID 10 and JDF ID 11) contained in the print job. Execution of the job description file with JDF ID 10 produces the pages printed as shown in (C).

FIG. 23 (A) shows the job description file with JDF ID 12 which was created by changing the print method of the job description file with JDF ID 10 shown in FIG. 22 (B). As shown in the figure, the last two in-file numbers in the ContentsSelect field are changed and, therefore, the pages shown in FIG. 23 (B) are printed in a different sequence. Because the content corresponding to the in-file number 8 is the job description file with JDF ID 11 shown in FIG. 22 (B), pages 8 and 9 precede page 7.

Figure 24:
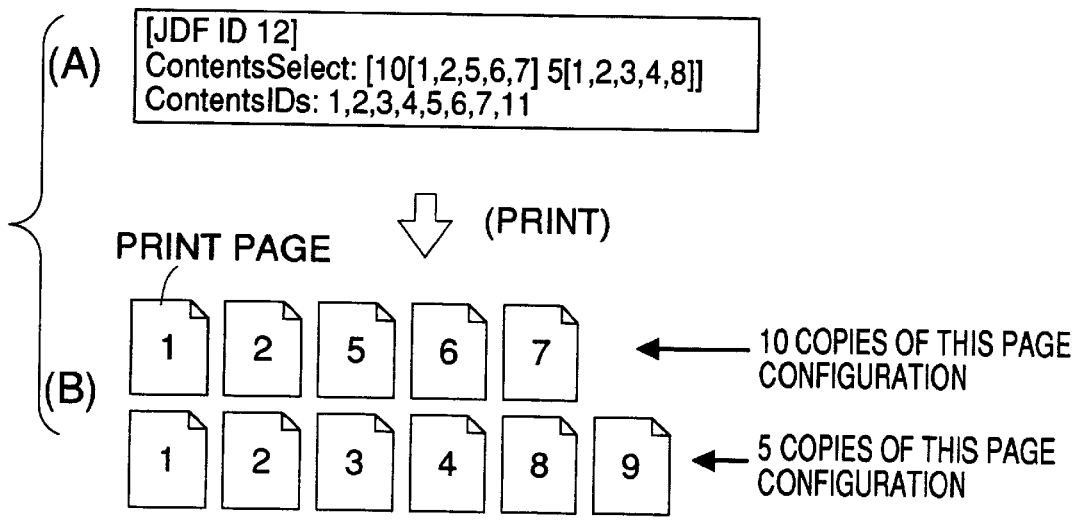
FIG. 24 is a diagram showing how a plurality of copies are printed.

FIG. 24 shows an example of "multiple-copy print mode". As shown in FIG. 24 (A), the job description file with JDF ID 12 shown in FIG. 24 (A) was created from the job description file with JDF ID 10 shown in FIG. 22 (B). In this job description file, the contents of the ContentsSelect field have been changed; that is, the number of print copies 10 and 5 are specified for each contents group.

Execution of JDF ID 12 prints 10 copies of pages 1, 2, 5, 6, and 7, followed by 5 copies of pages 1, 2, 3, 4, 8, and 9, as shown in FIG. 24 (B).

Figure 25:
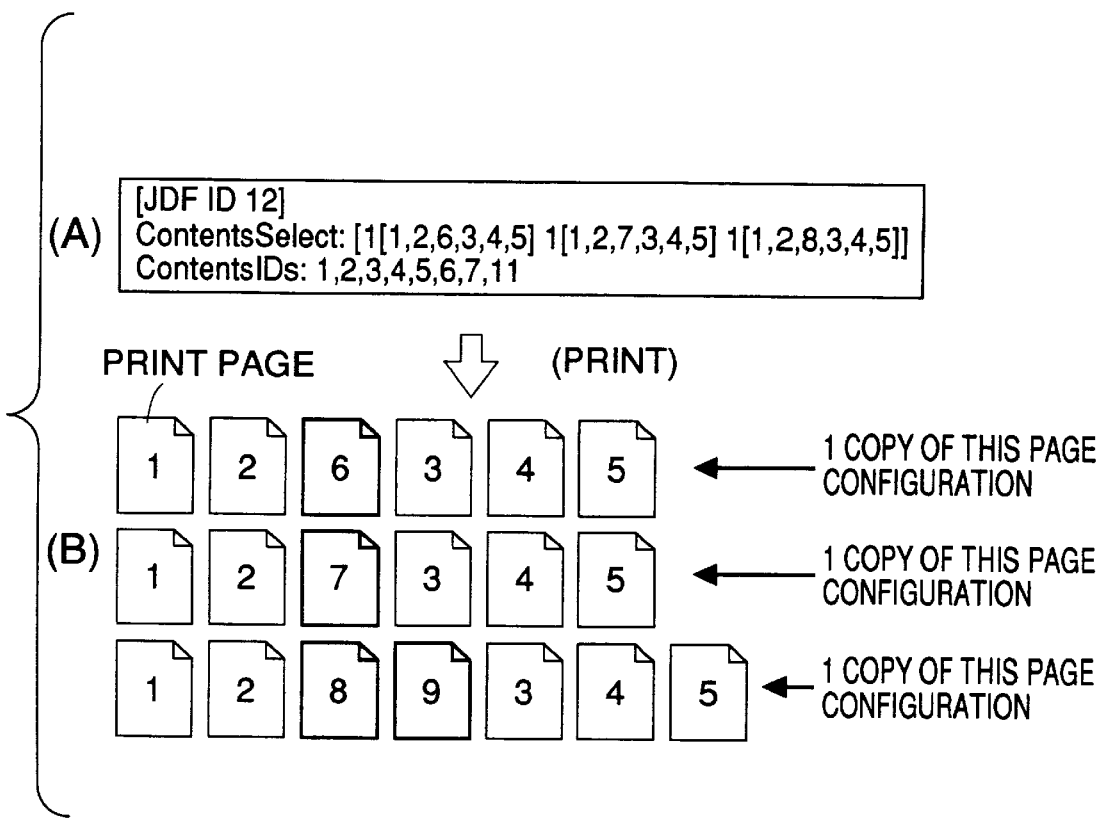
FIG. 25 is a diagram showing an example of a print operation in which a plurality of copies are printed in any desired sequence.

FIG. 25 shows an example of a combination of the "any-page sequence print mode and the multiple-copy print mode". Execution of the print job JDF ID 12 shown in FIG. 25 (A) produces the pages printed as shown in (B). This print result may also be achieved by the "variable page print mode" described below.

FIGS. 26–30 show some examples of printing in the variable page print mode.

Figure 26:
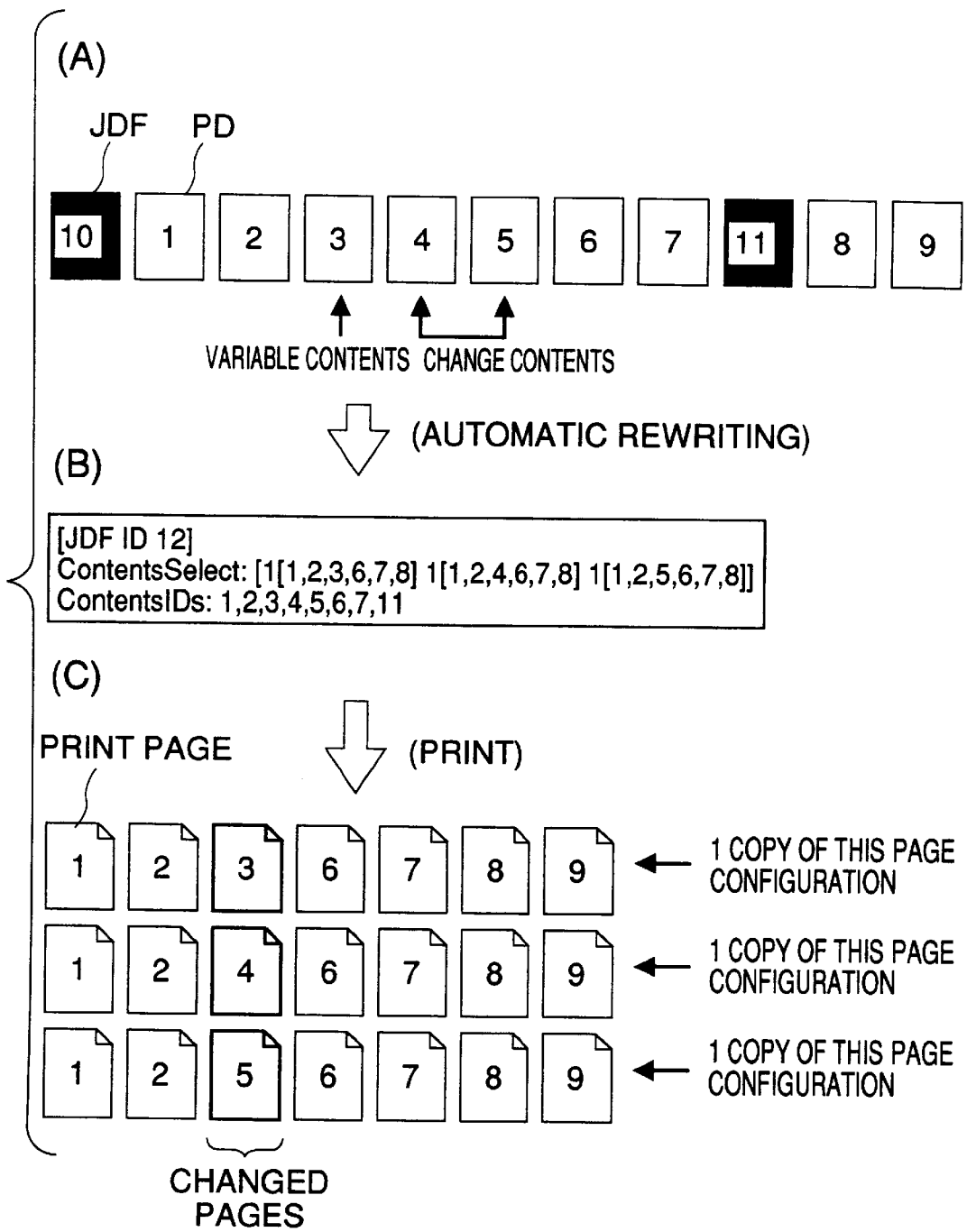
FIG. 26 is a diagram showing the first example of variable page printing.

FIG. 26 shows the variable page print mode using variable contents. As shown in FIG. 26 (A), the operator specifies a particular content from the list of contents shown on the display 106 as a variable content and then selects one or more replacement contents for this variable content. Then, the job description file with JDF ID10 shown in FIG. 22 (B) is changed and a new JDF ID12 is created automatically.

Execution of a job description file shown in FIG. 26 (B) produces the pages shown in FIG. 26 (C). The pages containing the variable content are printed first, followed by the pages where the variable content has been replaced by replacement contents.

Figure 27:
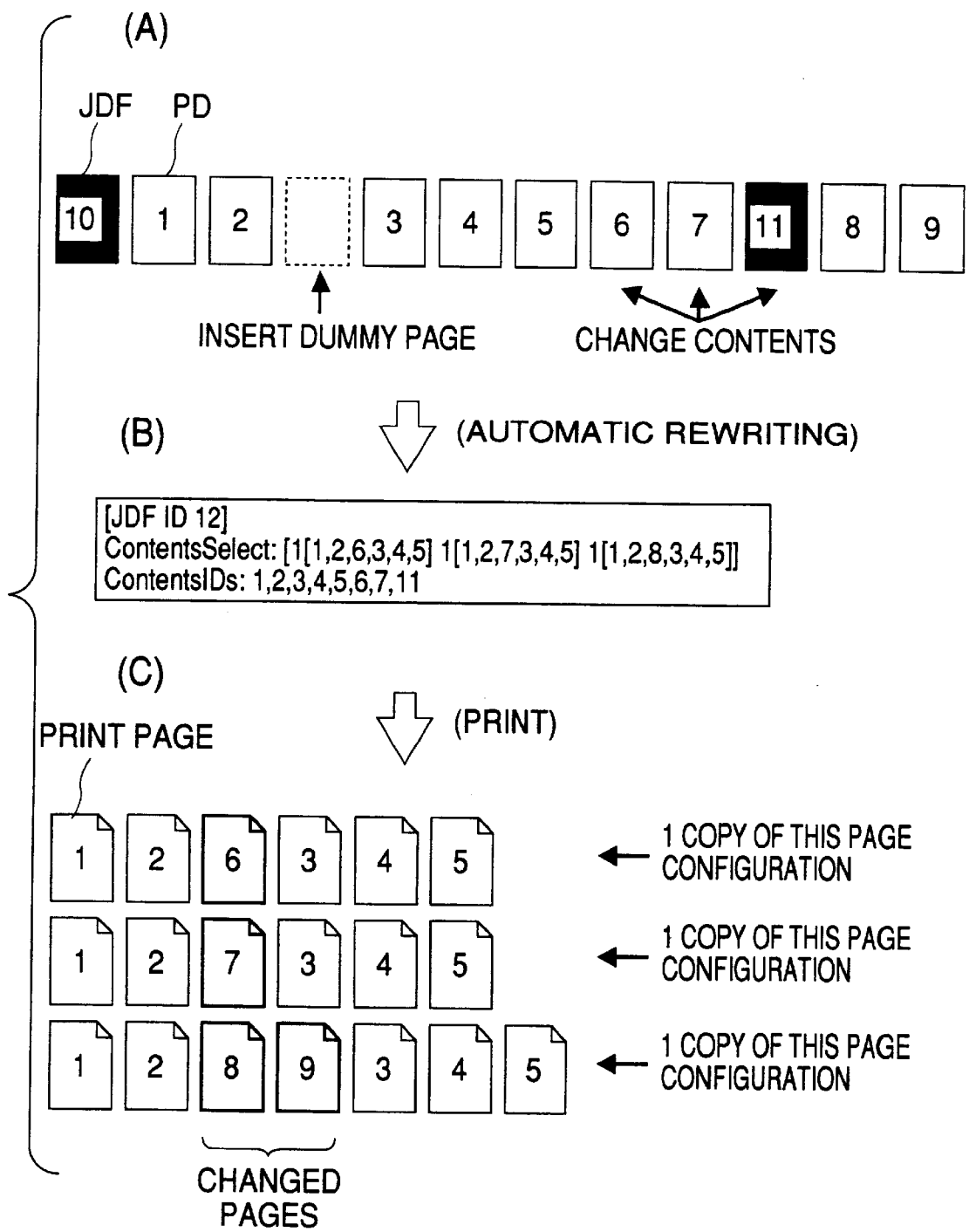
FIG. 27 is a diagram showing the second example of variable page printing.

FIG. 27 shows an example of printing in the "variable page print mode" using a dummy page. As shown in FIG. 27 (A), when the operator specifies a position at which a dummy page is to be inserted, a dummy page is inserted at that position. The operator then sequentially selects the replacement contents for the dummy page. As shown in FIG. 27 (B), this automatically creates a new job description file with JDF ID12 from the job description file with JDF ID10 shown in FIG. 22 (B).

Execution of the job description file shown in FIG. 27 (B) produces the pages shown in FIG. 27 (C). This is the same as that shown in FIG. 26 (C).

A variable content itself appears in the first group, whereas a dummy page is not printed at all but is replaced by a replacement content.

Figure 28:
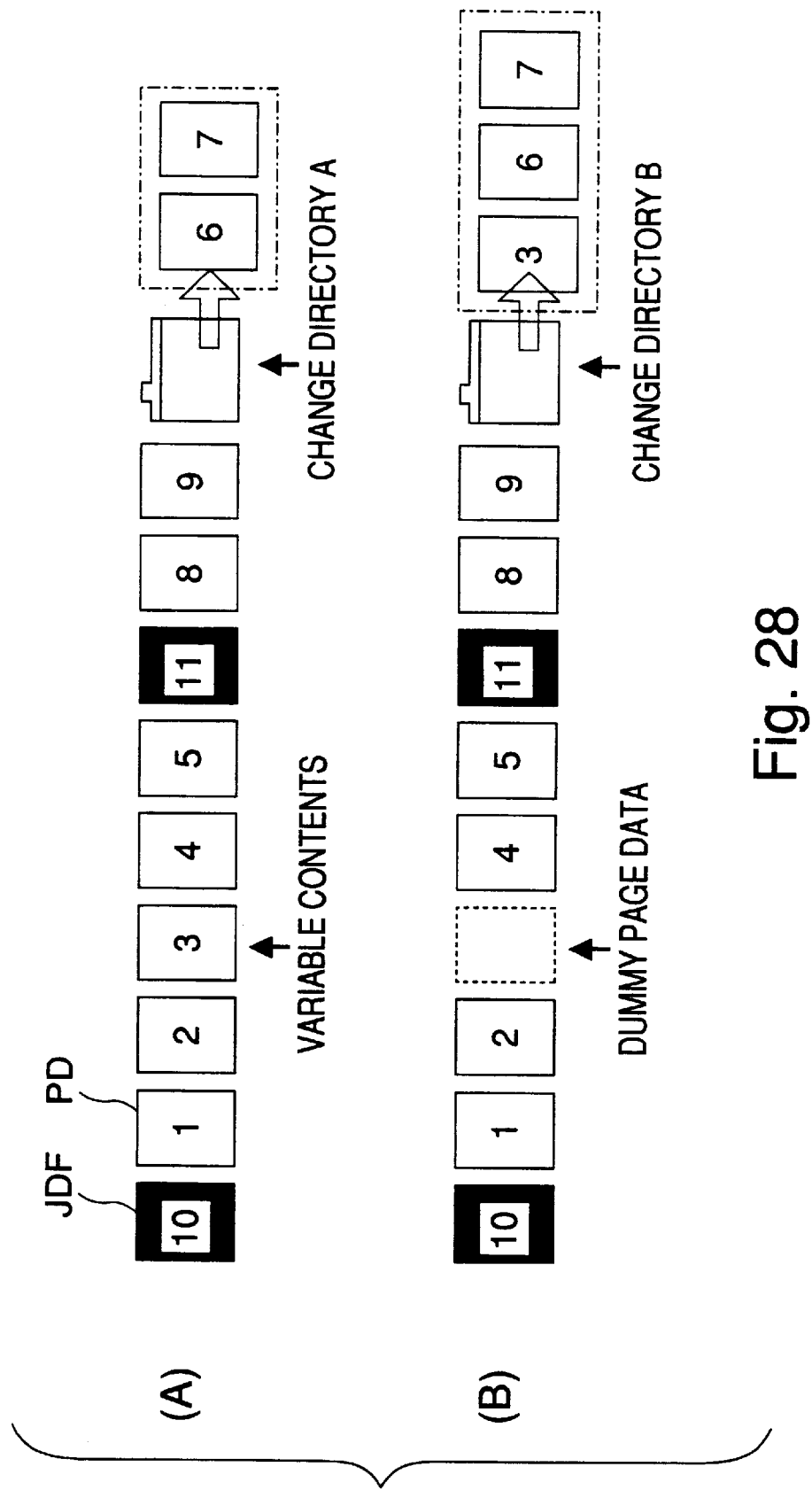
FIG. 28 is a conceptual diagram showing the third example of variable page printing.
Figure 29:
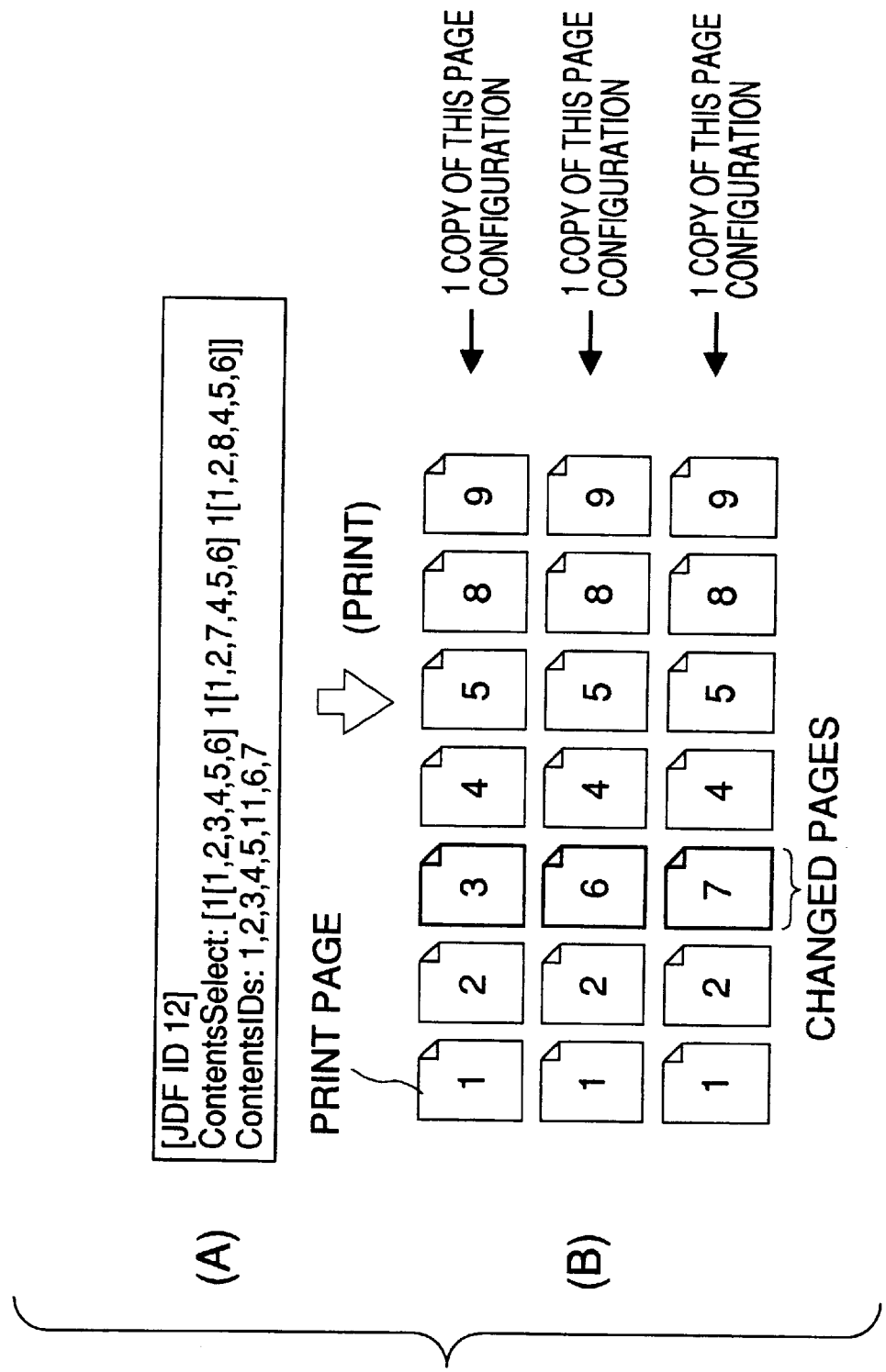
FIG. 29 is a diagram showing the execution result of the third example of variable page printing.

FIGS. 28 and 29 show some examples of printing in the "variable page print mode" in which a replacement directory is used. As shown in FIG. 28 (A), with a particular content as a variable content, the operator specifies replacement directory A containing a content which will replace the variable content.

Also, as shown in FIG. 28 (B), the operator specifies a position at which a dummy page is to be inserted and, at the same time, replacement directory B containing a content to be inserted at that position.

FIG. 29 (A) shows the contents of a new job description file created automatically when a variable content and a dummy page are specified as shown in FIGS. 28 (A) and (B). This job description file with JDF ID12 was created from the job description file with JDF ID10 shown in FIG. 22 (B). The same job description file is created for the examples shown in FIGS. 28 (A) and (B).

Execution of this job description file produces the pages shown in FIG. 29 (B). That is, when a variable content is used, the pages including that variable content are printed first, followed by the pages with the variable content replaced with a content from the replacement directory A, one at a time.

This is the same for a dummy page. That is, a content is read from the directory B, one at a time, for insertion in the dummy page position.

Figure 30:
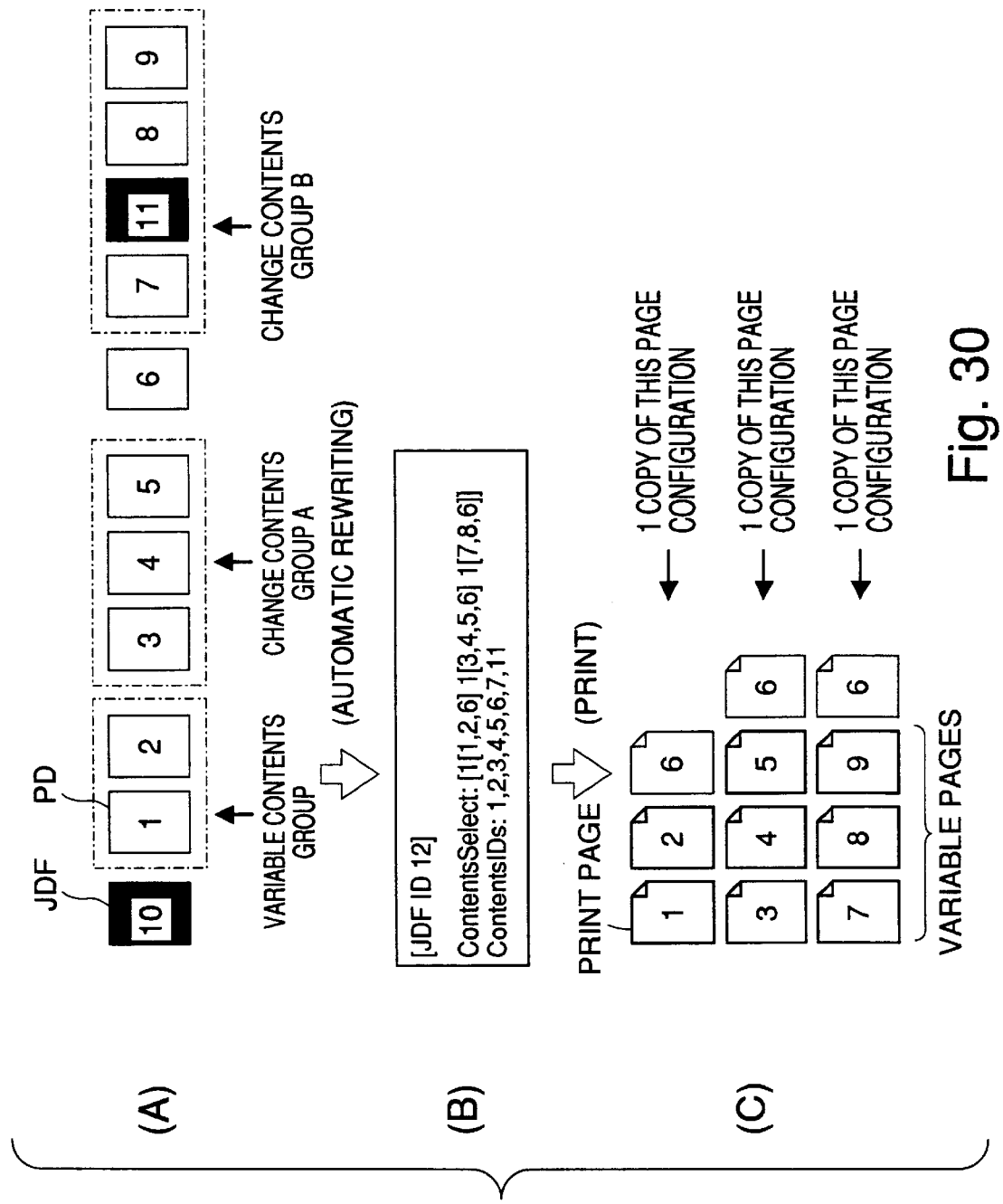
FIG. 30 is a diagram showing the fourth example of variable page printing.

FIG. 30 shows an example of printing in the "variable page print mode" using a variable content group. With a list of contents on the display, as shown in FIG. 30 (A), the operator specifies a variable content group and one or more replacement content groups. This variable and replacement contents, specified by the operator, automatically creates a new job description file with the JDF ID12 from the job description file JDF ID10 shown in FIG. 22 (B). This new job description file includes the changes specified by the contents groups shown in FIG. 30 (A).

Execution of this job description file produces the pages shown in FIG. 30 (C). That is, the pages containing the variable contents group are printed first, followed by the pages with variable contents replaced sequentially by other contents groups.

As described above, this embodiment gives the user the job description file editing function enabling him to print data in a variety of ways while allowing him to re-use saved page data unchanged.

(4) Job combination routine

Figure 31:
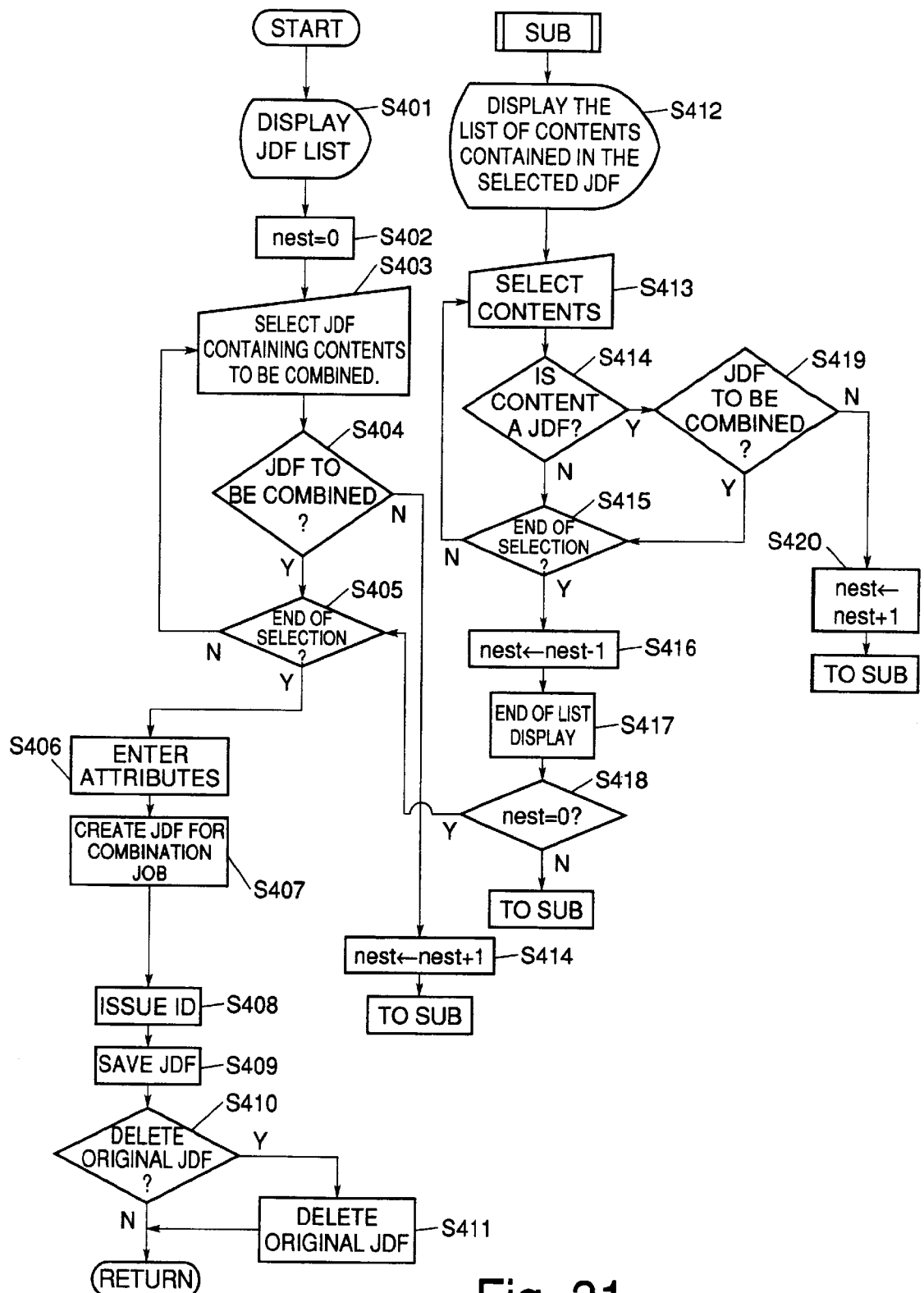
FIG. 31 is a flowchart showing the job combination routine.

Referring now to FIG. 12, the following explains the job combination routine with the use of FIG. 31. When the operator selects a job combination, a list of saved job description files appears on the display in S401. In S402, the variable "nest" is initialized to 0.

In S403, the operator selects, via the input unit 110, a job description file containing content to be combined into the original job description file. In S404, the operator checks if the selected job description file is a content to be combined; if so, he specifies in S405 whether to continue selection.

When the operator specifies that selection be continued, the steps beginning with S403 are executed. On the other hand, when the operator specifies that selection be ended, he enters the attributes such as the number of print copies in S406. In S407 a new job description file into which selected contents are combined is created. In S408, contents IDs and unique IDs are issued to the new job description file and, in S409, the new job description file is added to the contents management table 92. In S410, the routine asks the operator whether to delete the original job description file. The routine deletes the original job description file in S411 if so requested by the operator.

If, in S404, the operator specifies that the selected job description file not be combined, the variable "nest" is incremented by 1 in S414 and the steps beginning with S412 are executed.

In S412, a list of contents contained in the selected job description file is displayed. In S413, the operator selects a content from the list via the input unit 110. The operator checks if the selected content is a job description file or page data in S414. If it is a job description file, the operator checks, in S419, if the selected job description file is to be combined. If the operator specifies that the job description file is to be combined, the routine asks whether to end the selection in S415. If the operator specifies that the selection be continued, the steps beginning with S413 are executed. On the other hand, if the operator specifies that the selection be ended, the variable "nest" is decremented by 1 in S416 and, in S417, a list of contents disappears. In S418, a check is made to see if the variable "nest" contains 0. The value of 0, if stored in the variable "nest", means that control is returned to the first level of the hierarchical structure. In this case, the steps are executed beginning with S405.

If in S419 the operator specifies that the selected job description file not be combined, the variable "nest" is incremented by 1 in S420 and the steps are executed beginning with S412.

The above steps eventually find a content to be combined within the hierarchy, and a new job description file containing that content is created.

Figure 32:
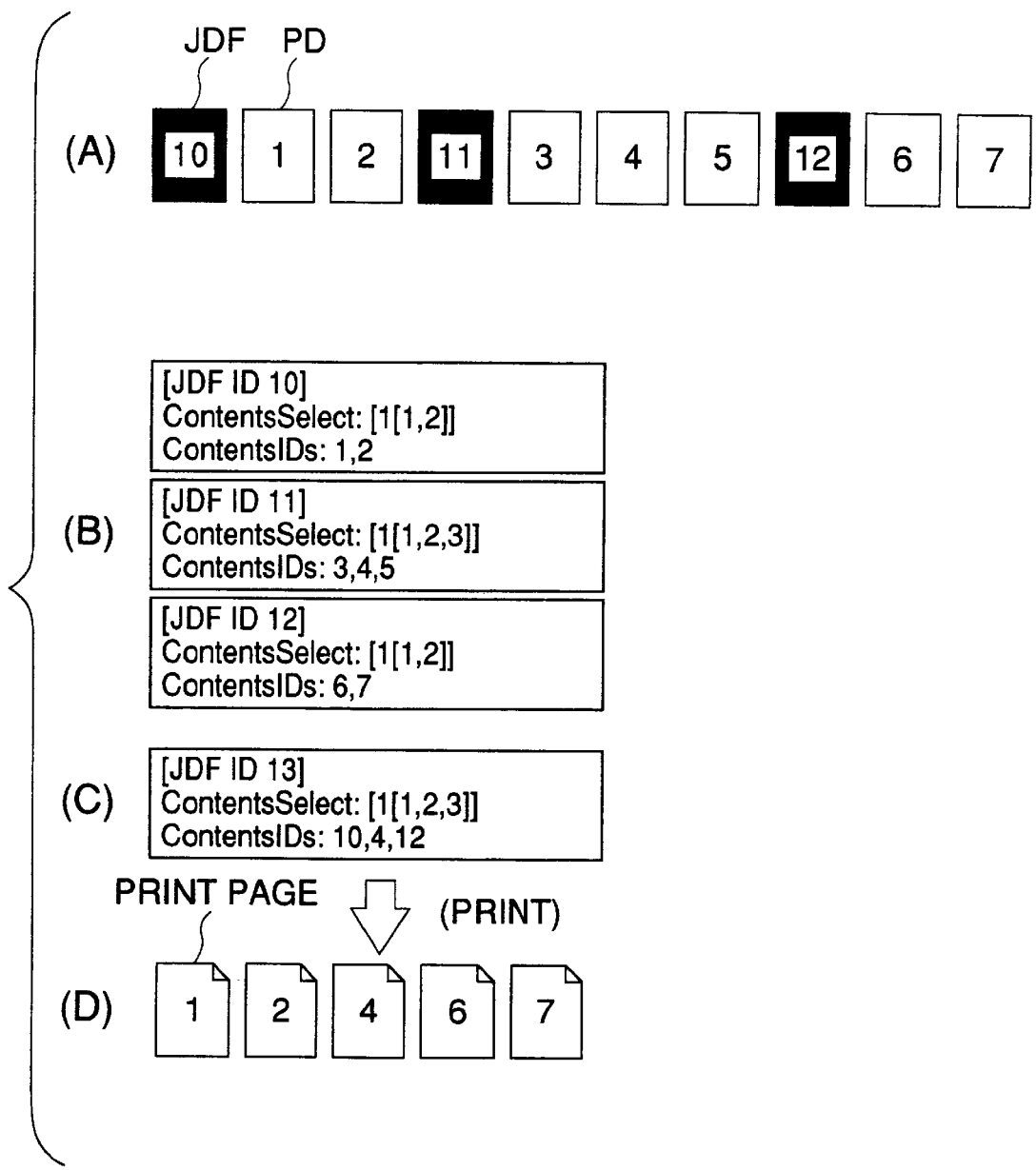
FIG. 32 is a diagram showing an example of job combination.

Referring now to FIG. 32, an example of job combination will be described.

FIG. 32 (A) shows the configuration of a print job used in this example. This print job has three job description files and seven pages of page data. FIG. 32 (B) shows the contents of each job description file. In this situation, if the page data with the page ID4 and the job description file with the JDF ID12 are combined into the job description file with the JDF ID10, a new job description file with the JDF ID13 is created as shown FIG. 32(C). FIG. 32 (D) shows the pages produced by executing the new job description file containing combined contents.

(5) Contents deletion routine

Figure 33:
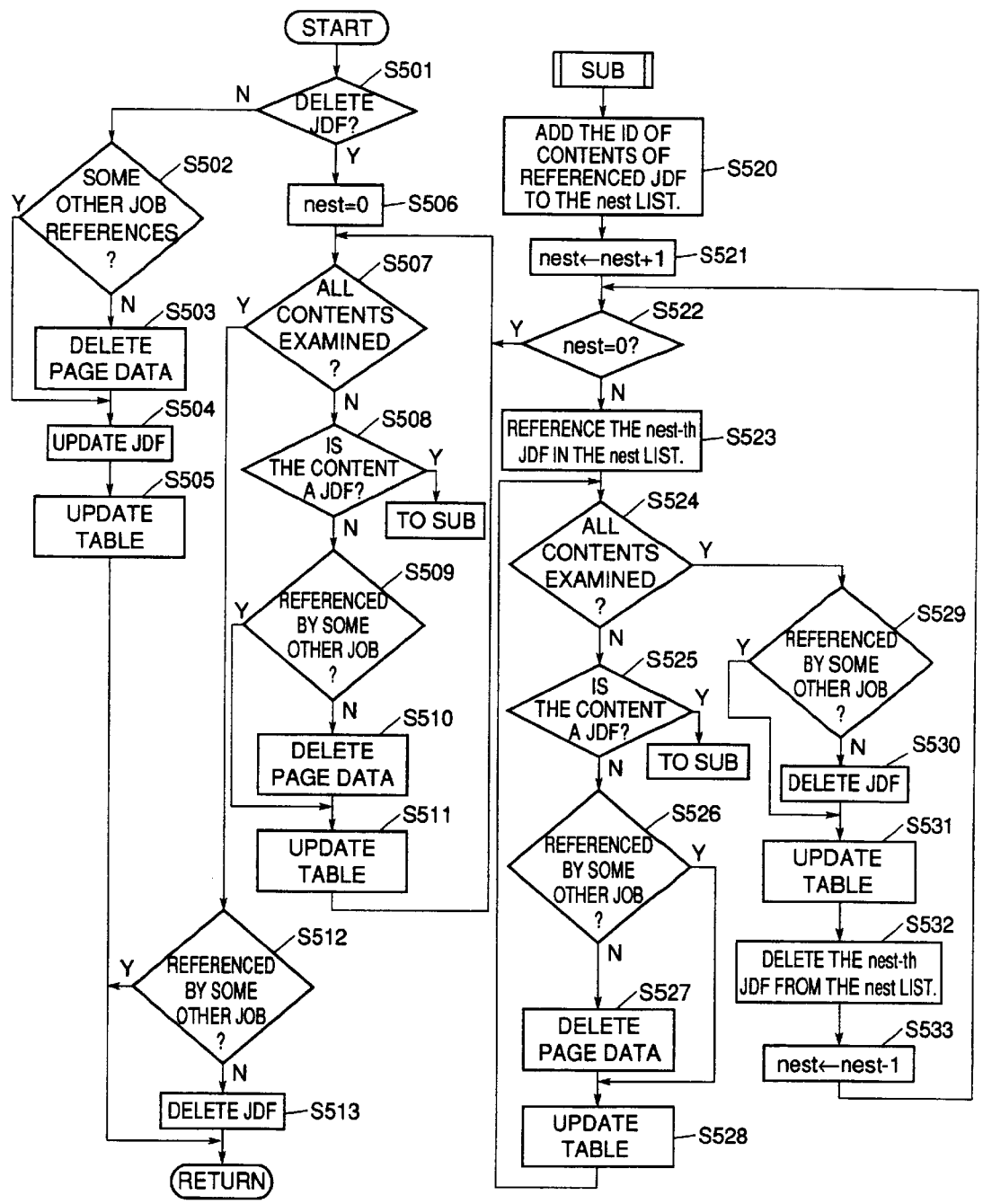
FIG. 33 is a flowchart showing the contents deletion routine.

Referring now to FIG. 12, the following explains the contents deletion routine with the use of FIG. 33. This contents deletion routine is executed when the operator enters a contents deletion request from the input unit 110. As described below, whether to delete contents depends on the reference relationship among the contents.

When the operator instructs the routine to delete page data described in a job description file, the routine confirms, in S501, that page data is to be deleted, and references the contents management table 92 in S502 to check if another job description file references the page data. If no job description file references the page data, the routine deletes the page data from the data memory 80 in S503, changes the relevant fields (ContentsIDs, ContentsSelect) of the current job description file in S504 to update it. In S505, the routine updates the contents management table 92. On the other hand, if it is found in S502 that there is another job description file referencing the page data, the routine does not delete the page data and, in S504 and S505, updates only the job description file and the contents management table.

When the operator instructs the routine to delete a job description file, the routine confirms, in S501, that the job description file is to be deleted and initializes the variable "nest" to 0 in S506. In S507, the routine checks if the check has already been made to see if it is possible to delete all the contents from the job description file. If the check is not yet made, the routine checks if the content to be checked is a job description file in S508. If the content is page data, the routine checks, in S509, if another job description file references the page data. If there is no such job description file, the routine deletes the page data in S510 and, at the same time, updates the contents management table 92 in S511. On the other hand, when it is found in S509 that another job description file references the page data, the routine does not delete the page data but only updates the contents management table 92 in S511. The processing is then repeated beginning with S507.

If it is found in S507 that the check has already been made for all the contents of the job description file to be deleted, the routine checks, in S512, if there is a parent job description file referencing the job description file to be deleted. If there is no such job description file, the routine deletes the job description file in S513, while if there is such a job description file, the routine does not delete the job description file and ends processing.

In S508, if it is found that the job description file to be deleted contains another job description file (child job description file), the routine executes the steps beginning with S520 to check the contents contained in that child job description file.

First, in S520, the routine adds the contents ID of the job description file, found in S508, to the nest list. In this case, the routine adds the contents ID of the job description file to be deleted as the 0-th entry of the nest list and adds the contents ID of the job description file found in S508 as the nest-th entry. In S521, the variable nest is incremented by 1.

In S522, the routine checks if the variable "nest" contains 0. If it does not contain 0, in S523 the routine references the nest-th job description file in the nest list to check the contents contained in that job description file.

In S524, the routine checks if all the contents have been examined and, in S525, checks if the content is a job description file. If it is found in S525 that the content is a job description file, the steps are executed again beginning with S520. On the other hand, if it is found that the content is page data, the routine checks, in S526, if there is another job description file referencing the page data. If there is no such job description file, the routine deletes the page data in S527 and updates the contents management table 92 in S528. If it is found in S526 that there is a job description file referencing the page data, the routine does not delete the page data but updates the contents management table 92 only. The steps beginning with S524 are repeated.

If it is found in S524 that all the contents referenced by the nest-th job description file have been examined, the routine checks, in S529, if there is another job description file (other parent job description file) referencing the job description file. If there is no such job description file, the routine deletes the job description file in S530 and updates the contents management table 92 in S531. On the other hand, if it is found in S529 that there is another job description file referencing the job description file, the routine does not delete the job description file but updates only the contents management table 92 in S531. The routine then deletes the contents ID of the nest-th job description file from the nest list, decrements the variable "nest" by 1 in S533, and repeats the steps beginning with S522. When all the contents are checked, control is passed from S522 to S507.

As described above, the contents deletion routine deletes page data only when there is no job description file referencing the page data. And, the routine deletes a job description file only when the contents of that job description file are not referenced by another job description file. This allows the operator to delete contents even when they are shared.

Figure 34:
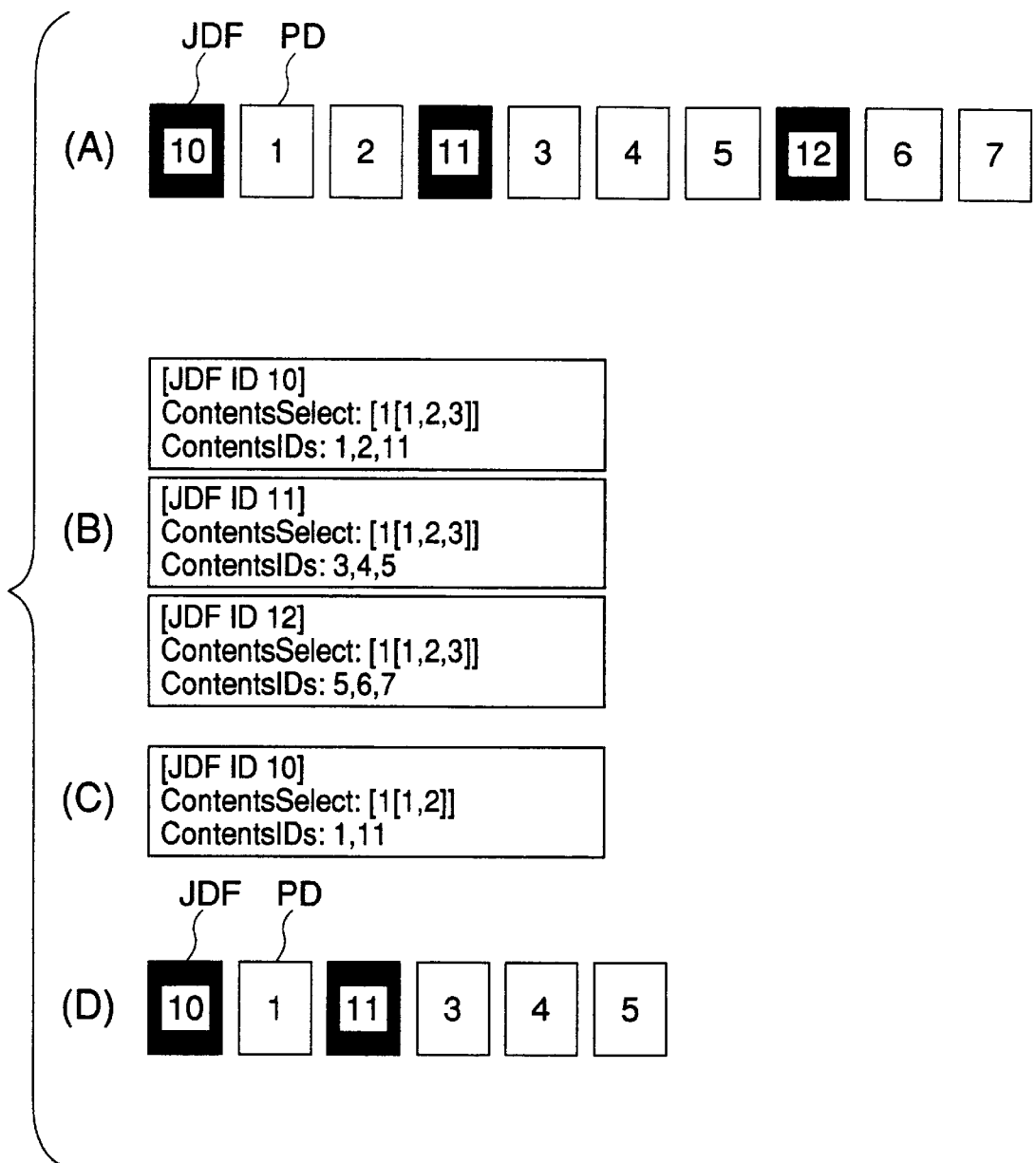
FIG. 34 is a diagram showing an example of contents deletion.

FIG. 34 shows an example of contents deletion. (A) shows the job configuration, and (B) shows the contents of each job description file.

Assume that page data with contents ID2 is deleted from the job description file with JDF ID10 and that the job description file with the JDF ID12 is deleted.

This deletion results in the job description file JDF ID10 being changed as shown in (C) and the job configuration as shown in (D). That is, page data with contents ID2 and the job description file with JDF ID12 have been deleted.

(6) Archive routine

Figure 35:
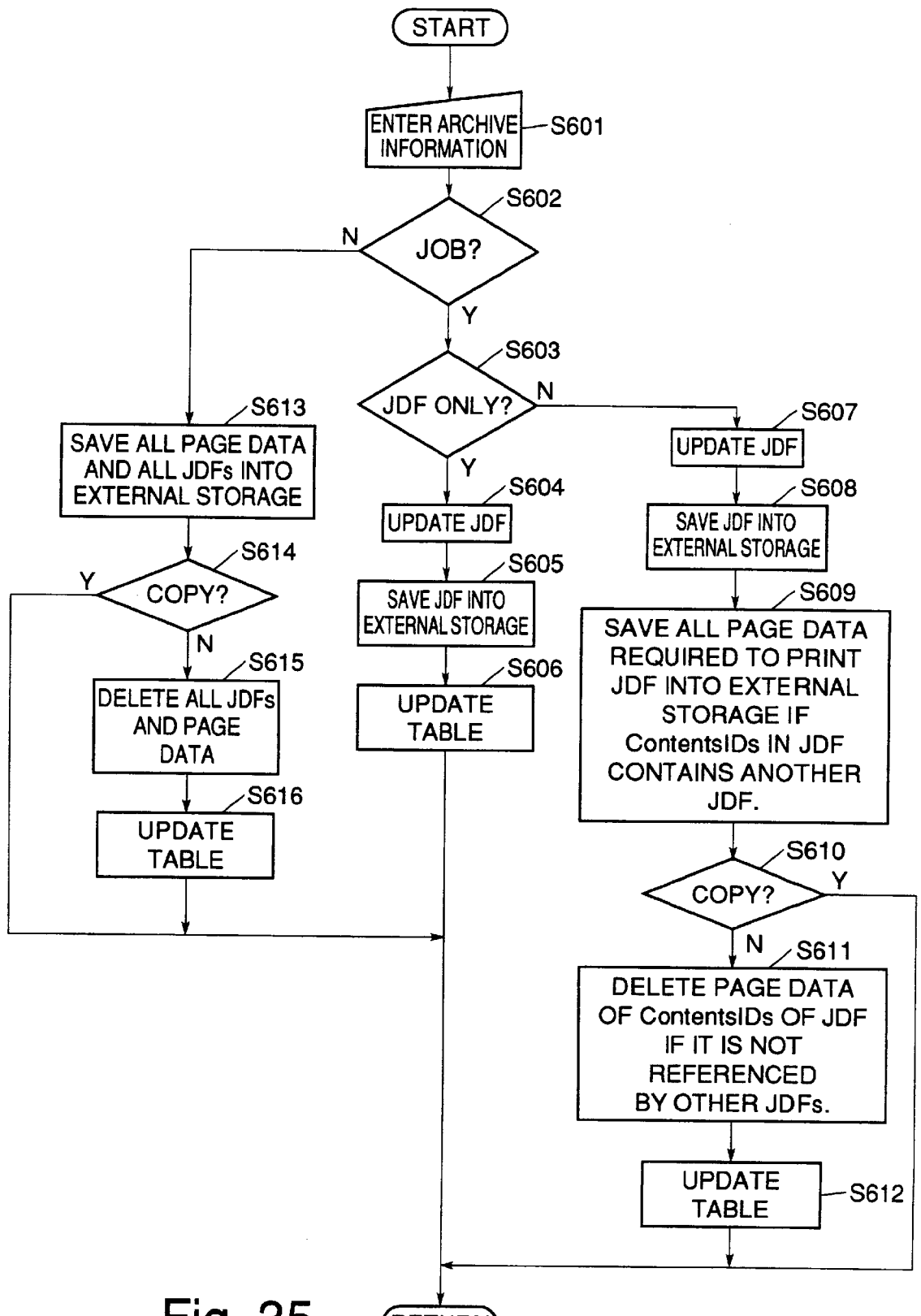
FIG. 35 is a flowchart showing the archive routine.

Referring now to FIG. 12, the following explains the archive routine with the use of FIG. 35.

When the operator requests execution of archiving via the input unit 110, the archive routine shown in FIG. 35 is executed. The operator can select one of three archive modes: job basis archive, job description file basis archive, and all data archive.

When the operator selects the job basis archive mode, he enters archive information from the input unit 110 in S601. The archive information the operator enters includes comments, keywords, etc. The archive execution date is automatically included in the archive information. Old archive information, if any, is overwritten. This archive information is used to check the comments or to retrieve keywords when the archive data in external system is restored to the local system.

When the routine finds that the operator has selected the job basis archive mode in S602 and S603, it updates the job description file in S607. More specifically, it changes the content IDs contained in the ContentsIDs field of the job description file to the corresponding unique IDs. In this case, the routine references the contents management table 92 to identify the correspondence between content IDs and unique IDs.

In S608, the routine saves the updated job description file in the external storage 116. At this time, the routine also sends all the contents in the first hierarchical level in that job description file to the external storage 116.

In S609, if the first hierarchical level content contains a job description file, the routine sends the content contained in that job description file recursively to the external storage 116. As a result, all the data pages required for the print job to be executed are sent to the external storage 116. For the data pages in the second level or higher, only data is sent and IDs are not changed.

In S610, the routine checks the archive mode to see if it is the copy mode or the move mode. In the copy mode, the job description file to be archived and all the contents referenced by the job description file are copied, with the contents in the internal storage saved unchanged. In the move mode, out of the contents in the first hierarchical level referenced by the job description file to be archived, only the page data not referenced by another job description file is deleted from the internal storage, as shown in S611, and in S612, the contents management table 92 is updated. When the content is a job description file, it is not deleted.

When the operator requests to archive only a job description file, the routine finds, in S602 and S603, that the operator has selected the job description file basis archive mode and, in S604, sends the job description file with archive information to the external storage 116. In this case, the routine changes the contents IDs contained in the job description file to the corresponding unique IDs and saves the changed job description file in the external storage 116 in S605. In S606, the routine updates the contents management table 92. It should be noted that in the job description file basis archive mode, only the copy mode is used. The operator cannot select between the copy mode and the move mode as in the job basis archive mode.

When the operator requests to archive all the data (system backup), he enters archive information in S601 as described above. In this case, archive information is created and stored as a file. In S602, the routine finds that the operator has selected the all job archive mode and sends all the page data and all the job description files from the internal storage to the external storage 116 in S613. In this case, the routine also saves archive information. The routine does not change contents IDs to unique IDs. In S614, the operator selects the copy mode or move mode. In the copy mode, the processing ends; in the move mode, all the data (page data and job description file) is removed from the internal storage in S615 and the contents management table 92 is cleared in S616.

Figure 36:
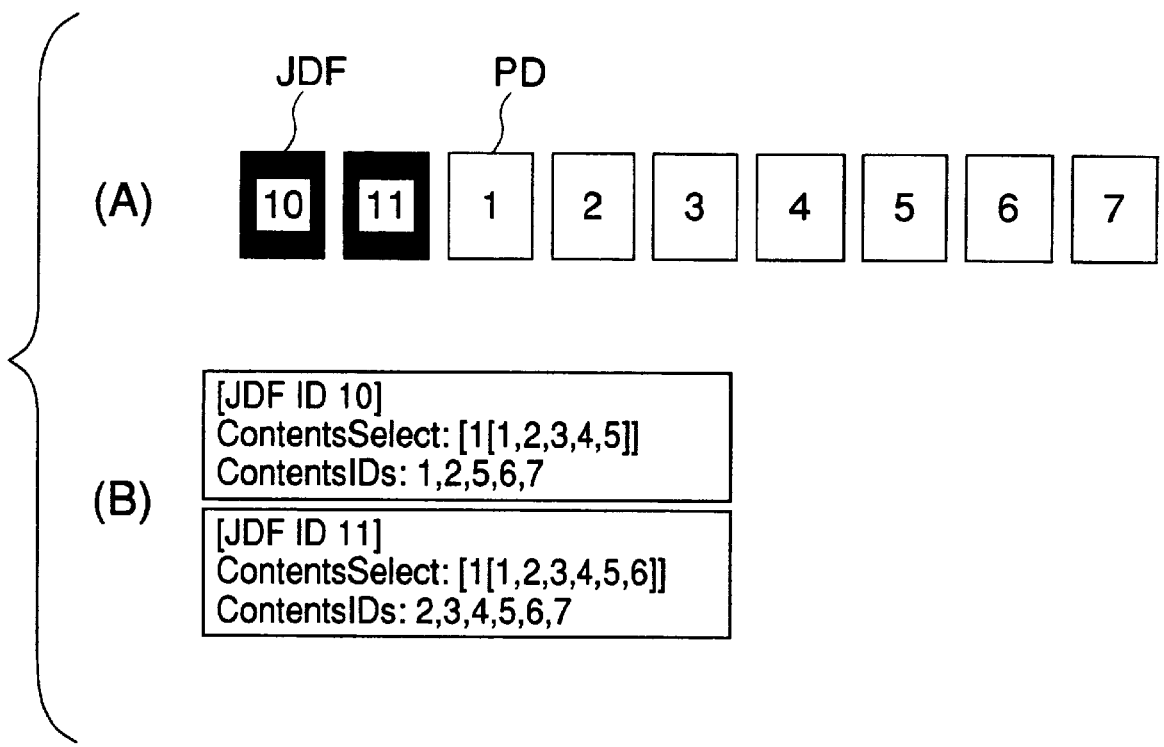
FIG. 36 is a diagram showing the state before archiving.
Figure 37:
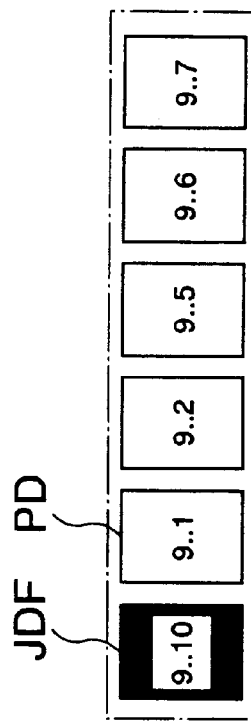
FIG. 37 is a diagram showing archiving on a job basis.
Figure 38:
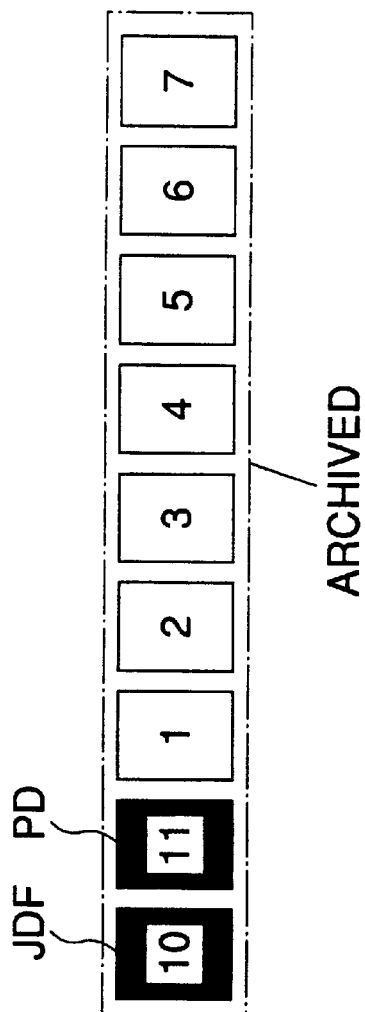
FIG. 38 is a diagram showing how all the jobs are archived.

Referring now to FIGS. 36–38, an example of archiving will be described.

FIG. 36 shows the state before archiving. (A) shows the job configuration, and (B) shows the contents of the job description files contained in the job.

In this situation, assume that the operator has selected the job basis archive mode for the job description file with JDF ID10. Then, as shown in FIG. 37 (A), the job description file is updated. That is, the contents IDs are changed to the corresponding unique IDs. FIG. 37 (B) shows the job description files that have been archived with the contents referenced. FIG. 38 shows the state in which the system has been backed up under the condition shown in FIG. 36.

Figure 39:
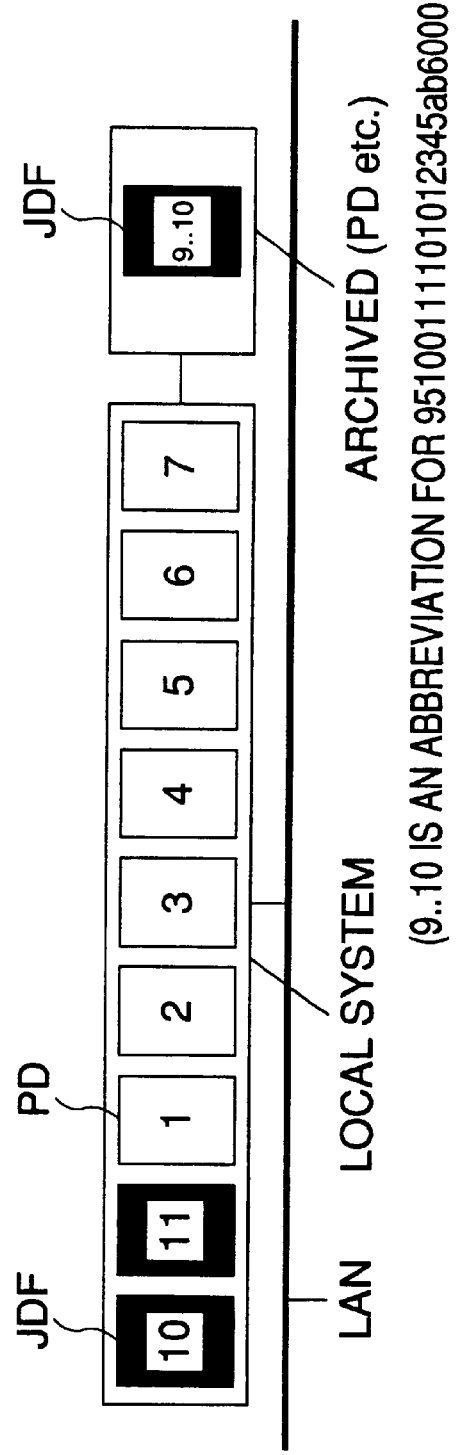
FIG. 39 is a diagram showing the relationship between a local system and an archive destination.

FIG. 39 shows the relationship between a local system where the print control system is installed and the external storage onto which contents are archived. When the job description file basis archive mode is selected, the job description file with the contents ID10 is archived on the external storage. The job description file is managed by the unique ID.

Figure 40:
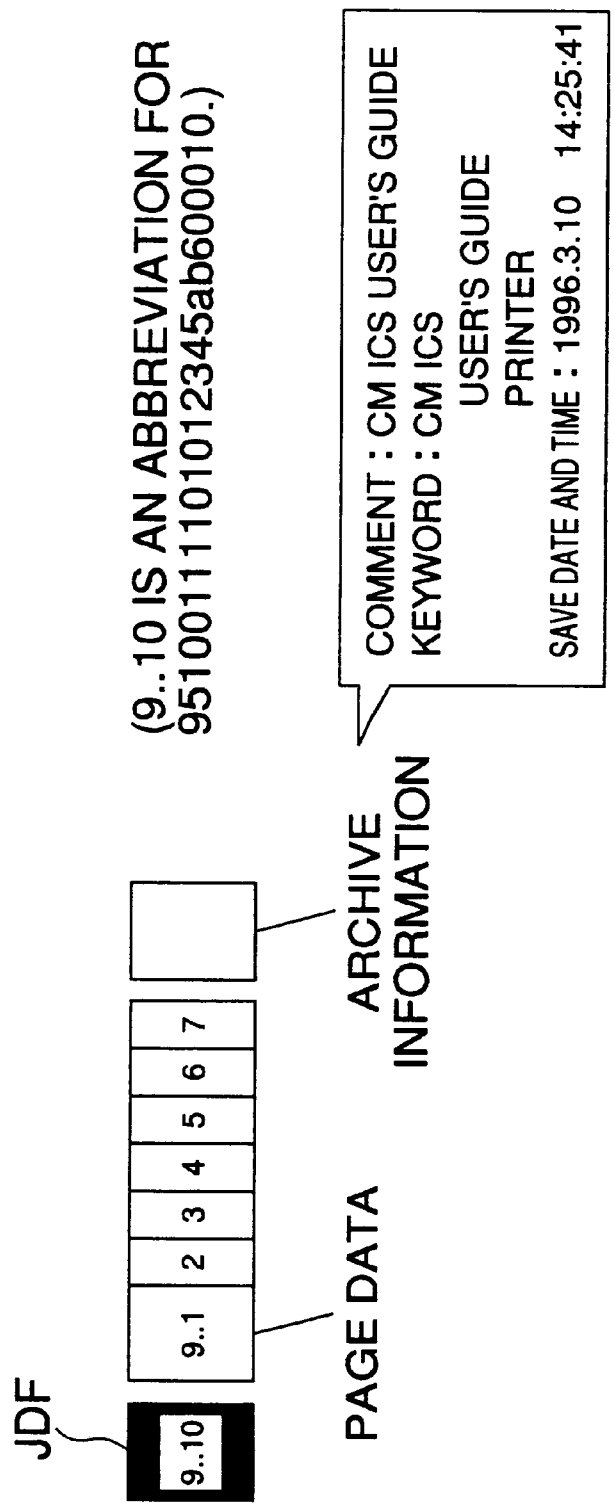
FIG. 40 is a diagram showing archive information.

FIG. 40 shows an example of archive information. The operator may specify this archive information in each archive operation. In this example, the archive information includes a comment, keyword, and save date.

(7) Restore routine

Figure 42:
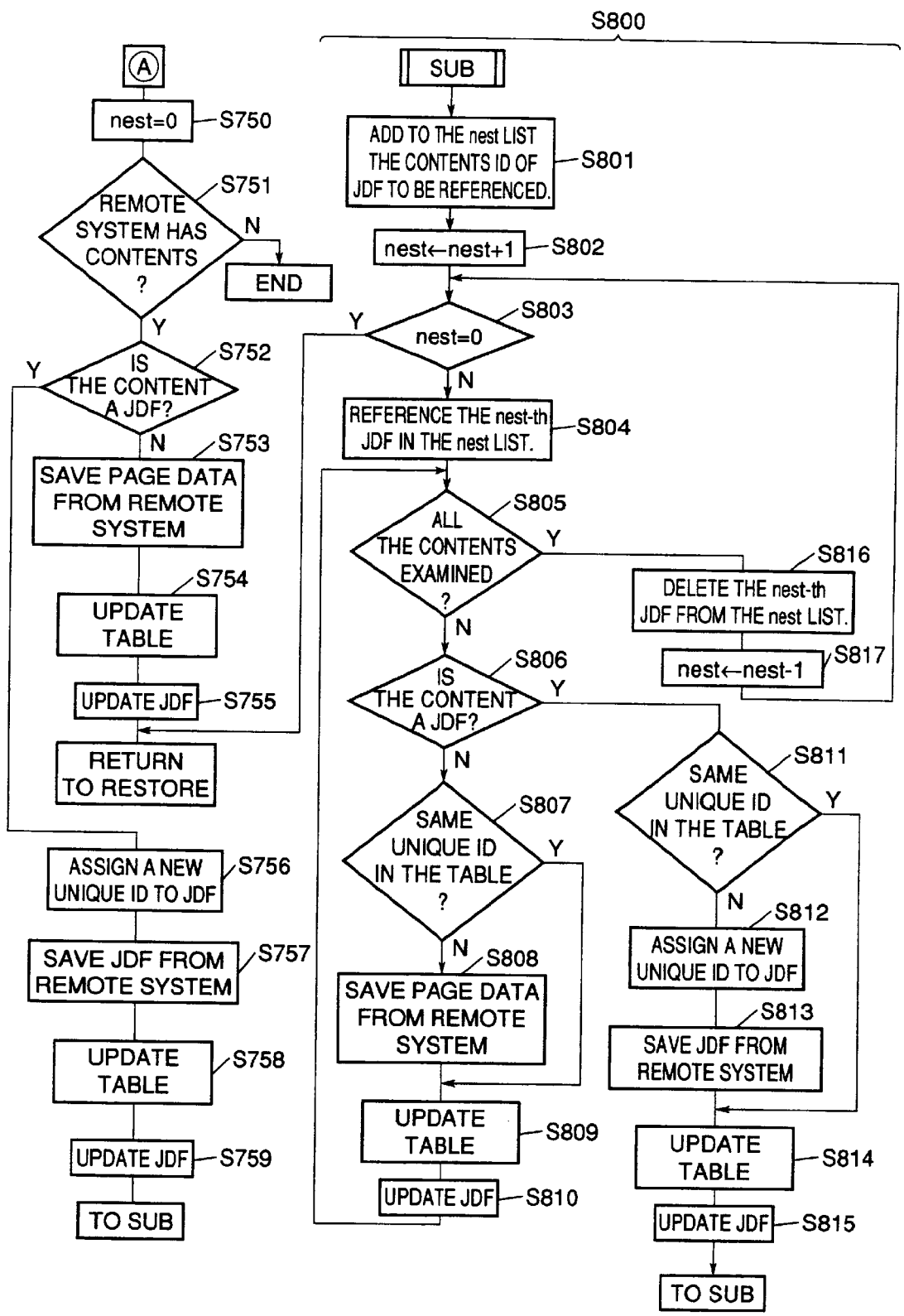
FIG. 42 is a flowchart showing the restore routine.
Figure 43:
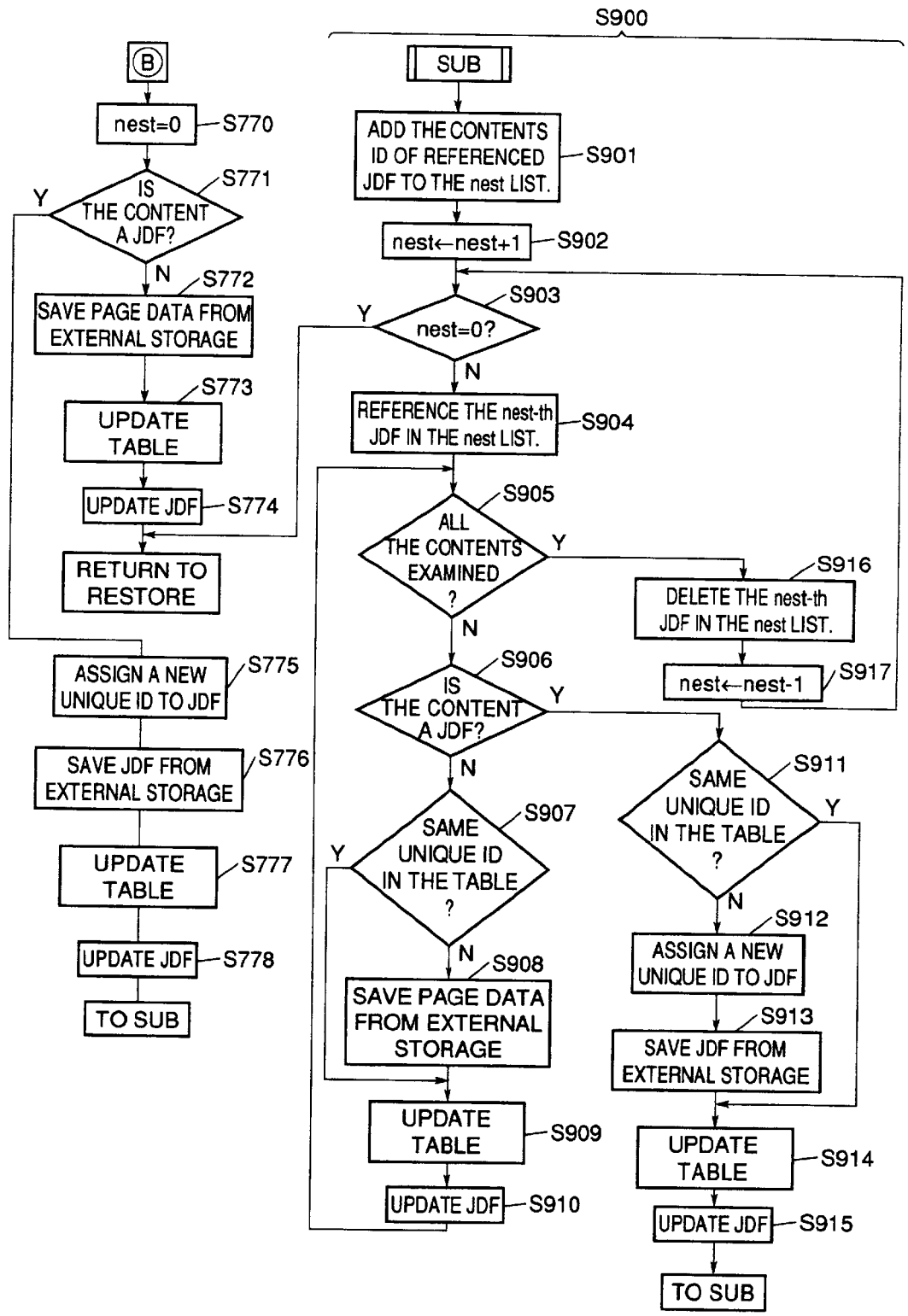
FIG. 43 is a flowchart showing the restore routine.

Referring now to FIG. 12, the restore routine will be described with the use of FIGS. 41–43.

The restore operation, the reverse of the archive operation, also has three modes: job basis restore, job description file (JDF) basis restore, and all job restore (restoration of backup data). When the operator selects one of these restore modes, the restore routine shown in FIG. 41 is started.

First, the restore operation in the job description file basis mode will be described. In this mode, the routine restores a job description file contained while restoring a job. In S701, when the routine finds that the operator has selected the job basis restore operation (job description file basis restore included), the operator is requested to select a job (job description file) in S702. Via the display 106, the operator selects a job description file from a list of archived jobs (job description files) saved in the external storage 116. The retrieval module 120 searches for the selected archived job with a comment or an archive date as the key. Of course, the operator may specify a keyword to select a particular job.

When the operator selects a job description file, the routine finds, in S703, that the operator has selected the job description file basis restore mode and copies the archived job description file from the external storage 116 to the internal storage (JDF storage module 90). Before this, the routine assigns a unique ID to the job description file in S704, updates the job description file with this ID in S705 and, saves the job description file in the internal storage in S706. At the same time, the routine adds the job description file to the contents management table 92 in S707.

Execution of a restored job description file requires that all the contents contained in the ContentsIDs field of the job description file be present in the print control system. The routine performs the following processing to ensure that this is the case.

In S708, the routine checks if all the contents (child contents) contained in the restored job description file (parent content) have been checked. In S709, the routine checks if the contents management table 92 contains the unique IDs of the child contents. The addition determination module 112 shown in FIG. 12 performs this processing.

If it is found in S709 that the unique ID of a child content is in the table, the contents management table 92 is updated in S710. More specifically, in the contents management table shown in FIG. 13, the contents ID of the restored parent content is added to the ID field, 136, of the parent content corresponding to the child content. At the same time, in S711, the unique ID contained in the ContentsIDs field of the parent job description file is changed to the contents ID of the child content contained in the contents management table 92. Note that a child content that is present during a restore operation is not copied.

If it is found in S709 that the unique ID of the child content is not in the contents management table 92, control is passed to S712. That is, the routine shown in FIG. 42 is executed.

In S750, the routine initializes the variable "nest" indicating a hierarchical level to 0. In S751, the routine examines sequentially the remote systems connected to the network and searches the contents management table 92 of each remote system for the unique ID of the child content. If no remote system contains the child content, the routine ends processing; if a remote system contains the child content, the same routine checks, in S752, if the content is a job description file or page data.

If the child content is page data, the routine copies the page data from the remote system to the internal storage in S753. At this time, the routine assigns a content ID to the child content. In S754, the routine adds the page data, the child content, to the contents management table 92.

In S755, the unique ID of the child content contained in the ContentsIDs field of the job description file, the parent content, is changed to the content ID assigned by the print control system. For page data copied from the remote system, the unique ID is used unchanged. Only the content ID is changed to the content ID used in this print control system (local system).

If it is found in S752 that the child content is a job description file, the routine sends the job description file, the child content, from the remote system. In the remote system, the content ID in the ContentsIDs field of the job description file is changed to the unique ID before the job description file is sent.

In S756, the routine assigns a new unique ID to the job description file sent from the remote system and, in S757, saves the job description file in the internal storage. At the same time, the routine assigns the content ID of this print control system to that job description file and, in S758, updates the contents management table 92. That is, it adds the transferred job description file to the contents management table 92. In S759, the unique ID contained in the content ID of the job description file, the parent content, is changed to the content ID of this print control system.

Then, the routine repeats the above steps to copy all the contents (job description files and page data) required for the execution of the job description file, the parent content. That is, the routine goes down to a lower hierarchical level to continue the search of each content until there reference relationship is resolved. In FIG. 42, this is represented by S800. In fact, repeated execution of S801 to S815 collects the child contents to be referenced by the parent content.

Figure 41:
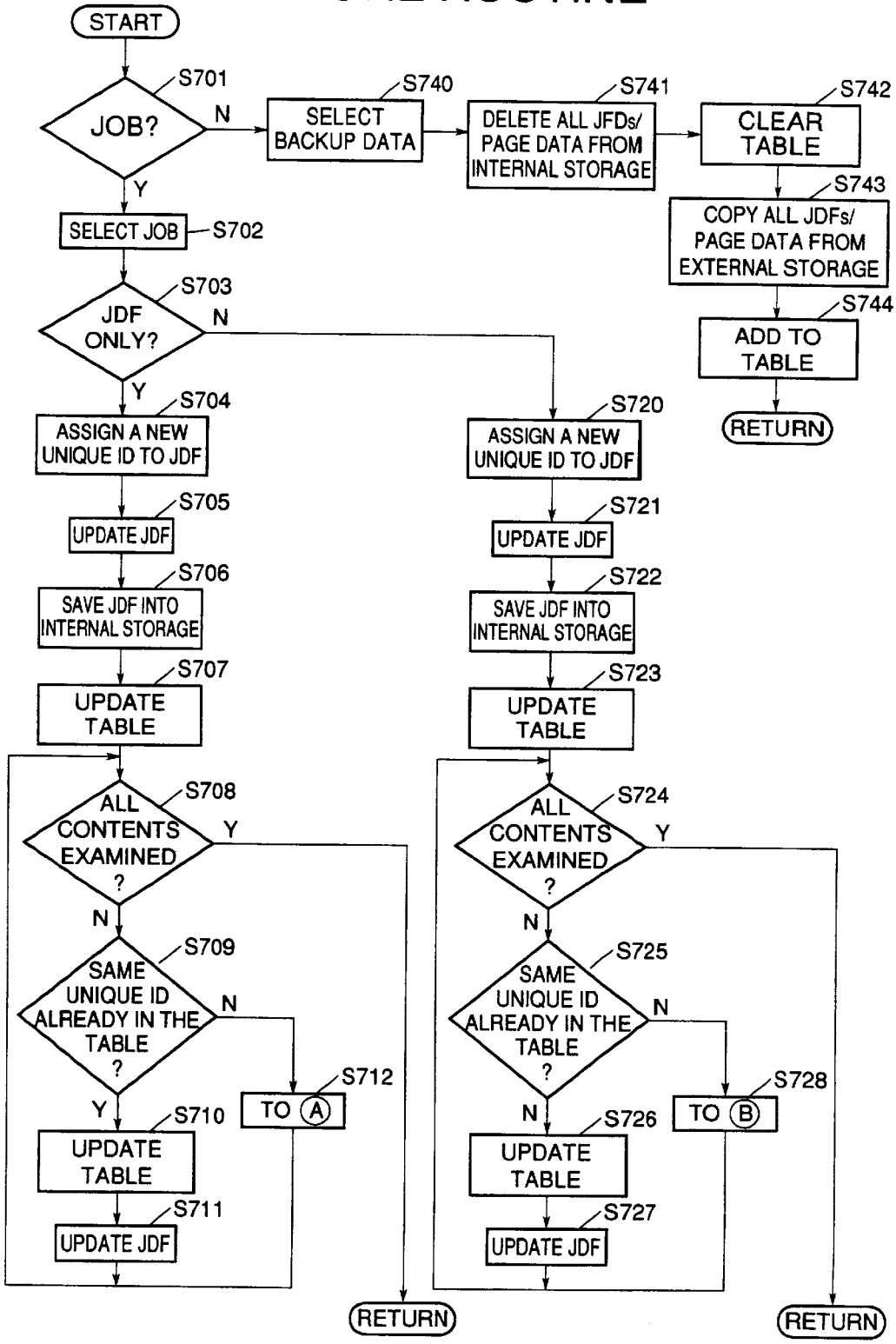
FIG. 41 is a flowchart showing the restore routine.

In FIG. 41, when carrying out the job basis restore operation, the routine performs almost the same processing as for the above-mentioned job description file basis restore operation. That is, the steps S704–S711 and the steps S720–S727 are basically the same. If it is found in S725 that the unique ID of the child content is not in the contents management table 92, the routine passes control to S728 to execute the routine shown in FIG. 43.

The job basis restore operation is the reverse of the job basis archive operation. Therefore, all the child contents specified for a parent content are archived in external storage 116. If a child content is not found in the local system in S725, the child content is copied from the external storage 116. More specifically, after executing S770, in S771 the routine checks if the child content is a job description file. If the child content is page data, the routine sends the page data from the external storage 116 and saves it in the internal storage. At this time, the routine assigns the content ID used in the local system to the child content and, in S773, adds the child content to the contents management table 92. In S774, the unique ID of the child content contained in the ContentsIDs field of the job description file, which is the parent content, is changed to the content ID that was assigned as described above.

If it is found in S771 that the child content is a job description file, the routine assigns a new unique ID to the child content (job description file) in S775 and, in S776, saves the job description file from the external storage 116 to the internal storage. In steps S777 and S778, the same processing as for S773 and S774 is executed.

The routine indicated by S900 searches for the grandchild contents referenced by the parent content via the job description file (which is the child content) and for lower hierarchical level contents as necessary. The steps S901 to S917 copy all the contents, referenced by the parent content directly and indirectly, into the internal storage. Of course, the routine does not add a content already in the internal storage. For this type of content, the routine only updates the contents management table 92 and changes the unique ID of the job description file to the content ID.

Referring again to FIG. 41, the backup data restore operation will now be described. If it is found in S701 that the operator has selected the backup data restore operation, control goes to S740. The display 106 displays backup data as well as archived archive information to allow the operator to select which backup data to restore. Of course, the retrieval module 120 searches for backup data with a comment or an archive date in archive information as the search key. Alternatively, the operator may specify a keyword to search for backup data. It should be noted that only one block of backup data may be specified in the backup data restore operation.

In S741, the routine deletes all the job description files and page data from the internal storage before starting the backup data restore operation and, at the same time, clears the contents management table 92 in S742. In S743, the routine copies all the backup data from the external storage 116 to the internal storage. In this case, the content IDs and unique IDs of the contents are used unchanged and, in S744, the contents management table 92 is created. That is, the state at the time of backup is re-produced.

Referring to FIGS. 44–47, an example of the above-mentioned restore operation will be described.

Figure 44:
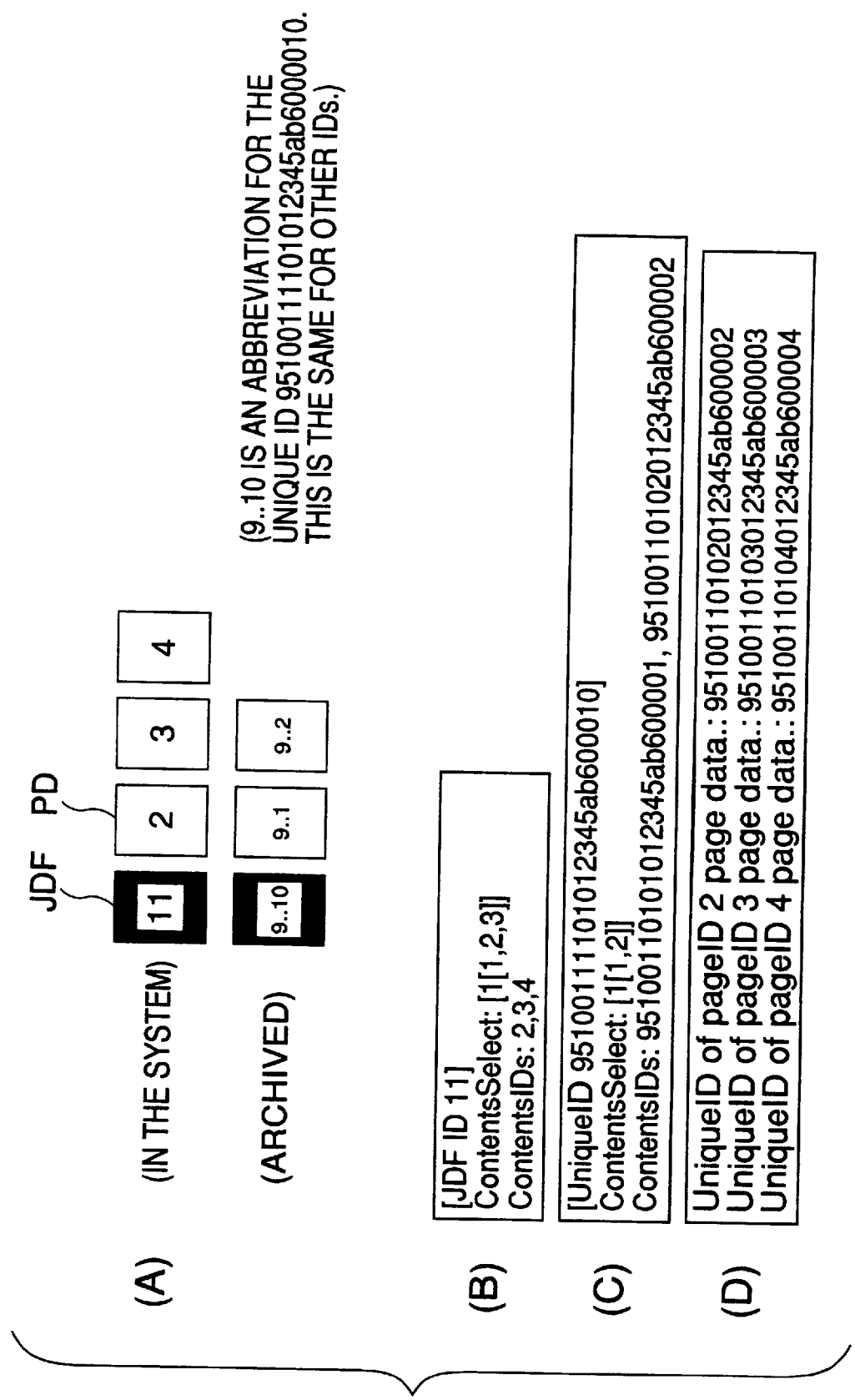
FIG. 44 is a diagram showing the state before restoration.
Figure 45:
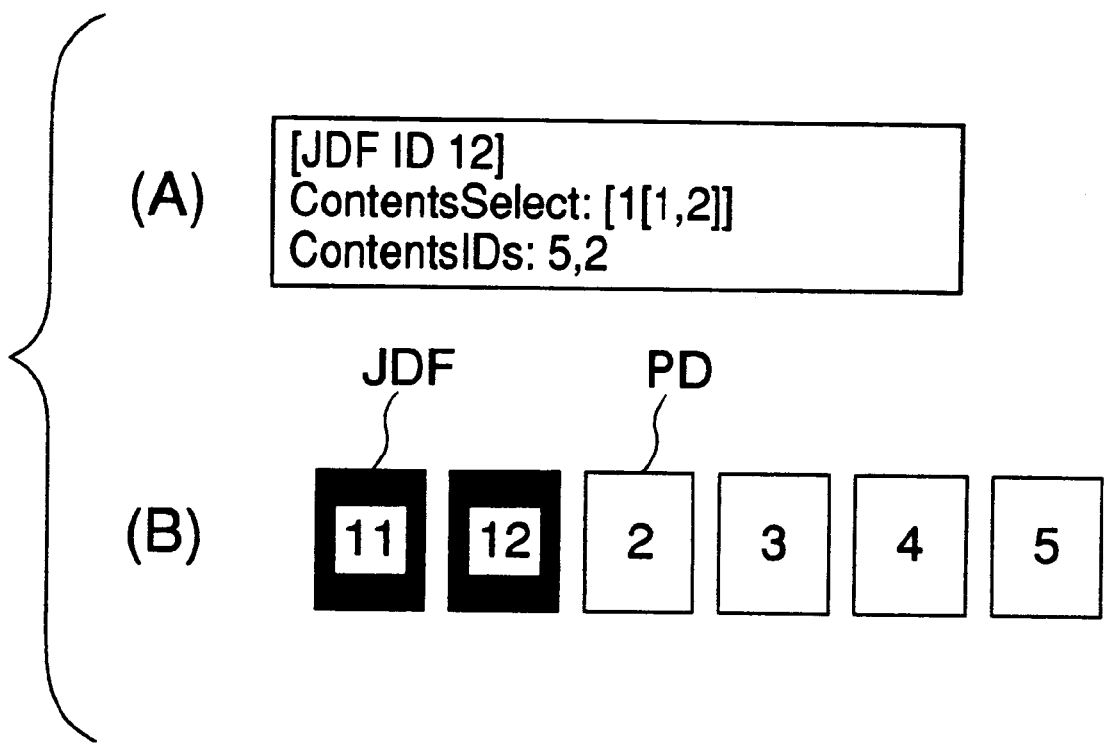
FIG. 45 is a diagram showing the restore operation on a job basis.

FIGS. 44 and 45 show an example of the job basis restore operation. FIG. 44 (A) shows the contents present in the system and in the archive storage. FIG. 44 (B) shows the contents of the job description file with JDF ID11 stored in the system. FIG. 44 (C) shows the contents of the job description file with the unique ID 95100111101012345ab600010. FIG. 44 (D) shows the unique IDs of page data referenced by JDF ID11.

When restoring a job from the archive storage in this situation, a new content ID, JDF ID12, used in this print control system, is assigned to the job description file and, at the same time, a new unique ID 9603011010212345ab600012 (restore date and time: 10:10:20 on Mar. 1st, 1996, host ID: 12345ab6, JDF ID12) is assigned. During restoration, the system references the ContentsIDs field of the job description file to be restored to check for a content with a unique ID that is also found in the system, and restores, in conjunction with the job description file, only those contents whose IDs are not found in the system. In the example shown in FIG. 44, because the unique ID of the content 9 . . . 2 (page data) in the archive storage is equal to the unique ID of the page ID2 in the system, this content is not restored. Only the content 9 . . . 1 (page data) in the archive storage is restored with the job description file. FIG. 45 shows the result. (A) shows the job description file created by restoring the job description file from the archive storage, and (B) shows the content configuration within the system. As shown in this figure, a new content ID5 is assigned to the page data with the unique ID 9 . . . 1 which was in the archive storage.

Figure 46:
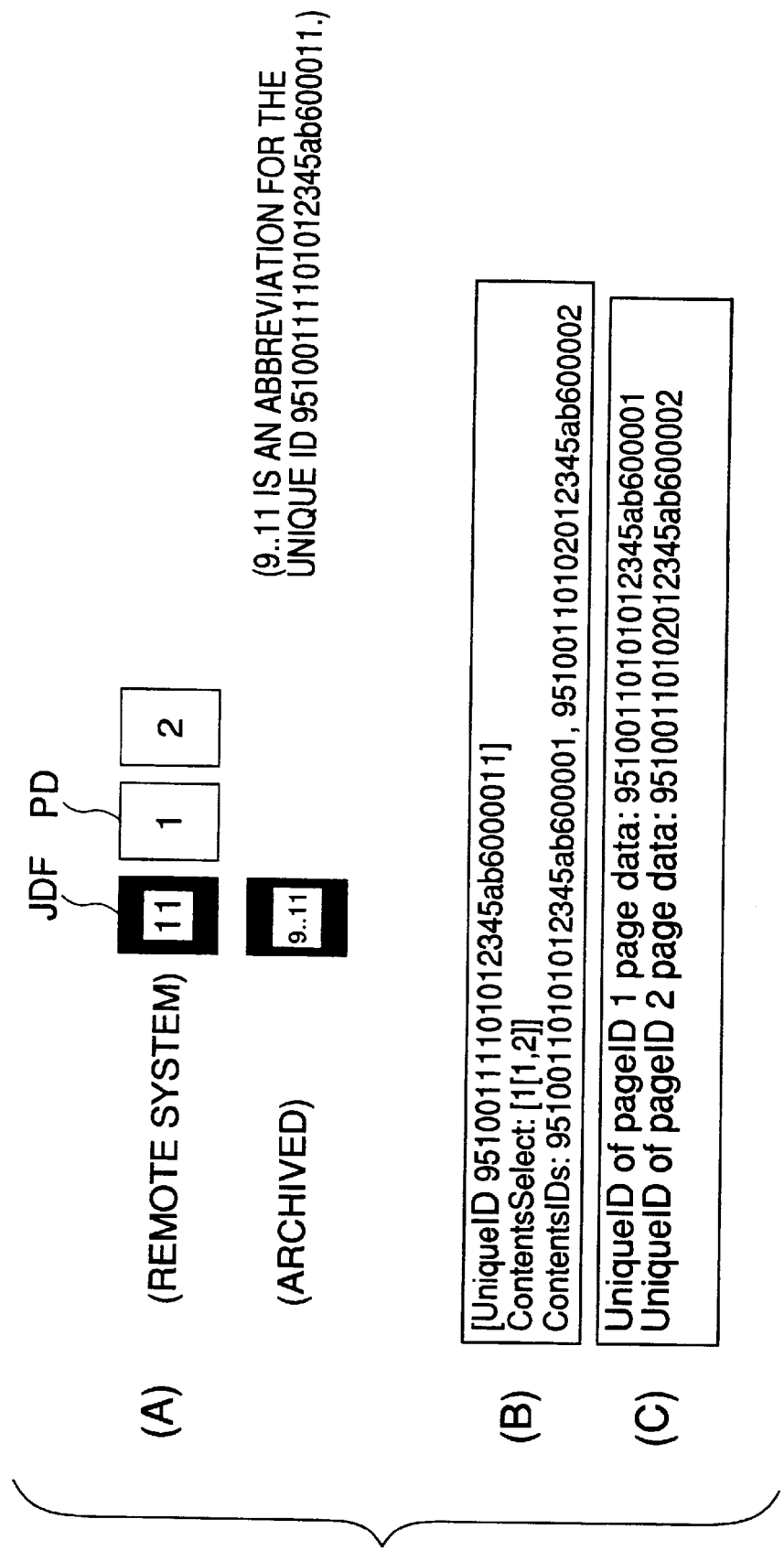
FIG. 46 is a diagram showing the state before restoration.
Figure 47:
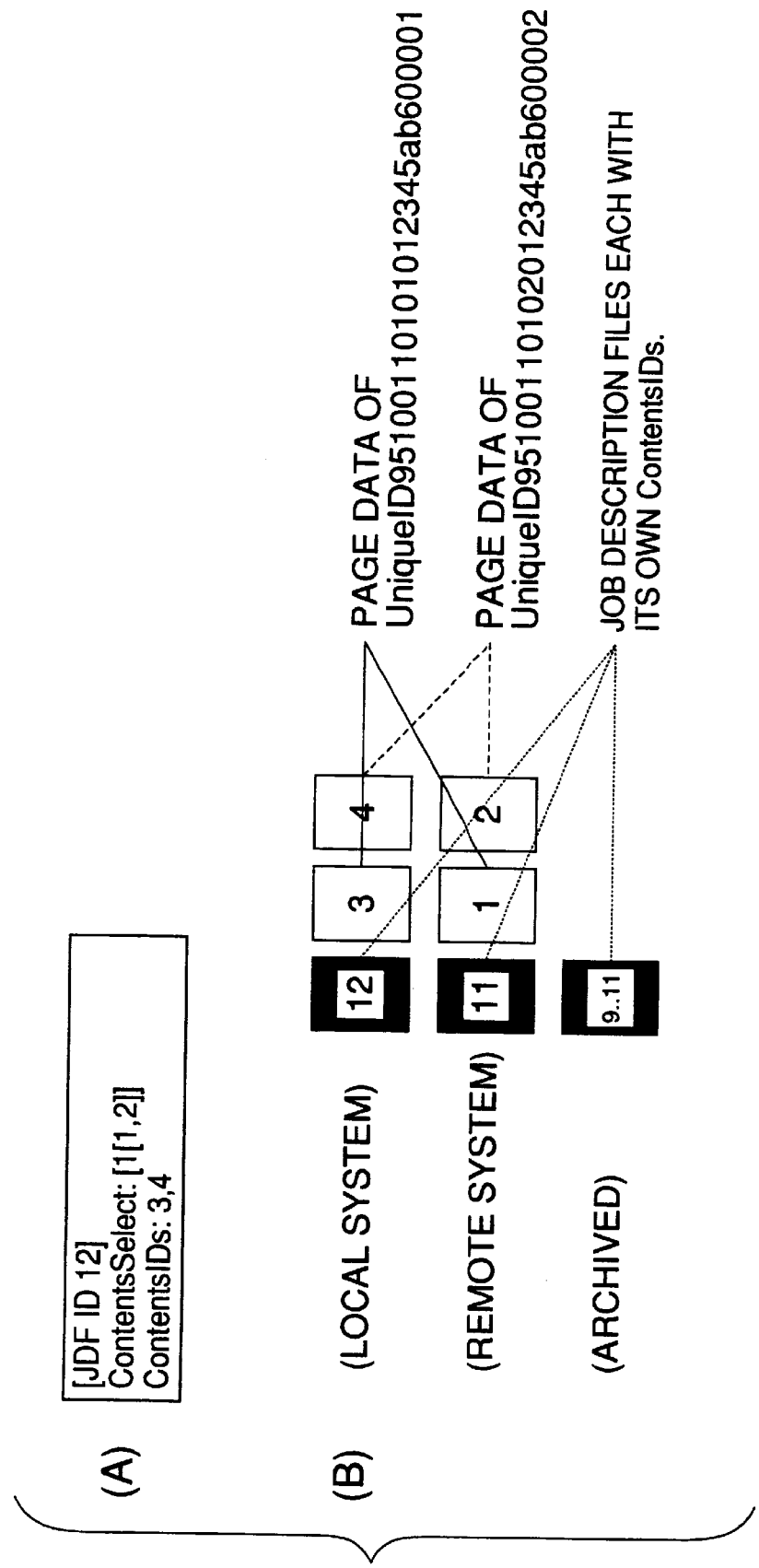
FIG. 47 is a diagram showing the restore operation on a job description file basis.

Then, referring to FIGS. 46 and 47, the following explains an example of job description file basis restore operation.

FIG. 46 (A) shows the contents stored in the archive storage such as a remote system or external storage. Assume that the job description file with JDF ID11 in the remote system is the same as the job description file with unique ID9 . . . 11 in the archive storage. FIG. 46 (B) shows the contents of the job description file stored in the archive storage, and FIG. 46 (C) shows the unique IDs of page data stored in the remote system.

When restoring the job description file from the archive storage to the local system (print control system) in this situation, the local system checks if it has the contents referenced by the job description file. Because there is no such content in the example shown in the figure, the system first searches the archive storage for the contents. Because the archive storage does not contain the contents either, the system searches the remote system for the contents. Because that remote system has the contents, they are restored in conjunction with the job description file.

FIG. 47 (A) shows the contents of the job description file restored with the new content ID and unique ID, and FIG. 47 (B) shows the content configurations of the local system, remote system, and archive storage. As shown in the figure, when the job description file is restored from the archive storage, page data referenced by that job description file is also restored.

(8) Other functions

Figures 48, 49:
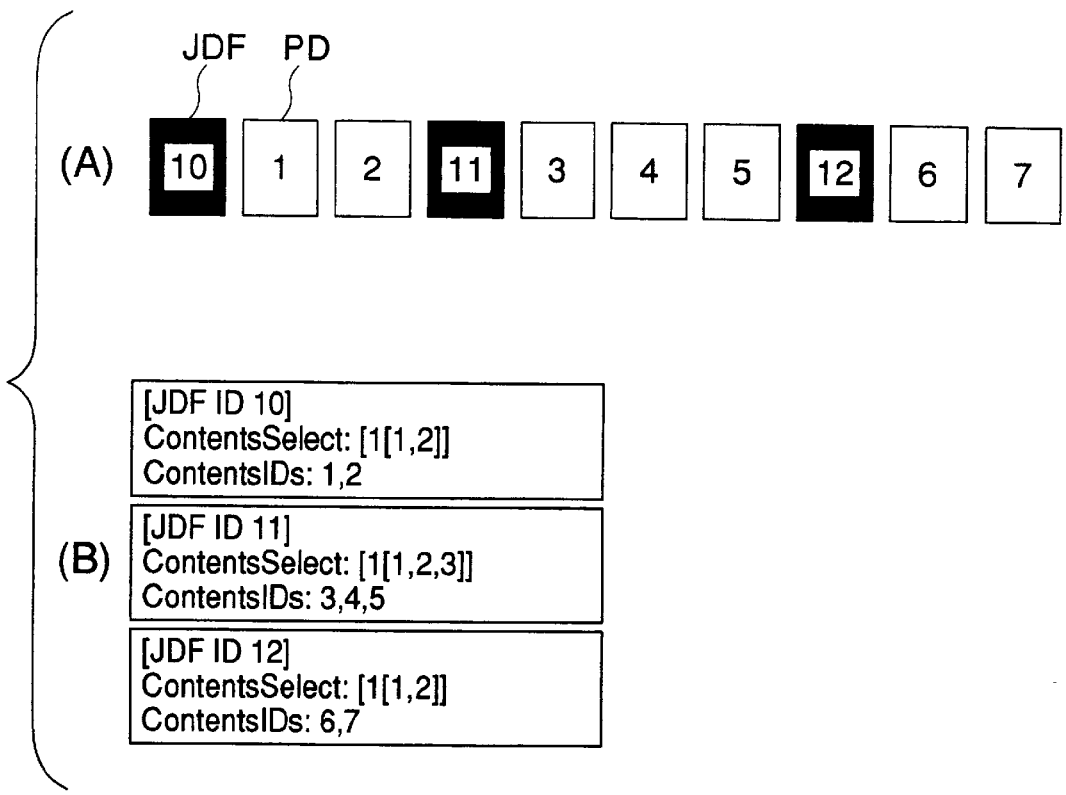
FIG. 48 is a diagram showing the contents saved in internal storage.
FIG. 49 is a diagram showing the print attribute of each item of page data shown in FIG. 49.

Referring to FIGS. 48 to 51, the function of the MediaPrecedence field, 42, shown in FIG. 4 will now be described. FIG. 48 (A) shows the contents saved in the internal storage, and FIG. 48 (B) shows the contents of the job description files. Assume that pages ID1 to ID7 contain page data of the page sizes and paper orientations as shown in FIG. 49.

Figure 50:
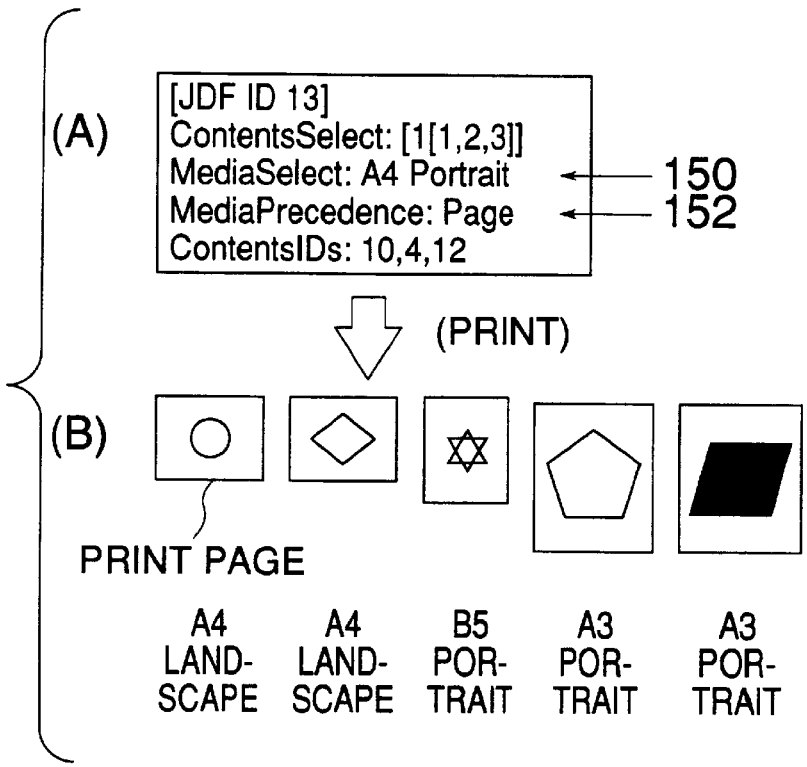
FIG. 50 is a diagram showing the result produced by printing data with the priority on the page data print attribute.

Execution of the job description file with JDF ID13 shown in FIG. 50 (A) under this condition produces the result shown in FIG. 50 (B). That is, the job description file with JDF ID13 contains "page" as the attribute precedence information (indicated by 152). Therefore, the page data has priority over the job data with respect to the paper size and orientation indicated by 150.

Figure 51:
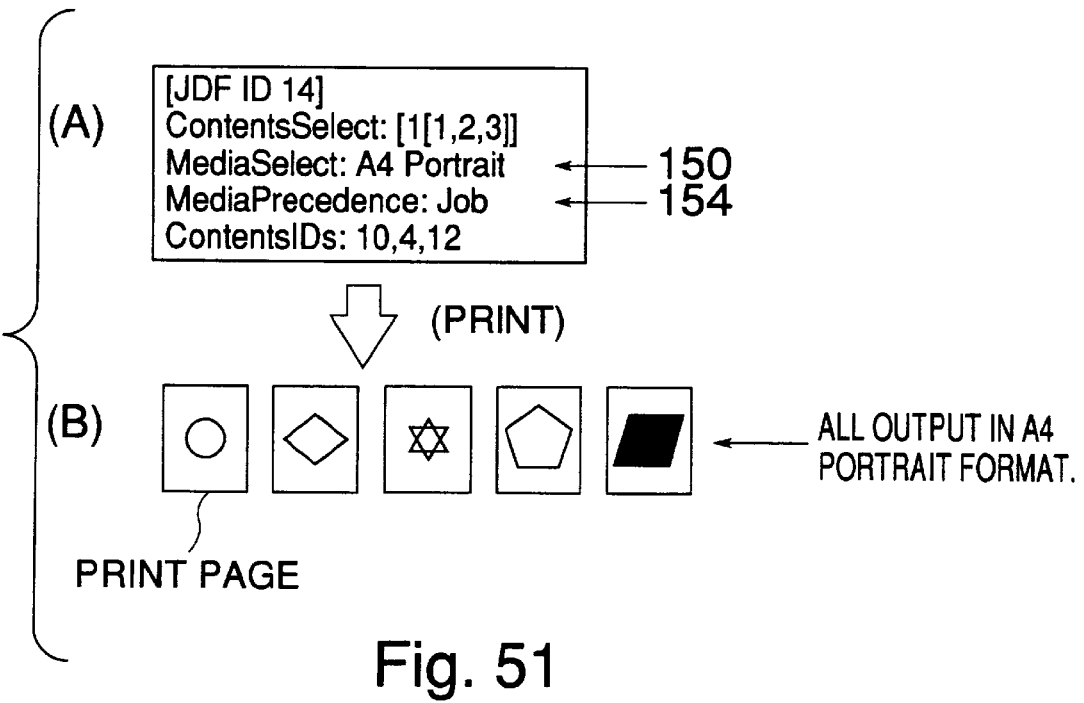
FIG. 51 is a diagram showing the result produced by printing data with the priority on the job description file print attribute.

On the other hand, execution of the job description file with JDF ID14 shown in FIG. 51(A) under the condition shown in FIGS. 48 and 49 produces the result shown in FIG. 51 (B). That is, "job" is specified as the attribute precedence information (indicated by 154), meaning that if the print attribute in the job description file does not match the print attribute in the page data, the attribute specified in the job description file has priority. Because "A4 Portrait" is specified in the job description file in this case, all the pages are printed in the A4 size and in the portrait format.

The attribute adjustment module 98 shown in FIG. 12 allows the user to adjust the print attribute as necessary. For example, the attribute adjustment module allows the user to enlarge, reduce, or rotate images.

Figure 52:
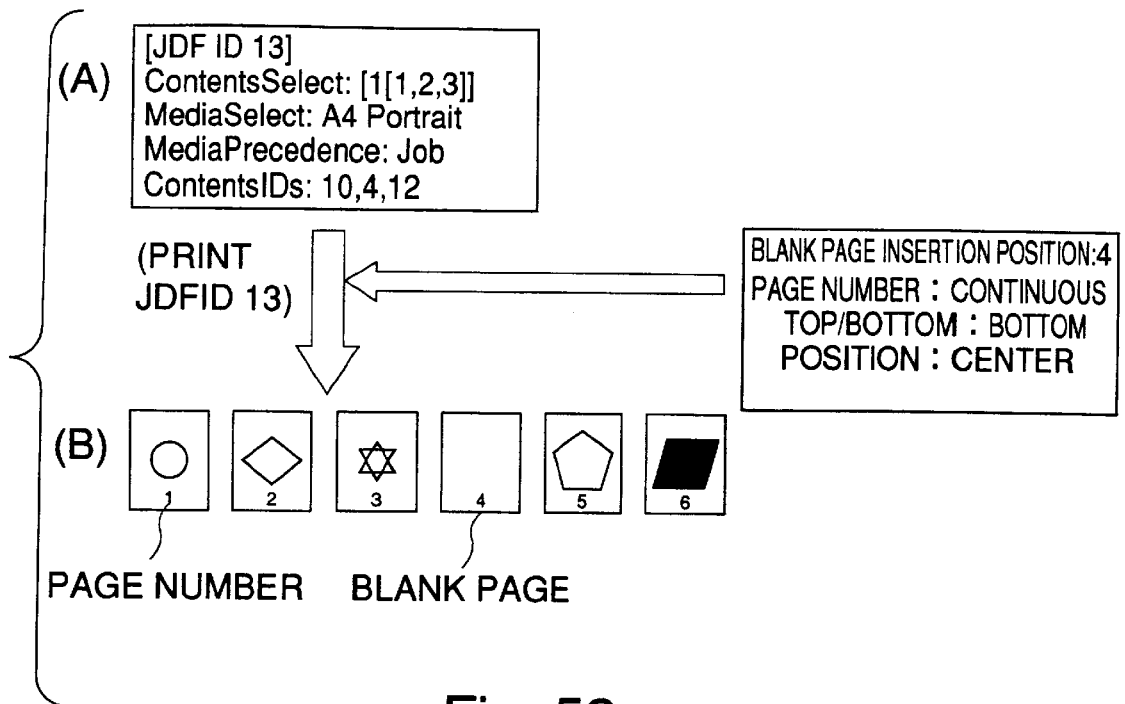
FIG. 52 is a diagram showing blank page insertion and page number assignment.

FIG. 52 shows the blank page creation module 124 and the page number assignment module 126 shown in FIG. 12.

When the print job JDF ID13 shown in FIG. 52 is executed under the condition shown in FIGS. 48 and 49, the blank page creation module 124 enables the user to specify a location at which a blank page is to be inserted and the page number assignment module 126 to insert a page number on each page. In this case, the user can specify various page number assignment conditions such as whether to assign continuous numbers or where the page number is positioned. Execution of the job description file with JDF ID13 with other additional attributes specified produces the result shown in FIG. 52.

Figure 53:
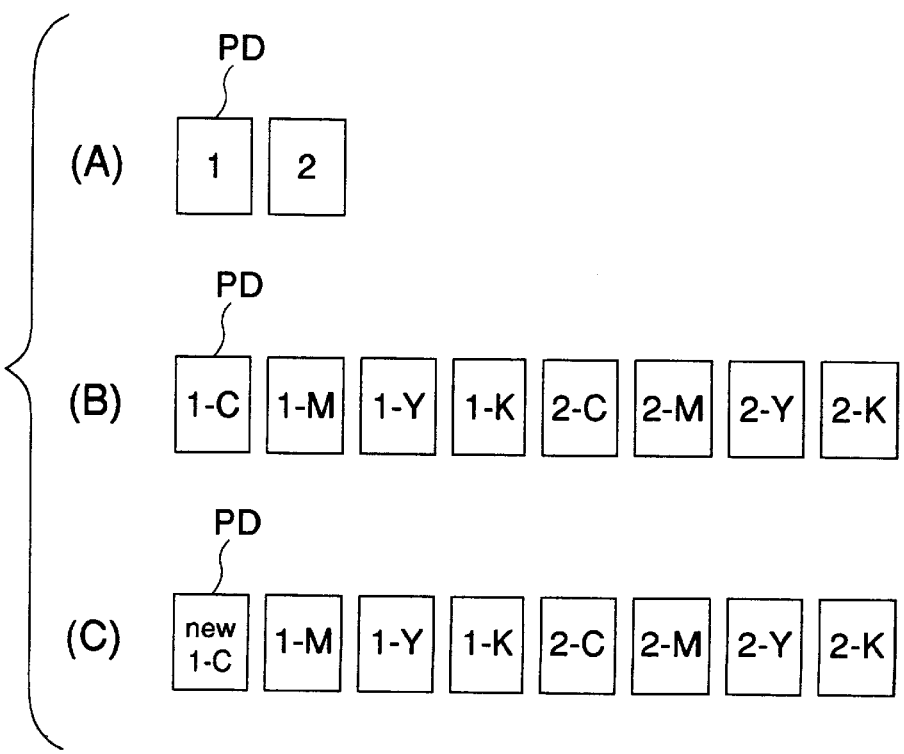
FIG. 53 is a diagram showing the page data creation and color correction of each color.

FIG. 53 shows the color correction module 122 shown in FIG. 12. Although one unit of image data is created in each page in the above embodiment as shown in (A), page data may be created for each of CMYK as shown in (B). In addition, as shown in (C), color correction may be carried out individually for the page data of a desired color.

VI. Other Embodiment 1

(1) Although, in the above embodiment, data expanded through job analysis is used in job combination, a print job not yet expanded through job analysis may also be combined into another job. When a print instruction is issued to a combination job containing a job not yet expanded, the job not yet expanded is expanded before printing.

It is desirable that some print jobs, which do not require much time for expansion, be saved in a format which does not require much space, for example in the PDL format, rather than in a large image data format. In addition, a print job may be composed of low-expansion-load text image pages and high-expansion-load high-resolution picture image pages. In this case, it is possible to divide a job into a part before expansion and a part after expansion.

(2) In the above embodiment, data stored in the internal storage is deleted by an operator's instruction. However, it is also possible to delete data automatically when the amount of data in the internal storage has reached a specified amount or a specified ratio. In this case, data may be deleted in order of creation dates or in ascending order of data importance with a function set importance to jobs. It is also possible to automatically move data into the external storage when the amount of data has reached a specified amount or a specified ratio. When the amount of data in the internal storage has reached a specified level, a warning message may be issued to the operator.

The above-mentioned embodiment prevents a system error which will be caused when the internal storage has run out.

(3) Although the above-mentioned embodiment has only one job analysis module, a plurality of job analysis modules may be provided. Such a configuration allows concurrent processing to be performed on a job on a page basis or a plurality of jobs to be executed concurrently.

In general, the expansion of a print job into raster data is a performance bottleneck in a print control system. The other components of the print control system are sometimes idle simply because it takes a long time for this processing to complete. The above-mentioned configuration increases efficiency through concurrent processing and ensures the overall productivity of the print control system.

VII. Other Embodiment 2 (Job Combination)

Figure 54:
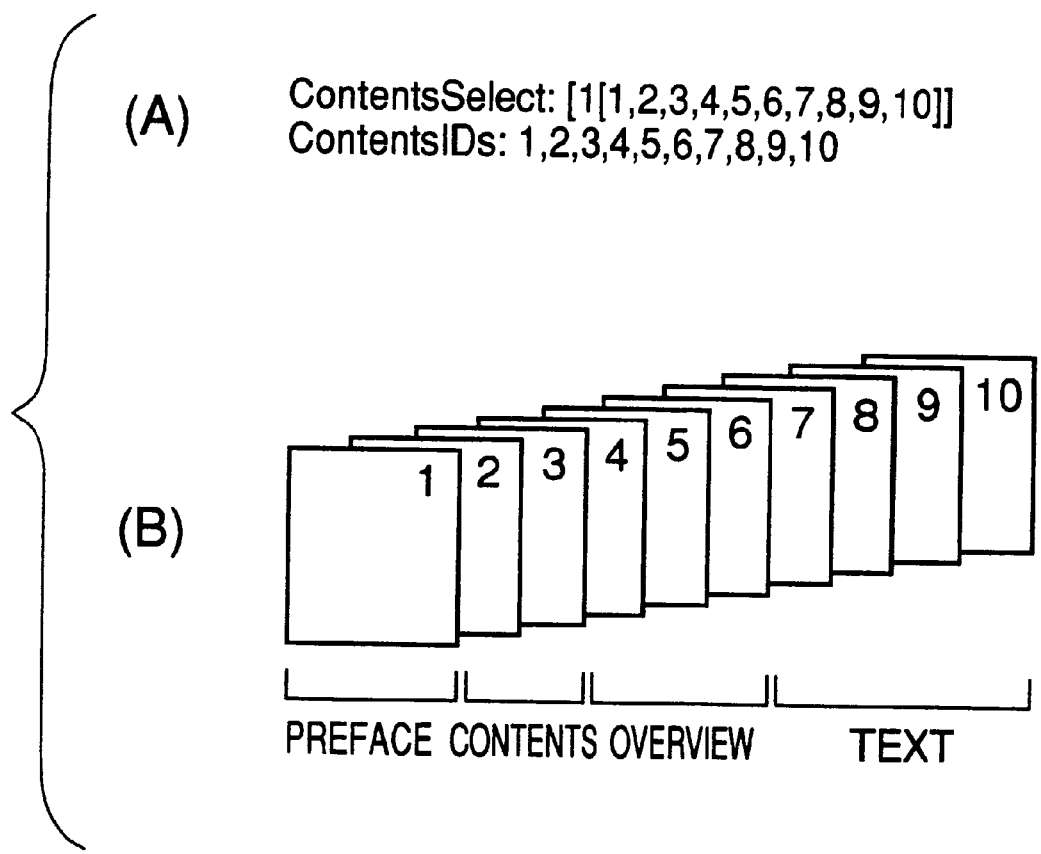
FIG. 54 is a diagram showing a job description file and its execution result.

The ContentsSelect field in a job description file enables the user to print any pages in any sequence, as shown in FIGS. 24 and 25. As shown in FIG. 54 (A), assume that ContentsIDs in a job description file contains ContentsIDs:1,2,3,4,5,6,7,8,9,10 and that ContentsSelect contains ContentsSelect:[1[1,2,3,4,5,6,7,8,9,10]].

Then, execution of the job description file produces the pages shown in FIG. 54 (B).

In the print result, page 1 is "preface", pages 2 and 3 are "contents", pages 4–6 are "overview", and pages 7–10 are "text". Also, assume that ContentsIDs as shown in FIG. 55(A) contains the same as described above and that ContentsSelect contains the following:

ContentsSelect:
[3[1,2,3],2[1,4,5,6],3[1,7,8,9,10]].
Then, execution of the job description file, job A, produces the pages shown in FIG. 55 (B).

That is, in ContentsSelect, the print sequence is specified in "[ ]" using in-file numbers identified by the order in which pages are specified for the ContentsIDs field. The number of copies precedes "[ ]". Therefore, three copies are printed for the top set in FIG. 55 (B), two copies for the middle set, and three copies for the bottom set.

This description format allows the user to specify the number of copies of each set, one set being composed of a plurality of pages. This is what we call selective binding. FIG. 55 (B) shows an example of a selective binding print result. A variety of page configurations are possible in a single job.

For example, in a mail order sale, the type of product information varies from customer to customer. In this case, the mail order sales company sends a catalogue composed of a cover, order instruction page, and a group of product information pages. In such a case, the company will find selective binding ideal for producing any number of copies each of which consists of pages necessary for each customer.

In creating a new combination job by combining a job containing selective binding descriptions into another job, how to specify selective binding is important. The embodiment described below is intended to solve this problem.

The job control module 94 shown in FIG. 12 performs job combination, that is, it combines a plurality of job description files into a new job description file. There are three combination modes: (i) condition maintenance mode in which the selective binding condition is used unchanged, (ii) partial condition usage mode in which the selective binding condition is partially used, and (iii) condition clear mode in which the selective binding condition is cleared. The user can select one of the modes as well as the job combination condition.

Figure 56:
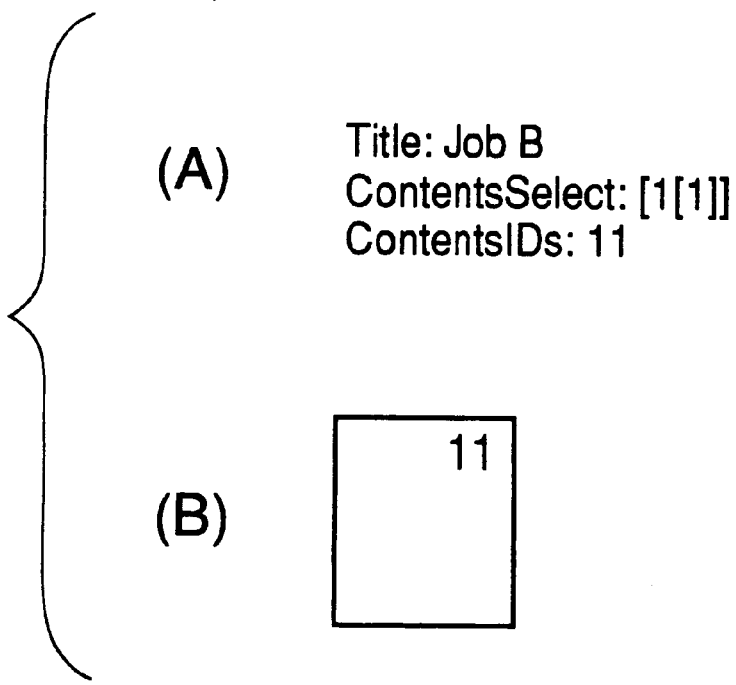
FIG. 56 is a diagram showing the job description file of job B and its execution result.
Figure 57:
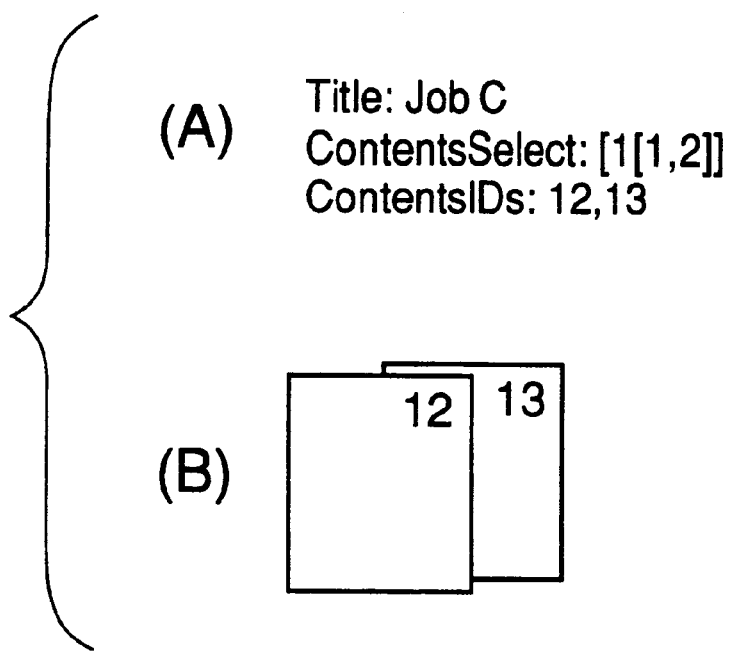
FIG. 57 is a diagram showing the job description file of job C and its execution result.

The following explains each mode:

In the following explanation, the jobs are combined in order of job B (FIG. 56), job A (FIG. 55), and job C (FIG. 57). For simplicity, assume that ContentsIDs of each job description file does not contain a job description file.

In the condition maintenance mode (i), a new job description file is created for combination job 1 as shown in FIG. 58 (A) and the print result of combination job 1 is as shown in FIG. 58 (B). In ContentsIDs of the newly-created job description file, the components of job B and job C are added to the components of job A. The new in-file numbers appear in ContentsSelect accordingly.

In this mode, the print method in described ContentsSelect in job A, shown in FIG. 55, is basically maintained. That is, each page set enclosed by [ ] is preceded by job B and followed by job C. New components are added to the page configuration of each set, with no change in the number of sets or the number of copies. Comparing FIG. 55 (B) with FIG. 58 (B) indicates that, in the first set, page 11 of job B is added at the beginning and pages 12 and 13 of job C are added at the end. This is the same as in other sets. That is, in sets 2 and 3, page 11 of job B is added at the beginning and pages 12 and 13 are added at the end.

The user may specify a job to be used as the base (a job whose print method is used) of a plurality of jobs to be combined. If selective binding is specified only for one job, that job may automatically become the base job; if selective binding is specified for a plurality of jobs, the user may select one of them.

In the partial condition usage mode (ii), a combination job such as job 2 shown in FIG. 59 is used. As shown in FIG. 59 (A), the two sets out of three sets (middle set excluded) contained in ContentsSelect of job A are used, preceded by the pages of job B and followed by the pages of job C. FIG. 59 (B) shows the print result of combination job 2 in this mode.

The user may specify a combination condition easily (e.g., which set to use or in which sequence jobs are to be combined), and the job description file of a combination job is created automatically according to what the user has specified.

Figure 60:
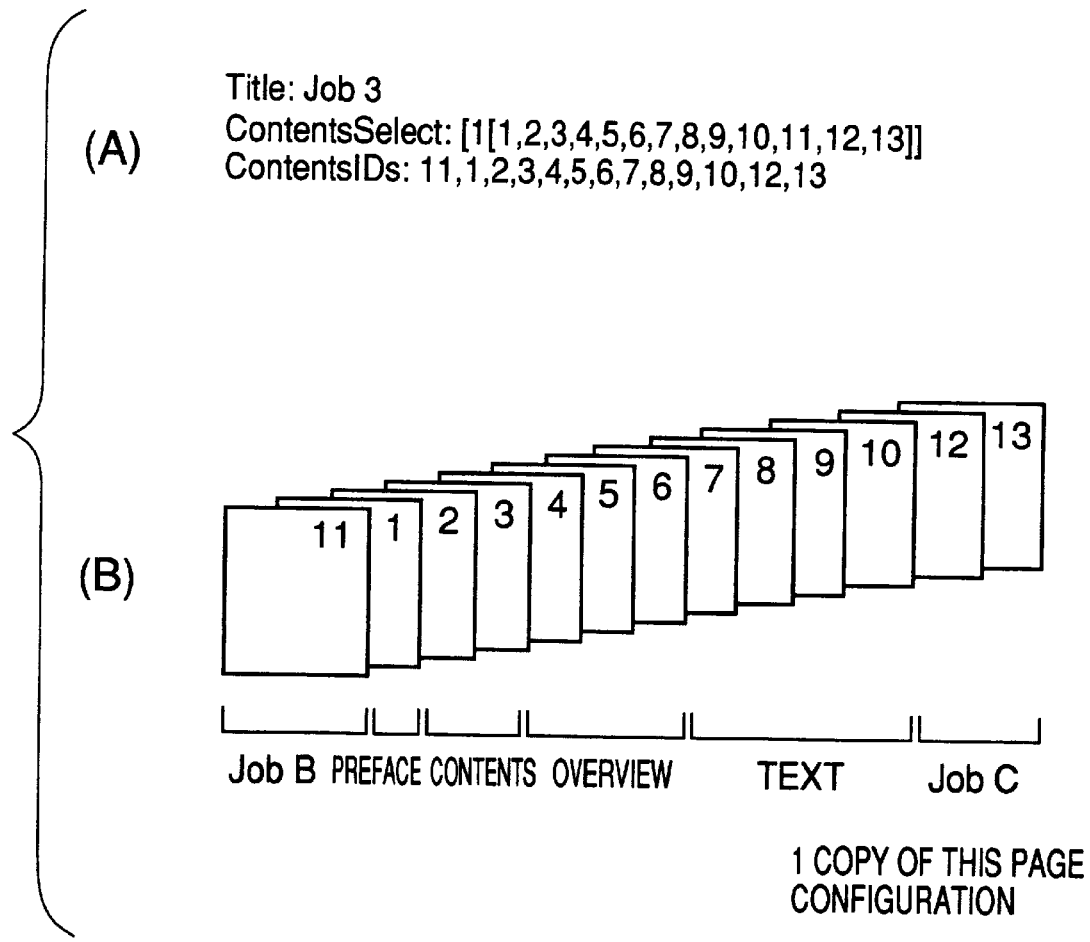
FIG. 60 is a diagram showing the result of job combination in the condition clear mode.

In the condition clear mode (iii), a combination job such as job 3 shown in FIG. 60 is used. As shown in FIG. 60 (A), the selective binding conditions are cleared, and set conditions and the number of copies are released. FIG. 60(B) shows the print result of combination job 3.

The user may select, for example, any combination mode via the input unit 110 shown in FIG. 12. When the user selects a mode on the input unit 110, the job control module 94 executes job combination according to the selected mode.

In this embodiment, the user can combine jobs including those for which selective binding is specified. The combination mode is selected according to the user's request. The condition maintenance mode (i) allows the user to use a selective binding condition unchanged, eliminating the need to set up a condition and thereby increasing operability. The partial condition usage mode (ii) allows the user to use a part of a selective binding condition, thus increasing operability. The condition clear mode (iii) is useful for discarding an old selective binding condition and for creating a new one.

In the partial condition usage mode (ii), an unused selective binding condition may be extracted and defined as another job. This function enables the user to configure a system allowing him to divide or combine jobs easily.

In a print system with a finisher for binding, finishing processing may be controlled automatically according to the number of pages of each set for which selective binding is performed. For example, when the number of pages of a set is 50 or less, a stapler is used. When the number of pages is larger, simple binding is used. This control function controls the finisher operation automatically and, in particular, resolves selective binding complexities.

As described above, the system according to this invention allows the user to manage print jobs on a job basis as well as on a page basis, giving him a variety of functions. In particular, the ability to share common print data among a plurality of print jobs increases data processing and data storage efficiency. In addition, the system gives the user many functions including print job concurrent binding, print job hierarchical binding, page addition, page replacement, and page deletion. All these functions make it possible to build a highly useful print control system.

While there have been described what are at present considered to be preferred embodiments of the invention, it will be understood that various modifications may be made thereto, and it is intended that the appended claims cover all such modifications as fall within the true spirit and scope of the invention.

We claim:

1. A print control system comprising:
   a job description file storage module containing job description files each containing a job element list for each print job;
   a page data storage module containing page data of page images, the page images representing actual data of pages; and
   a job control module extracting and sending to a printer a page image, required for printing, according to a job element list in said job description file, wherein a plurality of print jobs are managed on a job basis and on a page basis and the page data is managed independently of said job description files and may be commonly used by the plurality of print jobs.

2. A print control system according to claim 1, further comprising a job interpretation module interpreting a received print job to create said job description file and said page data.

3. A print control system according to claim 1, further comprising an identification information assignment module assigning identification module to said job description file and said page data, wherein said job description file and said page data are managed by said identification information.

4. A print control system according to claim 3, wherein said identification information assignment module assigns as said identification information, local identification information known within the print control system and universal identification information known even outside the print control system.

5. A print control system according to claim 3, wherein said job element list includes identification information on said page data and identification information on said job description file and wherein, when a referenced job element list contains identification information on another job description file, said job control module references the job element list of the another job description file.

6. A print control system according to claim 3, wherein said page data is created for each color.

7. A print control system according to claim 1, wherein said job description file contains the print attributes of the entire job, said page data contains the print attributes of each page, and wherein said job control module controls printing according to the print attributes in said job description file and the print attributes in said page data.

8. A print control system according to claim 7, wherein said job description file contains attribute priority information determining which print attributes to use when the print attributes in said job description file and the print attributes in said page data do not match and wherein said job control module controls printing according to said attribute priority information.

9. A print control system according to claim 1, wherein, upon receiving a re-print instruction with a job description file specified, said job control module reads the job description file from said job description file storage module and controls printing.

10. A print control system according to claim 1, wherein, upon receiving a file revision instruction with a job description file and revisions specified, said job control module reads the job description file from said job description file storage module and revises the contents.

11. A print control system according to claim 1, further comprising an editing unit for use in editing the contents of said job description file.

12. A print control system according to claim 1, further comprising a management table containing reference relationship information on each of said job description file and said page.

13. A print control system according to claim 1, further comprising a deletion module deleting a job element, wherein, when a job element is deleted from a print job, said deletion module checks if the deletion has an effect on any other print job and deletes the job element only when there is no effect.

14. A print control system according to claim 1, further comprising an archive execution module archiving data, in whole or in part, from said job description file storage module or said page data storage module.

15. A print control system according to claim 14, further comprising an archive information addition module adding archive information during said archiving.

16. A print control system according to claim 15, further comprising a restore execution module restoring data archived during said archiving back into the print control system.

17. A print control system according to claim 16, further comprising a retrieval module searching data restored during said restoration for a particular piece of data based on said archive information.

18. A print control system according to claim 16, wherein said restore execution module restores only page data not found in the print control system during said restoration.

19. A print control system according to claim 1, further comprising an image data creation module creating image data for each item of displayed page data.

20. A print control system according to claim 1, further comprising a job combination module creating a combination job by combining a plurality of print jobs, wherein said job combination module creates the job description file of said combination job according to the job description files of the print jobs before combination.

21. A print control system according to claim 20, wherein, when a selective binding description for specifying the number of copies of each job element set is contained in one of the job description files of the print jobs before combination, said job combination module creates the job description file of the combination job while maintaining all the conditions of the selective binding.

22. A print control system according to claim 20, wherein, when a selective binding description for specifying the number of copies of each job element set is contained in one of the job description files of the print jobs before combination, said job combination module creates the job description file of the combination job while maintaining a part of the conditions of the selective binding.

23. A print control system according to claim 20, wherein, when a selective binding description for specifying the number of copies of each job element set is contained in one of the job description files of the print jobs before combination, said job combination module creates the job description file of the combination job by clearing the selective binding description.

24. A print control system according to claim 20, further comprising means for selective job combination conditions for said job combination module.

25. A print control system according to claim 1, wherein when none of the job description files references page data for a particular page, said page data for a particular page can be deleted or edited, and when other of the job description files references said page data for a particular page, said page data for a particular page cannot be deleted or edited.

26. A print control method comprising the steps of:
creating a job description file containing a job element list for each print job;
creating page data of page images, the page images representing actual data of pages;
extracting and sending a page image to a printer according to the job element list in said job description file; and
managing a plurality of print jobs on a job basis and on a page basis and managing the page data independently of said job description file so that the page data may be commonly used by the plurality of print jobs.

27. A print control method according to claim 26, wherein a plurality of print jobs share the same page data by allowing a plurality of job description files to reference the same page data.

28. A print control method according to claim 25, wherein when none of the job description files references page data for a particular page, said page data for a particular page can be deleted or edited, and when other of the job description files references said page data for a particular page, said page data for a particular page cannot be deleted or edited.

29. A recording medium containing a print control program, wherein said print control program comprises the functions of:

creating a job description file containing a job element list for each print job;

creating page data of page images, the page images representing actual data of pages;

extracting and sending a page image to a printer according to the job element list in said job description file; and managing a plurality of print jobs on a job basis and on a page basis and managing the page data independently of said job description file so that the page data may be commonly used by the plurality of print jobs.

30. A recording medium containing a print control program according to claim 29, wherein when none of the job description files references page data for a particular page, said page data for a particular page can be deleted or edited, and when other of the job description files references said page data for a particular page said page, data for a particular page cannot be deleted or edited.

* * * * *